(12) United States Patent
Durham et al.

(10) Patent No.: US 11,580,035 B2
(45) Date of Patent: Feb. 14, 2023

(54) FINE-GRAINED STACK PROTECTION USING CRYPTOGRAPHIC COMPUTING

(71) Applicant: Intel Corporation, Santa Clara, CA (US)

(72) Inventors: David M. Durham, Beaverton, OR (US); Karanvir S. Grewal, Hillsboro, OR (US); Michael D. LeMay, Hillsboro, OR (US); Salmin Sultana, Hillsboro, OR (US); Andrew James Weiler, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/134,406

(22) Filed: Dec. 26, 2020

(65) Prior Publication Data

US 2021/0149825 A1  May 20, 2021

(51) Int. Cl.
*G06F 12/14* (2006.01)
*G06F 9/30* (2018.01)
*G06F 9/50* (2006.01)

(52) U.S. Cl.
CPC ...... *G06F 12/1408* (2013.01); *G06F 9/30101* (2013.01); *G06F 9/5016* (2013.01); *G06F 12/1441* (2013.01); *G06F 12/1466* (2013.01)

(58) Field of Classification Search
CPC . G06F 9/35; G06F 21/72; G06F 21/52; G06F 12/1408; G06F 12/1441;
(Continued)

(56) References Cited

U.S. PATENT DOCUMENTS 6,570,989 B1  5/2003  Ohmori et al.
7,254,718 B2  8/2007  Kaminaga et al.
(Continued)

FOREIGN PATENT DOCUMENTS

DE  102018125786 A1  5/2019
EP  2073430 A1  6/2009
(Continued)

OTHER PUBLICATIONS

Yang, Jun et al. "Improving Memory Encryption Performance in Secure Processors." IEEE Transactions on Computers, vol. 54, No. 5, May 2005 pp. 630-640.*
(Continued)

*Primary Examiner* — Pierre Michel Bataille
(74) *Attorney, Agent, or Firm* — Alliance IP, LLC

(57) ABSTRACT

A processor includes a register to store an encoded pointer to a variable in stack memory. The encoded pointer includes an encrypted portion and a fixed plaintext portion of a memory address corresponding to the variable. The processor further includes circuitry to, in response to a memory access request for associated with the variable, decrypt the encrypted portion of the encoded pointer to obtain first upper address bits of the memory address and a memory allocation size for a variable, decode the encoded pointer to obtain the memory address, verify the memory address is valid based, at least in part on the memory allocation size, and in response to determining that the memory address is valid, allow the memory access request.

25 Claims, 18 Drawing Sheets

(58) Field of Classification Search
CPC ............ G06F 9/30101; G06F 12/1466; G06F 9/5016; G06F 2212/1052; G06F 12/14; G06F 9/30; G06F 9/50
See application file for complete search history.

(56) References Cited

U.S. PATENT DOCUMENTS

| | | | |
|---|---|---|---|
| 7,907,723 | B2 | 3/2011 | Rubin |
| 8,085,934 | B1 | 12/2011 | Bhooma |
| 8,675,868 | B1 | 3/2014 | Yearsley et al. |
| 8,798,263 | B2 | 8/2014 | Pasini et al. |
| 9,213,653 | B2 | 12/2015 | Durham et al. |
| 9,436,847 | B2 | 9/2016 | Durham et al. |
| 9,514,285 | B2 | 12/2016 | Durham et al. |
| 9,811,661 | B1 | 11/2017 | Golovkin et al. |
| 9,830,162 | B2 | 11/2017 | LeMay |
| 9,990,249 | B2 | 6/2018 | Durham et al. |
| 10,216,522 | B2 | 2/2019 | LeMay |
| 10,387,305 | B2 | 8/2019 | Durham et al. |
| 10,536,266 | B2 | 1/2020 | Courtney |
| 10,585,809 | B2 | 3/2020 | Durham et al. |
| 10,706,164 | B2 | 7/2020 | LeMay et al. |
| 10,769,272 | B2 | 9/2020 | Durham et al. |
| 10,860,709 | B2 | 12/2020 | LeMay et al. |
| 2002/0094081 | A1 | 7/2002 | Medvinsky |
| 2003/0091185 | A1 | 5/2003 | Swindlehurst et al. |
| 2003/0101362 | A1 | 5/2003 | Dia |
| 2003/0126349 | A1 | 7/2003 | Nalawadi et al. |
| 2003/0149869 | A1 | 8/2003 | Gleichauf |
| 2004/0123288 | A1 | 6/2004 | Bennett et al. |
| 2004/0215895 | A1* | 10/2004 | Cypher ............... G06F 12/0817 711/141 |
| 2004/0268057 | A1* | 12/2004 | Landin ................ G06F 12/0817 711/145 |
| 2007/0152854 | A1 | 7/2007 | Copley |
| 2007/0201691 | A1 | 8/2007 | Kumagaya |
| 2008/0080708 | A1 | 4/2008 | McAlister et al. |
| 2008/0130895 | A1 | 6/2008 | Jueneman et al. |
| 2008/0263117 | A1 | 10/2008 | Rose et al. |
| 2009/0172393 | A1 | 7/2009 | Tanik et al. |
| 2009/0220071 | A1 | 9/2009 | Gueron et al. |
| 2009/0254774 | A1 | 10/2009 | Chamdani et al. |
| 2010/0023707 | A1 | 1/2010 | Hohmuth et al. |
| 2011/0099429 | A1 | 4/2011 | Varma et al. |
| 2011/0161680 | A1 | 6/2011 | Grube et al. |
| 2011/0296202 | A1 | 12/2011 | Henry et al. |
| 2012/0163453 | A1 | 6/2012 | Horowitz |
| 2012/0284461 | A1 | 11/2012 | Larin et al. |
| 2013/0275766 | A1 | 10/2013 | Plainecassagne et al. |
| 2014/0173293 | A1 | 6/2014 | Kaplan |
| 2015/0234728 | A1 | 8/2015 | Coleman et al. |
| 2015/0244518 | A1 | 8/2015 | Koo et al. |
| 2015/0378941 | A1 | 12/2015 | Rozas et al. |
| 2016/0056954 | A1 | 2/2016 | Lee et al. |
| 2016/0092702 | A1 | 3/2016 | Durham et al. |
| 2016/0094552 | A1 | 3/2016 | Durham et al. |
| 2016/0104009 | A1 | 4/2016 | Henry et al. |
| 2016/0154963 | A1 | 6/2016 | Kumar et al. |
| 2016/0188889 | A1 | 6/2016 | Trivedi et al. |
| 2016/0285892 | A1 | 9/2016 | Kishinevsky et al. |
| 2016/0364707 | A1 | 12/2016 | Varma |
| 2017/0063532 | A1 | 3/2017 | Bhattacharyya et al. |
| 2017/0285976 | A1 | 10/2017 | Durham et al. |
| 2018/0095812 | A1 | 4/2018 | Deutsch et al. |
| 2018/0095906 | A1* | 4/2018 | Doshi ................ G06F 13/1663 |
| 2018/0109508 | A1 | 4/2018 | Wall et al. |
| 2018/0287785 | A1 | 10/2018 | Pfannenschmidt et al. |
| 2018/0365069 | A1 | 12/2018 | Nemiroff et al. |
| 2019/0026236 | A1 | 1/2019 | Barnes |
| 2019/0042369 | A1 | 2/2019 | Deutsch et al. |
| 2019/0042481 | A1 | 2/2019 | Feghali et al. |
| 2019/0042734 | A1 | 2/2019 | Kounavis et al. |
| 2019/0042766 | A1 | 2/2019 | Pappachan et al. |
| 2019/0042796 | A1 | 2/2019 | Bokern et al. |
| 2019/0042799 | A1 | 2/2019 | Durham et al. |
| 2019/0044954 | A1 | 2/2019 | Kounavis et al. |
| 2019/0045016 | A1 | 2/2019 | Dewan et al. |
| 2019/0050558 | A1 | 2/2019 | LeMay et al. |
| 2019/0095350 | A1 | 3/2019 | Durham et al. |
| 2019/0097794 | A1 | 3/2019 | Nix |
| 2019/0102567 | A1 | 4/2019 | LeMay et al. |
| 2019/0102577 | A1 | 4/2019 | Gueron et al. |
| 2019/0227951 | A1 | 7/2019 | Durham et al. |
| 2019/0319781 | A1 | 10/2019 | Chhabra et al. |
| 2019/0347445 | A1 | 11/2019 | Chen |
| 2019/0354726 | A1 | 11/2019 | Critelli et al. |
| 2020/0004953 | A1* | 1/2020 | Lemay ................... G06F 21/53 |
| 2020/0007332 | A1 | 1/2020 | Girkar et al. |
| 2020/0076585 | A1 | 3/2020 | Sheppard et al. |
| 2020/0117810 | A1 | 4/2020 | Kounavis et al. |
| 2020/0125501 | A1 | 4/2020 | Durham et al. |
| 2020/0125502 | A1 | 4/2020 | Durham et al. |
| 2020/0125742 | A1* | 4/2020 | Kounavis ............ G06F 9/30178 |
| 2020/0125769 | A1 | 4/2020 | Kounavis et al. |
| 2020/0125770 | A1* | 4/2020 | LeMay ............... G06F 12/0207 |
| 2020/0134234 | A1 | 4/2020 | LeMay et al. |
| 2020/0145187 | A1 | 5/2020 | Kounavis et al. |
| 2020/0145199 | A1 | 5/2020 | Kounavis et al. |
| 2020/0159676 | A1 | 5/2020 | Durham et al. |
| 2020/0169383 | A1 | 5/2020 | Durham et al. |
| 2020/0201789 | A1 | 6/2020 | Durham et al. |
| 2020/0257827 | A1 | 8/2020 | Kounavis et al. |
| 2020/0380140 | A1 | 12/2020 | Medwed et al. |
| 2020/0382289 | A1 | 12/2020 | Xue et al. |
| 2021/0004470 | A1 | 1/2021 | Babic et al. |
| 2021/0058379 | A1 | 2/2021 | Bursell et al. |
| 2021/0117340 | A1* | 4/2021 | Trikalinou ............ G06F 12/063 |
| 2021/0117342 | A1 | 4/2021 | Durham |
| 2021/0149825 | A1 | 5/2021 | Durham et al. |
| 2021/0150040 | A1 | 5/2021 | Durham et al. |
| 2021/0218547 | A1 | 7/2021 | Weiler et al. |
| 2022/0019698 | A1 | 1/2022 | Durham et al. |

FOREIGN PATENT DOCUMENTS

| | | |
|---|---|---|
| EP | 3326102 A1 | 5/2018 |
| JP | 2009139899 A | 6/2009 |
| WO | 2017014885 A1 | 1/2017 |

OTHER PUBLICATIONS

Pyo, Changwoo. "Encoding Function Pointers and Memory Arrangement Checking against Buffer Overflow Attack." In Proceedings of the 4th International Conference on Information and Communications Security (ICICS 2002): pp. 25-36.*

G. Zhu and A. Tyagi, "Protection against indirect overflow attacks on pointers," Second IEEE International Information Assurance Workshop, 2004. Proceedings., 2004, pp. 97-106.*

N. Tuck, B. Calder and G. Varghese, "Hardware and Binary Modification Support for Code Pointer Protection From Buffer Overflow," 37th International Symposium on Microarchitecture (MICRO-37'04), 2004, pp. 209-220.*

Nasahl, Pascal • Schilling, Robert • Werner, Mario • Hoogerbrugge, Jan • Medwed, Marcel • Mangard, Stefan, "CrypTag: Thwarting Physical and Logical Memory Vulnerabilities using Cryptographically Colored Memory", https://doi.org/10.48550/arXiv.2012.06761, ARXIV ID: 2012.06761, Dec. 12, 2020.*

D. Whelihan, K. Thurmer and M. Vai, "A key-centric processor architecture for secure computing," 2016 IEEE International Symposium on Hardware Oriented Security and Trust (HOST), 2016, pp. 173-178.*

EPO; Extended European Search Report issued in EP Patent Application No. 21195529.9, dated Mar. 1, 2022; 6 pages.

EPO; Extended European Search Report issued in EP Patent Application No. 21196104.0, dated Feb. 15, 2022; 10 pages.

USPTO Non-Final Office Action in U.S. Appl. No. 16/709,612 dated Feb. 17, 2022 (17 pages).

USPTO Notice of Allowance in U.S. Appl. No. 16/722,707 dated Mar. 28, 2022 (10 pages).

(56) References Cited

OTHER PUBLICATIONS

USPTO Notice of Allowance in U.S. Appl. No. 16/724,105 dated Mar. 31, 2022 (8 pages).
USPTO Notice of Allowance in U.S. Appl. No. 16/740,359 dated Mar. 22, 2022 (9 pages).
USPTO Supplemental Notice of Allowance in U.S. Appl. No. 16/722,707 dated Apr. 8, 2022 (5 pages).
Yang, Jun et al., "Improving Memory Encryption Performance in Secure Processors," IEEE Transactions on Computers, vol. 54, No. 5, May 2005 (11 pages).
USPTO Notice of Allowance in U.S. Appl. No. 16/724,026 dated Aug. 10, 2022 (10 pages).
Andreatos et al., "A comparison of random number sequences for image encryption", Mathematical Methods in Science and Engineering, 2014, pp. 146-151 (Year: 2014).
USPTO Non-Final Office Action in U.S. Appl. No. 16/722,342 dated Aug. 29, 2022 (14 pages).
USPTO Non-Final Office Action in U.S. Appl. No. 17/134,405 dated Aug. 1, 2022 (15 pages).
USPTO Notice of Allowance in U.S. Appl. No. 16/709,612 dated Aug. 23, 2022 (18 pages).
USPTO Notice of Allowance in U.S. Appl. No. 16/776,467 dated Jul. 18, 2022 (10 pages).
"Armv8.5—A Memory Tagging Extension White Paper", Oct. 9, 2019, accessed at https://developer.arm.com/-/media/Arm%20Developer%20Community/PDF/Arm_Memory_Tagging_Extension_Whitepaper.pdf, 9 pages.
Avanzi, Roberto, "The QARMA Block Ciper Family, Almost MDS Matrices Over Rings With Zero Divisors, Nearly Symmetric Even-Mansour Constructions With Non-Involutory Central Rounds, and Search Heuristics for Low-Latency S-Boxes," Qualcomm Product Security, Munich Germany, IACR Transactions on Symmetric Cryptology, 2017 (1) (40 pages).
Beaulieu, Ray et al., "Simon and Spec: Block Ciphers for the Internet of Things," National Security Agency, Jul. 2015 (15 pages).
Bernstein, Daniel J., "Gimli," Sep. 27, 2019, retrieved from https://csrc.nist.gov/CSRC/media/Projects/lightweight-cryptography/documents/round-2/spec-doc-md2/gimli-spec-round2.pdf, (48 pages).
BiiN, "CPU Architecture Reference Manual", accessed at http://bitsavers.informatik.uni-stuttgart.de/pdf/biin/BiiN_CPU_Architecture_Reference_Man_Jul88.pdf, Jul. 1988, 401 pages.
Boivie, Rick, IBM Research Report, SecureBlue++: CPU Support for Secure Execution, May 23, 2012, available online at https://domino.research.ibm.com/library/cyberdig.nsf/papers/E605BDC5439097F085257A13004D25CA/$File/rc25287.pdf, (10 pages).
Borghoff, Julia et al., "PRINCE—A Low-Latency Block Ciper for Pervasive Computing Applications," Advances in Cryptology—ASIACRYPT 2012—18th International Conference on the Theory and Application of Cryptology and Information Security, Beijing, China, Dec. 2-6, 2012. Proceedings (pp. 208-225).
Carr, Scott A. et al., "DataShield: Configurable Data Confidentiality and Integrity," Purdue University, ASIA CCS, '17, Apr. 2-6, 2017, Abu Dhabi, United Arab Emirates (12 pages).
Chen, Tony, et al., "Pointer Tagging for Memory Safety", accessed at https://www.microsoft.com/en-us/research/uploads/prod/2019/07/Pointer-Tagging-for-Memory-Safety.pdf, Jul. 2019, 23 pages.
Dworkin, Morris,"Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).
EPO; Extended European Search Report issued in EP Patent Application No. 20163534.9, dated Sep. 24, 2020; 8 pages.
EPO; Extended European Search Report issued in EP Patent Application No. 20163546.3, dated Sep. 28, 2020; 8 pages.
EPO; Extended European Search Report issued in EP Patent Application No. 20163670.1, dated Sep. 29, 2020; 8 pages.
EPO; Extended European Search Report issued in EP Patent Application No. 20163907.7, dated Oct. 6, 2020; 9 pages.
EPO; Extended European Search Report issued in EP Patent Application No. 20164326.9, dated Oct. 2, 2020; 9 pages.
EPO; Extended European Search Report issued in EP Patent Application No. 20164636.1, dated Oct. 6, 2020; 8 pages.
EPO; Extended European Search Report issued in EP Patent Application No. 20168972.6, dated Jul. 3, 2020; 9 pages.
EPO; Extended European Search Report issued in EP Patent Application No. 20181907.5, dated Nov. 2, 2020; 9 pages.
EPO; Extended European Search Report issued in EP Patent Application No. 20193625.9, dated Feb. 22, 2021; 7 pages.
EPO; Extended European Search Report issued in European Patent Application No. EP 20163095.1, dated Aug. 10, 2020; 9 pages.
EPO; Extended European Search Report issued in Patent Application No. EP 20163518.2, dated Aug. 19, 2020; 10 pages.
EPO; Extended European Search Report issued in Patent Application No. EP 20163661.0, dated Aug. 17, 2020; 9 pages.
Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.umich.edu/~barisk/public/morpheus.pdf, (16 pages).
Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).
Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).
Intel® 64 and IA-32 Architectures Software Developer's Manual, vol. 2B: Instruction Set Reference, M-U, Sep. 2016, retrieved from https://www.intel.com/content/dam/www/public/us/en/documents/manuals/64-ia-32-architectures-software-developer-vol-2b-manual.pdf, (706 pages).
Intel® 64 and IA-32 Architectures Software Developer's Manual, vol. 3D: System Programming Guide, Part 4, Sep. 2016, 224 pages, retrieved from https://www.intel.com/content/dam/www/public/us/en/documents/manuals/64-ia-32-architectures-software-developer-vol-3d-part-4-manual.pdf, (224 pages).
Kwon, Albert et al., "Low-Fat Pointers: Compact Encoding and Efficient Gate-Level Implementation of Fat Pointers for Spatial Safety and Capability-based Security," CCS' 13: Proceedings of the 2013 ACM SIGSAC Conference on Computer & Communications Security, Nov. 4-8, 2013, Berlin Germany (12 pages).
Liljestrand, Hans et al. "PACStack: an Authenticated Call Stack," Sep. 3, 2019, retrieved from https://arxiv.org/pdf/1905.10242.pdf, (20 pages).
Liljestrand, Hans, et al., "PAC it up: Towards Pointer Integrity using ARM Pointer Authentication", accessed at https://arxiv.org/pdf/1811.09189.pdf, last updated May 24, 2019, 21 pages.
Neagu, Madalin, et al.; "Increasing Memory Security Through Data Scrambling and Information Entropy Models," 2014 IEEE 15th International Symposium on Computational Intelligence and Informatics; Nov. 2014; 5 pages.
Pyo, Changwoo, "Encoding Function Pointers and Memory Arrangement Checking against Buffer Overflow Attack," In Proceedings of the 4th International Conference on Information and Communications Security (ICICS 2002) (12 pages).
Qualcomm Technologies, Inc., "Pointer Authentication on ARMv8.3, Design and Analysis of the New Software Security Instructions," Jan. 2017, retrieved from https://www.qualcomm.com/media/documents/files/whitepaper-pointer-authentication-on-armv8-3.pdf, (12 pages).
Savry, Olivier, et al., "Intrinsec, an Intrinsically Secure Processor", RISC V Workshop, Dec. 6, 2019, accessed at: http://riscv.org/wp-content/uploads/2019/06/16.15-CEA-RISC-V-Workshop-Zurich.pdf, (15 pages.).
Serebryany, Kostya, "ARM Memory Tagging Extension and How it Improves C/C++ Memory Safety," Summer 2019, (5 pages).

(56) References Cited

OTHER PUBLICATIONS

The Electronics Resurgence Initiative, "SSITH: TA1 (Hardware) Performers," Dec. 22, 2018, available online at https://eri-summit.darpa.mil/docs/ERIPoster_Applications_SSITH_DARPA.pdf, (1 page).
USPTO Final Office Action in U.S. Appl. No. 16/720,059 dated Jan. 21, 2022 (20 pages).
USPTO Non-Final Office Action in U.S. Appl. No. 16/723,927 dated Jun. 8, 2021 (32 pages).
USPTO Non-Final Office Action in U.S. Appl. No. 16/723,977 dated Aug. 3, 2021 (37 pages).
USPTO Non-Final Office Action in U.S. Appl. No. 16/724,105 dated Jul. 13, 2021 (10 page).
USPTO Non-Final Office Action in U.S. Appl. No. 16/740,359 dated Sep. 27, 2021 (8 pages).
USPTO Non-Final Office Action in U.S. Appl. No. 17/134,406 dated Jan. 21, 2022 (11 pages).
USPTO Notice of Allowance in U.S. Appl. No. 16/723,468 dated Oct. 18, 2021 (10 pages).
USPTO Notice of Allowance in U.S. Appl. No. 16/723,927 dated Dec. 24, 2021 (13 pages).
USPTO Notice of Allowance in U.S. Appl. No. 16/723,977 dated Feb. 3, 2022 (13 pages).
USPTO Notice of Allowance in U.S. Appl. No. 16/724,105 dated Nov. 16, 2021 (9 pages).
Watson, Robert N. M. et al., "Capability Hardware Enhanced RISC Instructions: CHERI Instruction-Set Architecture (Version 8)," University of Cambridge Computer Laboratory, Technical Report, No. 951, UCAM-CL-TR-951, ISSN 1476-2986 (Oct. 2020) (590 pages).
Watson, Robert N.M., et al., "An Introduction to CHERI", Technical Report UCAM-CL-TR-941, University of Cambridge Computer Labratory, Cambridge, United Kingdom, Sep. 2019, 43 pages.
Watson, Robert N.M., et al., "CHERI: A Hybrid Capability-System Architecture for Scalable Software Compartmentalization", 2015 IEEE Symposium on Security and Privacy, May 2015, accessed at https://discovery.ucl.ac.uk/id/eprint/1470067/1/oakland15cheri.pdf, 18 pages.
Xu, Leslie et al., "White Paper, Securing the Enterprise with Intel AES-NI, Intel Advanced Encryption Standard New Instructions (AES-NI)," Intel Corporation, Version, 2.0, Sep. 2010 (13 pages).

\* cited by examiner

US 11,580,035 B2

FINE-GRAINED STACK PROTECTION USING CRYPTOGRAPHIC COMPUTING

TECHNICAL FIELD

This disclosure relates in general to the field of computer systems, and more particularly, to cryptographic computing.

BACKGROUND

Cryptographic computing may refer to computer system security solutions that employ cryptographic mechanisms inside of processor components to protect data stored by a computing system. The cryptographic mechanisms may be used to encrypt the data itself and/or pointers to the data using keys, tweaks, or other security mechanisms. Cryptographic computing is an important trend in the computing industry, with the very foundation of computing itself becoming fundamentally cryptographic. Cryptographic computing represents a sea change, a fundamental rethinking of systems security with wide implications for the industry.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION

Figure 1:
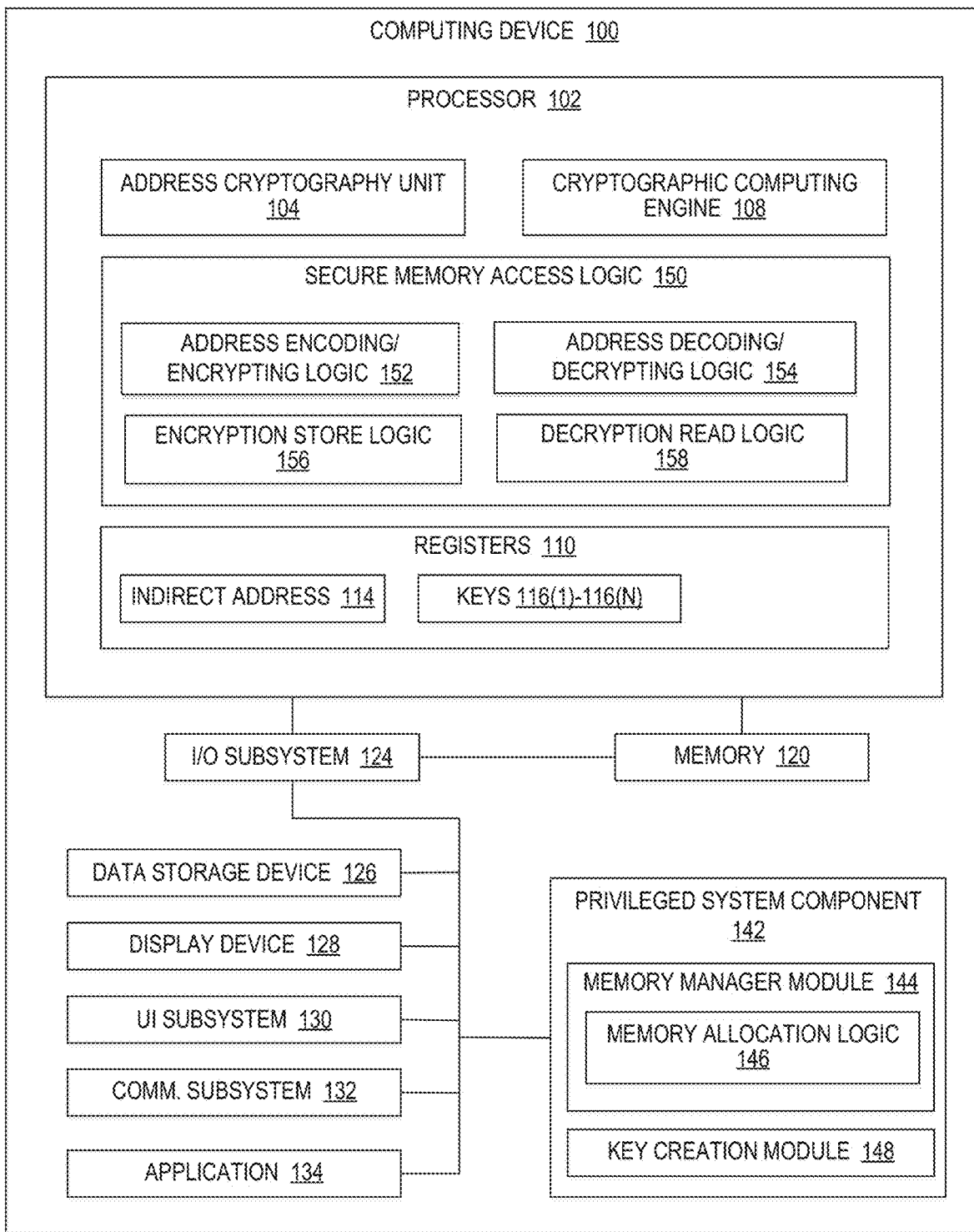
FIG. 1 is a simplified block diagram of an example computing device configured with secure memory access logic according to at least one embodiment of the present disclosure.

This disclosure provides various possible embodiments, or examples, for implementations of fine-grained protection in both stack and heap memory allocations using cryptographic computing. Fine-grained stack protection embodiments can include encoding pointers with variable base and bound information and using the precise bound encoding to protect sensitive variables. Another fine-grained protection for data in both stack and heap memory allocations relates to data type based encodings. In these embodiments, data type of a variable or data element can be encoded in a pointer to the variable and can be used in the encryption and decryption of the data element. The data type of a particular variable may be inferred from the instructions accessing and potentially manipulating the data.

At least some embodiments disclosed in this specification, including read and write operations, are related to pointer based data encryption and decryption in which a pointer to a memory location for data or code is encoded with a tag and/or other metadata (e.g., security context information) and may be used to derive at least a portion of tweak input to data or code cryptographic (e.g., encryption and decryption) algorithms. Thus, a cryptographic binding can be created between the cryptographic addressing layer and data/code encryption and decryption. This implicitly enforces bounds since a pointer that strays beyond the end of an object (e.g., data) is likely to use an incorrect tag value for that adjacent object. In one or more embodiments, a pointer is encoded with a linear address (also referred to herein as "memory address") to a memory location and metadata. In some pointer encodings, a slice or segment of the address in the pointer includes a plurality of bits and is encrypted (and decrypted) based on a secret address key and a tweak based on the metadata. Other pointers can be encoded with a plaintext memory address (e.g., linear address) and metadata.

For purposes of illustrating the several embodiments for proactively blocking out-of-bound memory accesses while enforcing cryptographic isolation of memory regions, it is important to first understand the operations and activities associated with data protection and memory safety. Accordingly, the following foundational information may be viewed as a basis from which the present disclosure may be properly explained.

Known computing techniques (e.g., page tables for process/kernel separation, virtual machine managers, managed runtimes, etc.) have used architecture and metadata to provide data protection and isolation. For example, in previous solutions, memory controllers outside the CPU boundary support memory encryption and decryption at a coarser granularity (e.g., applications), and isolation of the encrypted data is realized via access control. Typically, a cryptographic engine is placed in a memory controller, which is outside a CPU core. In order to be encrypted, data travels from the core to the memory controller with some identification of which keys should be used for the encryption. This identification is communicated via bits in the physical address. Thus, any deviation to provide additional keys or tweaks could result in increased expense (e.g., for new buses) or additional bits being "stolen" from the address bus to allow additional indexes or identifications for keys or tweaks to be carried with the physical address. Access control can require the use of metadata and a processor would use lookup tables to encode policy or data about the data for ownership, memory size, location, type, version, etc. Dynamically storing and loading metadata requires additional storage (memory overhead) and impacts performance, particularly for fine grain metadata (such as for function as a service (FaaS) workloads or object bounds information).

The following disclosure provides various possible embodiments, or examples, for implementation of cryptographic computing. Cryptographic computing is an important trend in the computing industry, with the very foundation of computing itself becoming fundamentally cryptographic. Cryptographic computing represents a sea change, a fundamental rethinking of systems security with wide implications for the industry.

Embodiments disclosed in this application are related to pointer based data encryption in which a pointer to a memory location for data is encoded with a tag and/or other metadata and may be used to derive at least a portion of tweak input to data cryptographic (e.g., encryption and decryption) algorithms. Thus, a cryptographic binding is created between the cryptographic addressing layer and data/code encryption and decryption. This implicitly enforces bounds since a pointer that strays beyond the end of an object (e.g., data) is likely to use an incorrect tag value for that adjacent object. In one or more embodiments, a pointer is encoded with a linear address (also referred to herein as "memory address") to a memory location and metadata. A slice or segment of the address in the pointer includes a plurality of bits and is encrypted (and decrypted) based on a secret address key and a tweak that includes the metadata. This encrypted slice of the memory address in the pointer is also referred to herein as "ciphertext" with reference to some embodiments. Binding data encryption and the pointer can be achieved by encrypting the data at the memory location using a pointer-based tweak and secret data key. The pointer-based tweak for encrypting (and decrypting) the data can be derived from the encoded pointer and potentially additional context information. In particular, a pointer-based tweak for data can be created based, at least in part, on the encrypted slice of the address (e.g., the ciphertext) in the encoded pointer and the metadata in the encoded pointer. In other embodiments, the memory address may be decrypted and decoded to create the tweak for encrypting/decrypting the data. In at least some embodiments, context information stored separately from the pointer may also be included in the tweak.

Variations of a different tweak for encrypting and decrypting a slice of the memory address to be embedded in the pointer are possible in one or more embodiments. For example, different and/or additional context information such as various types of metadata, cryptographic context identifier, portions of the plaintext memory address, or any suitable combination thereof may be used in the tweak used to encrypt/decrypt the slice of the memory address in the pointer. Similarly, variations of the tweak for encrypting and decrypting the data referenced by the encoded pointer are also possible. In other embodiments, additional parts of the encoded pointer may be used in the pointer-based tweak or the entire encoded pointer may be used as the pointer-based tweak. Furthermore, in at least some embodiments, different and/or additional context information such as metadata, cryptographic context identifier, slices of the plaintext address, or any suitable combination thereof may also be used in the tweak used to encrypt/decrypt the data referenced by the encoded pointer.

For purposes of illustrating the several embodiments of pointer based data encryption, it is important to first understand the operations and activities associated with data protection and memory safety. Accordingly, the following foundational information may be viewed as a basis from which the present disclosure may be properly explained.

Current computing techniques (e.g., page tables for process/kernel separation, virtual machine managers, managed runtimes, etc.) have used architecture and metadata to provide data protection. For example, in previous solutions, a processor would use lookup tables to encode policy or data about the data for ownership, memory size, location, type, version, etc. Dynamically storing and loading metadata requires additional storage (memory overhead) and impacts performance, particularly for fine grain metadata (such as function as a service (FaaS) workloads or object bounds information).

Cryptographic computing can resolve many of the aforementioned issues (and more). Cryptographic computing may make redundant the legacy modes of process separation, user space, and kernel with a fundamentally new fine-grain protection model. With cryptographic computing, protections are cryptographic, with processors and accelerators alike utilizing secret keys and ciphers to provide access control and separation at increasingly finer granularities. Further, instead of virtual machine and process separation in current systems, with cryptographic computing, individual functions may become the boundary, allowing address spaces to be shared via pointers that are encrypted, with the encrypted pointers and keys providing controlled access down to individual data objects.

Cryptographic computing embodiments disclosed herein may leverage the concept of a cryptographic addressing layer where the processor decrypts software allocated memory addresses (linear/virtual address space, sometimes referred to as "pointers") based on implicit and explicit metadata (e.g., context information, a cryptographic context identifier, etc.) and/or a slice of the memory address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and the key (e.g., secret key 116(1)). A tweak comprises one or more bits that represent a value. In one or more embodiments, a tweak may compose all or part of an initialization vector (IV) for a block cipher. When decryption of an address is performed, if the information used to create the tweak (e.g., implicit and explicit metadata, plaintext address slice of the memory address, etc.) corresponds to the original allocation of the memory address by a memory allocator (e.g., software allocation method), then the processor can correctly decrypt the address. Otherwise, a random address result will cause a fault and get caught by the processor. These cryptographic addresses (or address slices) may be further used by the processor as a tweak to the data encryption cipher used to encrypt/decrypt data they refer to (data referenced by the cryptographically encoded pointer), creating a cryptographic binding between the cryptographic addressing layer and data/code encryption. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

By cryptographically encoding metadata into addresses and their referenced data, cryptographic computing may reduce or remove the need for extra separate memory/storage to provide policy and context information/metadata. This can save up to billions of dollars in the computing industry (e.g., in dynamic random access memory (DRAM) expenses) due to the reduction of metadata alone. Customers can reap these savings in memory costs while still getting the security, safety and error-free functionality they want with cryptographic computing. By allowing safe speculation, the fundamentally cryptographic separation policies of cryptographic computing may allow the processor to speculate freely and provide increased performance.

In cryptographic computing, where data security is fundamentally linked to cryptographic memory addressing, processing and fine grain cryptographic access controls to data are important. Cryptographic computing transforms all compute vectors from the CPU to GPU, accelerators to FPGAs, etc. With cryptographic computing, protections may be cryptographic, where processors and accelerators alike utilize secret keys and ciphers to provide access control and separation at increasingly fine granularities. Further, instead of virtual machine and process separation, individual functions may become the boundary, address spaces are shared while pointers are encrypted, with keys providing controlled access down to individual data objects. Capabilities may thus become entwined in the cryptographic operations to provide granular access control to data objects while preventing buffer overflows, type confusion and temporal (e.g. use-after-free) vulnerabilities at every level of the system. Cryptographic code may execute natively, safely, and without the need for interpreters or managed runtimes to provide memory and type safety. Memory may move from isolated domains and containers to globally shared memory models where data is accessible based on cryptographic access control mechanisms and gone are difficult-to-scale distributed permissions, paging and associated control structures. Even files may be safely stored directly in memory (e.g., in non-volatile memory modules, such as non-volatile dual-inline memory modules (NVDIMMs)), being individually encrypted, cryptographically sized, and incorruptible from software errors. This may have implications for functional safety, reliability, and multi-tenancy, potentially allowing for more speculation for improving processing performance.

Cryptography continues to become faster and lighter. For instance, the Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, tweakable K-cipher, PRINCE or any other block cipher).

Lightweight ciphers suitable for pointer encryption have emerged recently. The PRINCE cipher, for example, can be implemented in 3 clocks requiring as little as 799 $\mu m^2$ of area in the 10 nm process, providing half the latency of AES in a tenth the Silicon area. Cryptographic computing may utilize these new ciphers, as well as others, introducing novel computer architecture concepts including, but not limited to: (i) cryptographic addressing, i.e., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information about the reference data, or any suitable combination thereof as tweaks for the data encryption. A variety of encryption modes that are tweakable can be used for this purpose of including metadata (e.g. counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation) with an input block to produce the encrypted or decrypted block. In some block ciphers, the keystream is fed into the next block cipher to perform encryption or decryption.

The "Metadata Wall" may refer to the problem of additionally fetching metadata about memory operations such as access control, object type/size, and version. Today's computer architecture requires the processor to lookup metadata, or data about data, to determine if memory accesses are allowed. The additional memory accesses for metadata can impact performance, additional storage for the metadata is required, and the metadata itself needs to be protected in order to provide security. Some current solutions that add metadata in the form of bounds tables that the hardware would use to detect buffer overflows have been shown to have up to 4× performance impact with 400% memory overheads for some workloads. Similarly, shadow stack metadata enables Control-flow Enforcement Technology, and memory tagging uses metadata for versioning and capabilities add metadata for verifying data types. Memory tagging is not suitable for mitigating type confusion and protecting against uninitialized use variables. In addition, although the overhead of memory tagging may be reduced using error-correcting code bits, it can nevertheless require additional devices, which can increase costs. Capability machines may also use fat pointers to embed security metadata in-line with pointers, imposing substantial memory overheads (e.g., 25% in pointer heavy applications) due to doubling the pointer size.

In contrast, cryptographic computing may provide metadata codified as tweaks to cryptographic addressing and data, cryptographic addressing and code, or a combination thereof, removing potential performance and memory overheads caused by the inclusion of such metadata. The resulting ciphertext may need no additional protections beyond the secret key, allowing reuse of the same memory as the data. As further discussed herein, cryptographic computing may solve a myriad of vulnerabilities with the same unified mechanism, using computation instead of memory.

FIG. 1 is a simplified block diagram of an example computing device 100 configured with secure memory access logic according to at least one embodiment of the present disclosure. In the example shown, the computing device 100 includes a processor 102 having a set of secure memory access logic 150 and a number of registers 110. The secure memory access logic 150 utilizes metadata about an indirect address 114, which is encoded into unused bits of the indirect address 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the indirect address 114. For example, the metadata encoding and decoding provided by the secure memory access logic 150 can prevent the indirect address 114 from being manipulated to cause a buffer overflow, and/or can prevent program code from accessing memory that it does not have permission to access. Address encoding logic 152 of the secure memory access logic 150 is invoked when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the indirect address 114, which points to the allocated memory, is encoded with the address metadata.

The address metadata can include valid range metadata. The valid range metadata allows executing programs to manipulate the value of the indirect address 114 within a valid range, but will corrupt the indirect address 114 if the memory is accessed using the indirect address 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the indirect address 114 (e.g., whether the indirect address 114 can be used to write, execute, or read the referenced memory).

In at least some other embodiments that will be further described herein, other metadata (or context information) can be encoded in the unused bits of indirect address 114 such as a size of plaintext address slices (e.g., number of bits in a plaintext slice of a memory address embedded in the indirect address), a memory allocation size (e.g., bytes of allocated memory referenced by the indirect address), a type of the data or code (e.g., class of data or code defined by programming language), permissions (e.g., read, write, and execute permissions of the indirect address), a location of the data or code (e.g., where the data or code is stored), the memory location where the pointer itself is to be stored, an ownership of the data or code, a version of the indirect address (e.g., a sequential number that is incremented each time an indirect address is created for newly allocated memory, determines current ownership of the referenced allocated memory in time), a tag of randomized bits (e.g., generated for association with the indirect address), a privilege level (e.g., user or supervisor), a cryptographic context identifier (or crypto context ID) (e.g., randomized or deterministically unique value for each indirect address), etc. For example, in one embodiment, the address metadata can include size metadata that encodes the size of a plaintext address slice in the indirect address. The size metadata may specify a number of lowest order bits in the indirect address that can be modified by the executing program. The size metadata is dependent on the amount of memory requested by a program. Accordingly, if 16 bytes are requested, then size metadata is encoded as 4 (or 00100 in five upper bits of the pointer) and the 4 lowest bits of the pointer are designated as modifiable bits to allow addressing to the requested 16 bytes of memory. In some embodiments, the address metadata may include a tag of randomized bits associated with the indirect address to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating the tag value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

Address decoding/decrypting logic 154 verifies the encoded metadata on memory read and write operations that utilize processor instructions such as MOV, where a general purpose register is used as a memory address to read a value from memory (e.g., load) or to write a value to memory (e.g., store), as well as on other operations that involve the "use" of memory (such as arithmetic instructions with memory operands, e.g. ADD, and control transfer instructions, e.g. CALL/JMP etc.). These are considered memory operands, which may specify a location in memory at which the destination address for the control transfer is stored. The example secure memory access logic 150 is embodied as part of processor instructions (e.g., as part of the processor instruction set architecture), or microcode (e.g., instructions that are stored in read-only memory and executed directly by the processor 102). In other embodiments, portions of the secure memory access logic 150 may be embodied as hardware, firmware, software, or a combination thereof (e.g., as programming code executed by a privileged system component 142 of the computing device 100). For example, the secure memory access logic 150 may be embodied in software as an instruction set emulator (e.g., a binary instrumentation tool such as a PIN Tool) that emulates the instruction logic utilizing the encoded addresses as disclosed herein.

The secure memory access logic 150 is executable by the computing device 100 to provide security for indirect addresses "inline," e.g., during execution of a program (such as a user space software application) by the computing device 100. As used herein, the terms "indirect address" and "pointer" may each refer to, among other things, an address (e.g. virtual address or linear address) of a memory location at which other data or instructions are stored. In an example, a register that stores an encoded memory address of a memory location where data or code is stored may act as a pointer. As such, the indirect address 114 may be embodied as, for example, a data pointer (which refers to a location of data), a code pointer (which refers to a location of executable code), an instruction pointer, or a stack pointer. Indirect addresses may be referred to by other terminology, such as "pointer," "address pointer," or "pointer address." As used herein, "metadata" may refer to, among other things, information about or relating to an indirect address 114, such as a valid data range, a valid code range, pointer access permissions, a size of plaintext address slice (e.g., encoded as a power in bits), a memory allocation size, a type of the data or code, a location of the data or code, an ownership of the data or code, a version of the indirect address, a tag of randomized bits, version, a privilege level of software, a cryptographic context identifier, etc.

As used herein, "memory load" may refer to, among other things, a "MOV", "LOAD", or "POP" instruction or any other instruction that causes data to be read, copied, or otherwise accessed at one storage location, e.g., memory, and moved into another storage location, e.g., registers (where "memory" may refer to main memory or cache, e.g., a form of random access memory, and "register" may refer to a processor register, e.g., hardware), or any instruction that accesses or manipulates memory. Also as used herein, "memory store" may refer to, among other things, a "MOV", "STORE", or "PUSH" instruction or any other instruction that causes data to be read, copied, or otherwise accessed at one storage location, e.g., register, and moved into another storage location, e.g., memory, or any instruction that accesses or manipulates memory.

However, the indirect address encoding/decoding technology disclosed herein is not limited to MOV or load/store instructions. For example, control transfer instructions such as call and jump instructions can be adapted to handle encoded indirect addresses in a similar manner as described herein with respect to MOV instructions, wherein code is to execute within a valid address range. Likewise, the instruction pointer (e.g., register) may be range bound given the encoded address specified by the control transfer instruction (e.g. JMP/CALL) results in an encoded address being used for the instruction pointer, thus restricting valid program execution to within a valid address range (effectively, the program counter can increment correctly until it reaches the end of the encoded range). Furthermore, in some architectures, any number of processor instructions may have a memory operand in the form of an indirect address (e.g. arithmetic operations such as ADD, SUB, MUL, AND, OR, XOR, etc. may have a source/destination memory reference in the form of an indirect address and/or a source/destination register operand). In other architectures, however, the format of memory operands may vary. For example, registers may be combined in some way (e.g., by addition) to produce an effective address. Additionally, other parameters may optionally be included, such as a scaling factor that multiplies one of the register values (e.g., the index) and/or a constant displacement value embedded in the instruction that is directly added. Further, it should be noted that while the illustrative embodiments refer to "instructions," such instructions may be embodied as, e.g., processor instructions, operating system routines, or other forms of computer program code.

The example secure memory access logic 150 includes address encoding/encrypting logic 152 (which can include logic to perform metadata encoding and address encryption), encryption store logic 156, and decryption read logic 158. Illustratively, the address decoding/decrypting logic 154 (which can include logic for decrypting and forming a linear address from an encoded pointer), can be embodied in encryption store logic 156 and decryption read logic 158, but may be embodied in other processor instructions, or as a separate instruction or series of instructions, or as higher-level code executed by a privileged system component such as an operating system kernel or virtual machine monitor, or as an instruction set emulator. As described in more detail below, the address encoding logic 152 and the address decoding/decrypting logic 154 each operate on an indirect address 114 using metadata (e.g., one or more of valid range, permission metadata, size (power), memory allocation size, type, location, ownership, version, tag value, privilege level (e.g., user or supervisor), crypto context ID, etc.) and a secret key (e.g., secret key 116(1)), in order to secure the indirect address 114 at the memory allocation/access level. Also as described in more detail below, the encryption store logic 156 and decryption read logic 158 each operate on data (referenced by indirect address 114) using at least a portion of the indirect address and a secret key (e.g., secret key 116(2)), in order to secure the data at the memory location referenced by the indirect address 114 by binding the data encryption to the indirect address.

The example indirect address 114 is embodied as a register 110 (e.g., a general purpose register of the processor 102). Generally, keys 116(1)-116(N) and tweaks 117 can be handled in any suitable manner based on particular needs and architecture implementations. The keys and tweaks may be stored in registers 110 or memory 120.

The example secret keys 116(1)-116(N) may be generated by a key creation module 148 of a privileged system component 142, and stored in one of the registers 110 (e.g., a special purpose register or machine specific register (MSR)), or another memory location that is readable by the processor 102. In some embodiments, the secret keys 116(1)-116(N) may be stored in a location that is readable only by the processor. In other embodiments, the secret keys 116(1)-116(N) used to secure indirect addresses, data, and code can be stored in another memory location, such as in firmware, in a secure portion of the data storage device 126 or another data storage device, or another form of memory suitable for performing the functions described herein. In some embodiments, the secret keys 116(1)-116(N) may be transmitted across a secure communications channel and restored by an executive (such as an operating system or a virtual machine monitor, e.g., the privileged system component 142 described below). In virtualized environments in which virtual machines are migrated from one machine to another, and/or in cases in which a virtual machine, process or program running on the computing device 100 begins a sleeping/hibernating mode after an indirect address and the referenced data and/or code are secured using secret keys, and then later resumes, the secret keys will need to be recovered and restored. In these cases, the secret keys can be stored or possibly transmitted across a (secure) communications channel prior to a sleeping/hibernating mode, and then retrieved/restored by an executive (such as an operating system or a virtual machine monitor, e.g., the privileged system component 142).

It should be noted that embodiments described herein allow for any number of secret keys to be used for a particular program. In one example, the same secret key may be used for all indirect addresses used in a program. In another example, a different secret key may be used for each indirect address associated with a different memory allocation or for each predefined group of memory addresses associated with different memory allocations. In yet further embodiments, the same secret key used for an address encryption/decryption may also be used for encrypting the data bound to that address. In other embodiments, one secret key may be used for address encryption/decryption, while a different secret key may be used for data encryption/decryption bound to that address. For ease of explanation, embodiments further described herein refer to "secret address key" or "address key" to refer to the use of a secret key in encryption and decryption operations of memory addresses and "secret data key" or "data key" to refer to the use of a secret key in operations to encrypt and decrypt data.

On (or during) a memory allocation operation (e.g., a "malloc"), memory allocation logic 146 allocates a range of memory for a buffer and returns the indirect address 114 and the metadata (e.g., one or more of range, permission metadata, size (power), memory allocation size, type, location, ownership, version, tag, privilege level, crypto context ID, etc.). For example, the memory allocation logic 146 may encode plaintext range information in the indirect address 114 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation logic 146 is embodied in a memory manager module 144 of the privileged system component 142. The memory allocation logic 146 initiates the address encoding logic 152. The address encoding logic 152 includes metadata encoding logic 156, which encodes the indirect address 114 with the metadata (e.g., range, permission metadata, size (power), memory allocation size, type, location, ownership, version, tag value, privilege level, crypto context ID, some suitable combination thereof, etc.) and potentially an "adjustment," for example if range metadata is encoded, as described below. The address encoding logic 152 stores the metadata in an unused portion of the indirect address 114 (e.g., non-canonical bits of a 64-bit address). For some metadata or combinations of metadata, the indirect address 114 may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the indirect address 114. Address adjustment logic adjusts the valid range metadata as needed so that the upper address bits (e.g., most significant bits) of the addresses in the address range do not change as long as the indirect address 114 refers to a memory location that is within the valid range indicated by the range metadata. This enables the indirect address 114 to be manipulated (e.g., by software performing arithmetic operations, etc.) but only so long as the manipulations do not cause the indirect address 114 to go outside the valid range (e.g., overflow the buffer).

In an embodiment, address encoding/encrypting logic 152 uses the valid range metadata to select a portion (or slice) of the indirect address 114 to be encrypted. In other embodiments, the slice of the indirect address 114 to be encrypted may be known a priori (e.g., upper 32 bits, lower 32 bits, etc.). The address encoding/encrypting logic 152 encrypts the selected slice of the indirect address 114 (and the adjustment, in some embodiments), using the secret address key 116(1) and an address tweak, as described further below. On a memory access operation (e.g., a read, write, or execute operation), the address decoding/decrypting logic 154 decodes the previously-encoded indirect address 114. To do this, the address decoding/decrypting logic 154 decrypts the encrypted slice of the indirect address 114 (and in some embodiments, the encrypted adjustment) using the secret key 116(1) and the address tweak, as described further below.

The indirect address 114 is returned to its original (e.g., canonical) form, based on appropriate operations in order to restore the original value of the indirect address 114 (e.g., the true, original linear memory address). To do this in at least one possible embodiment, the address metadata encoded in the unused bits of the indirect address 114 may be removed, e.g., return the unused bits to their original form). If the indirect address 114 decodes successfully, the memory access operation completes successfully. However, if the encoded indirect address 114 has been manipulated (e.g., by software, inadvertently or by an attacker) so that its value falls outside the valid range indicated by the range metadata (e.g., overflows the buffer), the indirect address 114 will be corrupted as a result of the decrypting process performed by the address decoding/decrypting logic 154. A corrupted indirect address will raise a fault (e.g., a general protection fault or a Page Fault if the address is not mapped as present from the paging structures/page tables). One condition that may lead to a fault being generated is a sparse address space. In this scenario, a corrupted address is likely to land on an unmapped page and generate a page fault. In this way, the secure memory access logic 150 enables the computing device 100 to provide indirect address security against buffer overflow attacks and similar exploits. Embodiments of the indirect address security technologies disclosed herein can also be used for software debugging purposes or as an access control mechanism to prevent software from accessing areas of memory for which the software does not have permission. Additionally, in comparison to other buffer overflow mitigation techniques, embodiments of the disclosed indirect address security technologies can operate without any additional memory reads/writes, or without any additional instructions, or without any binary modifications, or without the need to recompile legacy code. Moreover, embodiments of the disclosed technologies are responsive to adversaries that can read memory and overwrite pointer values, as well as adversaries that can create/select arbitrary pointer values. Further, embodiments of the disclosed technologies can scale from very small memory ranges to very large memory ranges, or can cascade memory ranges within other memory ranges by using different encoded pointers. Still further, embodiments of the disclosed technologies are effective with dynamic memory allocation (e.g., due to the ability to programmatically create range encoded pointers inline). Additionally, embodiments of the disclosed technologies can be extended to provide code block (code location) access controls to data. Further, embodiments of the disclosed technologies are compatible with 64-bit versions of the x86 instruction set, as well as ARM, MIPS, PowerPC and other processor architectures, including wider (e.g., greater than 64-bit) address bit architectures and smaller (e.g. 32-bit) architectures by reserving address ranges for the metadata containing addresses.

Some embodiments of the disclosed technologies utilize aspects of address adjustment logic and address restoration logic to support legacy code compatibility, as described below. As used herein, "legacy code" may refer to a version of computer code that was designed to work on an earlier, or now-obsolete, or no-longer-supported computer architecture. For example, legacy code may include software that was originally developed for a 32-bit processor, but which is now running on a 64-bit processor. "Legacy code" also refers to a version of computer code designed without using or being adapted to use dedicated instructions for encoding and encrypting indirect addresses as described herein. At least some embodiments disclosed herein can be implemented without using new program instructions and accordingly, without the need for recompiling legacy code.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the secure memory access logic 150.

The computing device 100 also includes memory 122, an input/output subsystem 124, a data storage device 126, a display device 128, a user interface (UI) subsystem 130, a communication subsystem 132, at least one user space application 134, and the privileged system component 142 (which, illustratively, includes the memory manager module 144 and the key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a multi-core processor, other multiple-CPU processor or processing/controlling circuit, or multiple diverse processing units or circuits (e.g., CPU and GPU, etc.). The processor 102 has a number of registers 110, which include general purpose registers and special purpose registers. The indirect address 114 and the secret keys 116(1)-116(N) are stored in registers 110. The memory 122 of the computing device 100 may be embodied as any type of volatile or non-volatile memory or data storage capable of performing the functions described herein. In operation, the memory 122 may store various data and software used during operation of the computing device 100, as well as operating systems, applications, programs, libraries, and drivers.

The memory 122 is communicatively coupled to the processor 102, e.g., via the I/O subsystem 124. The I/O subsystem 124 may be embodied as circuitry and/or components to facilitate input/output operations with the processor 102, the memory 122, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 122, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, including a wireless network adapter.

The example computing device 100 also includes a number of computer program components, such as the user space application 134 and the privileged system component 142. The user space application 134 may be embodied as any computer application (e.g., software, firmware, hardware, or a combination thereof) that interacts directly or indirectly with an end user via, for example, the display device 128 or the UI subsystem 130. Some examples of user space applications 134 include word processing programs, document viewers/readers, web browsers, electronic mail programs, messaging services, computer games, camera and video applications, etc. Among other things, the privileged system component 142 facilitates the communication between the user space applications 134 and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes a number of computer program components, such as the memory manager module 144 and the key creation module 148. Each of the components of the privileged system component 142 may be embodied as software, firmware, hardware, or a combination of software and hardware. For example, the components of the privileged system component 142 may be embodied as modules of an operating system kernel, a virtual machine monitor, or a hypervisor. The memory manager module 144 allocates portions of memory 122 to the various processes running on the computing device 100 (e.g., as ranges of virtual memory addresses). The memory manager module 144 is embodied as, for example, a loader, a memory manager service, or a heap management service. The key creation module 148 creates the secret keys 116(1)-116(N) (e.g., secret address keys and secret data keys) and writes them to a register or registers to which the processor 102 has read access (e.g., a special purpose register). To create a secret key, the key creation module 148 may execute, for example, a random number generator or another algorithm capable of generating a secret key that can perform the functions described herein.

It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Furthermore, privileged system component 142 may be part of a trusted execution environment (TEE), virtual machine, processor 102, a co-processor (not shown), or any other suitable hardware, firmware, or software in computing device 100 or securely connected to computing device 100. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 2:
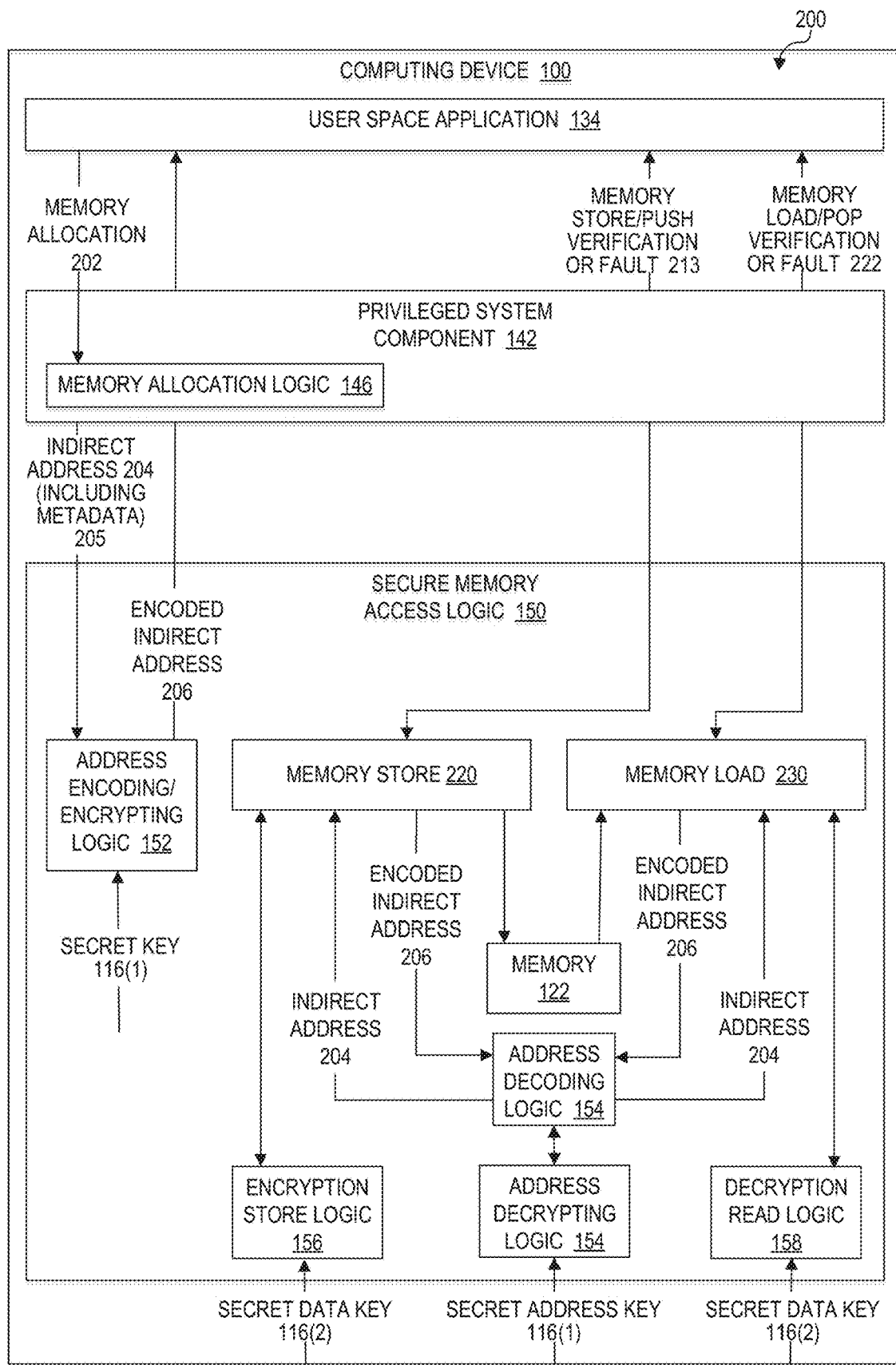
FIG. 2 is a simplified environment diagram illustrating an application of the secure memory access logic of FIG. 1 according to at least one embodiment of the present disclosure.

FIG. 2 is a simplified environment diagram illustrating an application of the secure memory access logic 150 of FIG. 1 according to at least one embodiment of the present disclosure. In some embodiments, the computing device 100 may establish an environment 200 during operation (e.g., native and/or virtual runtime or "execution" environments). The various modules depicted in the example environment 200 may be embodied as hardware, firmware, software, or a combination thereof. In the environment 200, the user space application 134 (or the privileged system component 142, e.g., in loading a user space application 134) may, from time to time, during the operation of the computing device 100, issue a memory allocation 202. In some examples, the memory allocation 202 may be an explicit memory allocation in a program (e.g., for dynamic memory allocation) and may be translated (e.g., compiled or interpreted), as needed, by the memory allocation logic 146 of the privileged system component 142 before being passed on to the processor 102. In other scenarios, the memory allocation may be an implicit request for memory by a certain instructions in a program. For example, calling a function that needs stack memory for local variables, passing parameters to a function, declaring local variables may be implicit requests for memory to be allocated in stack for the particular object or data element needing to be stored (e.g., return address, passed parameter, local variable data).

In the processor 102, the address encoding logic 152 is executed in response to the memory allocation 202 (e.g., in place of a conventional "malloc" instruction/function call for dynamic memory allocation, or in place implicit memory allocation operations for stack). The address encoding logic 152 encodes an indirect address 204, including metadata 205 (e.g., the range permission information, size (power), memory allocation size, type, location, ownership, version, tag, privilege level, crypto context ID or key, or any combination thereof, etc.), as described herein, and returns an encoded indirect address 206. The metadata may be embedded in the indirect address or pointer (e.g., a standard 64-bit register or enlarged register such as 128 bits or 256 bits to fit more metadata) in a plaintext format, embedded within another operand that is provided to the pointer encryption/decryption instructions and data access instructions, stored in a control register, stored in a table in memory, or provided via any combination thereof. For example, the size (power) metadata and tag value may be embedded in the pointer and the crypto context ID may be stored in a control register.

Similarly, the user space application 134 or the privileged system component 142 may issue a memory store 220 from time to time, which may be handled by the processor 102 as a processor instruction that reads from a register 110 (or other storage unit) and writes to memory 122 or cache using indirect address 114 (e.g. a STORE, MOV instruction, declaration or assignment of a variable). Using the STORE instruction as an example, the encryption store logic 156 stores data when the encoded indirect address has been successfully decoded by address decoding logic (e.g., 154). Encryption store logic 156 also causes the data that is to be stored at a memory location (in heap or stack) pointed to by the indirect address 204 to be encrypted based on a data tweak and secret data key 116(2). Successful execution of address decoding logic 154 is based on successful decryption of ciphertext in the indirect address, where the decryption uses an address tweak and secret address key 116(1) to decrypt the encrypted ciphertext of the encoded indirect address 206.

Similarly, the user space application 134 or the privileged system component 142 may issue a memory load 230 from time to time, which may be handled by the processor 102 as a processor instruction that reads from memory 122 (e.g., heap for load, stack for pop) and writes to a register 110 using an indirect address 114 (e.g. a LOAD, MOV, or POP instruction). Using the LOAD instruction as an example, the decryption read logic 158 performs the memory access only after successfully executing the address decoding logic (e.g., 154) to decode the encoded indirect address 206. Successful execution of address decoding logic 154 is based on successful decryption of ciphertext in the indirect address, where the decryption uses an address tweak and secret address key 116(1) to decrypt the encrypted ciphertext of the encoded indirect address 206. Once the indirect address 204 is obtained and memory 122 is accessed to load data from the memory location pointed to by the indirect address 204, the loaded data may be decrypted by decryption read logic 158 based on a data tweak and secret data key 116(2). Successful decryption depends on whether the portions of the indirect address used to create a data tweak to decrypt the data, and the additional metadata (if any) used to create the data tweak, correspond to the original allocation of the memory location pointed to by the indirect address.

It should be understood that the address decoding/decrypting logic 154 can be incorporated into the instruction logic (e.g., of an instruction set architecture) or can be embodied as a separate set of instructions or multiple sets of instructions. Further, it should be understood that the address decoding/decrypting logic 154 can be incorporated into or referenced by other types of instructions, alternatively or in addition to the LOAD, STORE, MOV, and POP instructions (e.g., arithmetic instructions with memory operands, call, JMP, etc.). For example, control transfer instructions such as call and JMP can load the encoded pointer address for the code to execute into the processor's program counter register (e.g. instruction pointer) (e.g., the RIP, where RIP is the instruction pointer register in 64-bit code). The instruction pointer register can then be queried by a program and as a result, the current program counter address will be the encoded form (offset to the current program counter location).

If the address decoding/decrypting logic 154 successfully decodes the encoded indirect address 206, which includes the successful decryption of the encrypted ciphertext in the encoded indirect address, the original indirect address 204 is returned to the privileged system component 142 and the memory access is completed, or program execution begins at the new program counter location (in the case of control flow changes). If the encoded indirect address 206 does not successfully decode, a fault is raised. Based on the successful completion or failure of memory store 220, an appropriate verification or fault signal 213 is returned to the user space application 134. Similarly, based on the successful completion or failure of memory load 230, an appropriate verification or fault signal 222 is returned to the user space application 134.

Figure 3A:
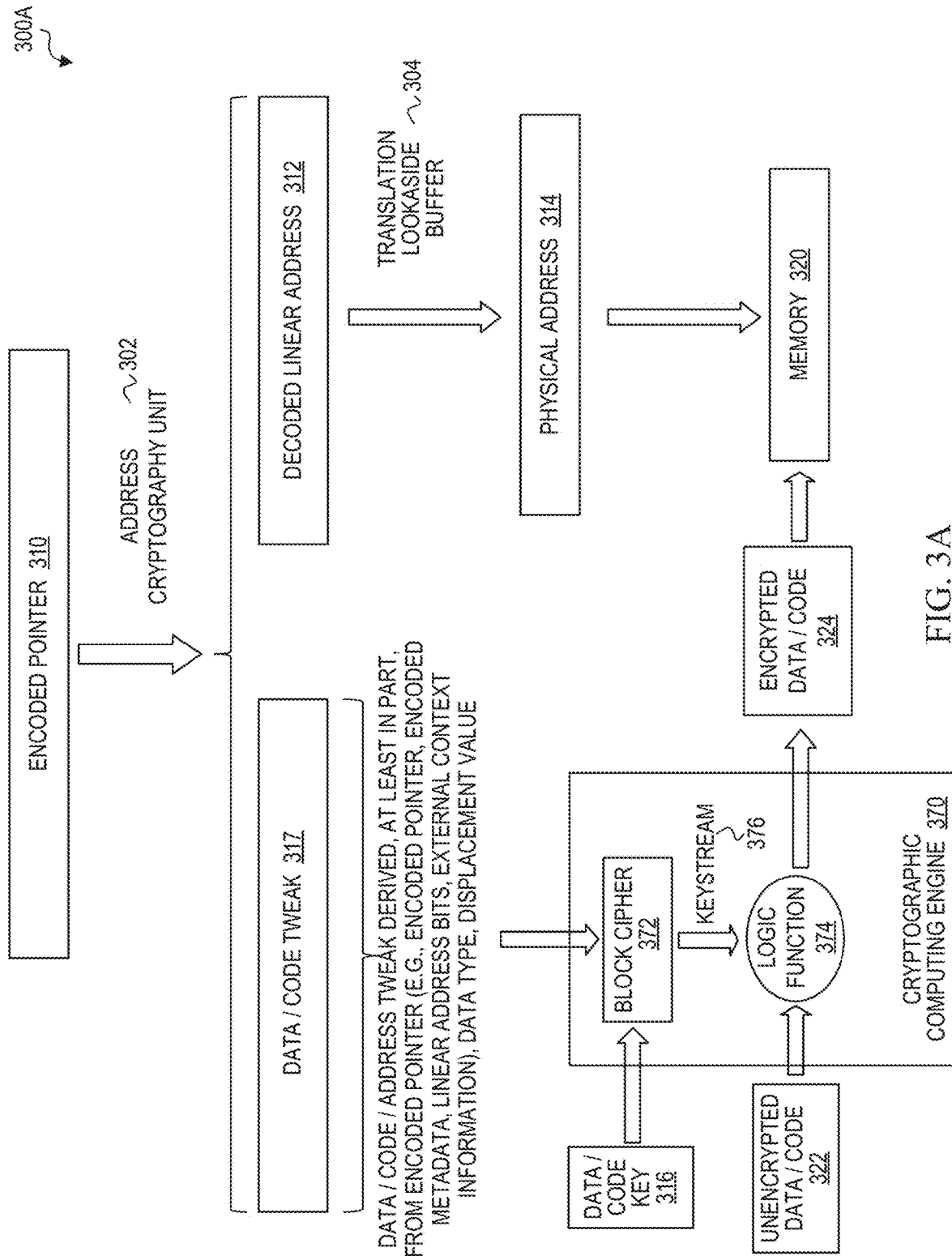
FIG. 3A is flow diagram illustrating a process of binding a generalized encoded pointer to encryption of data referenced by that pointer according to at least one embodiment of the present disclosure.

FIG. 3A is a simplified flow diagram illustrating a general process 300A of cryptographic computing based on embodiments of an encoded pointer 310 (which can also be referred to as an encoded indirect address). Process 300A illustrates storing (e.g., writing, pushing) data to a memory region at a memory address indicated by encoded pointer 310, where encryption and decryption of the data is bound to the contents of the pointer according to at least one embodiment. At least some portions of process 300A may be executed by hardware, firmware, and/or software of the computing device 100. In the example shown, encoded pointer 310 is an example of indirect address 114 and is embodied as an encoded linear address including a metadata portion. The metadata portion is some type of context information (e.g., size/power metadata, tag, version, etc.) and the linear address may be encoded in any number of possible configurations, at least some of which are described herein.

Encoded pointer 310 may have various configurations according to various embodiments. For example, encoded pointer 310 may be encoded with a plaintext linear address or may be encoded with some plaintext linear address bits and some encrypted linear address bits. Encoded pointer 310 may also be encoded with different metadata depending on the particular embodiment. For example, metadata encoded in encoded pointer 310 may include, but is not necessarily limited to, one or more of size/power metadata, a tag value, or a version number.

Generally, process 300A illustrates a cryptographic computing flow in which the encoded pointer 310 is used to obtain a memory address for a memory region of memory 320 where data is to be stored, and to encrypt the data to be stored based, at least in part, on a tweak derived from the encoded pointer 310. First, address cryptography unit 302 decodes the encoded pointer 310 to obtain a decoded linear address 312. The decoded linear address 312 may be used to obtain a physical address 314 in memory 320 using a translation lookaside buffer 304 or page table (not shown). A data tweak 317 is derived, at least in part, from the encoded pointer 310. For example, the data tweak 317 may include the entire encoded pointer, one or more portions of the encoded pointer, a portion of the decoded linear address, the entire decoded linear address, encoded metadata, and/or external context information (e.g., context information that is not encoded in the pointer).

Once the tweak 317 has been derived from encoded pointer 310, a cryptographic computing engine 370 can compute encrypted data 324 by encrypting unencrypted data 322 based on a data key 316 and the data tweak 317. In at least one embodiment, the cryptographic computing engine 370 includes an encryption algorithm such as a keystream generator, which may be embodied as an AES-CTR mode block cipher 372, at a particular size granularity (any suitable size). In this embodiment, the data tweak 317 may be used as an initialization vector (IV) and a plaintext offset of the encoded pointer 310 may be used as the counter value (CTR). The keystream generator can encrypt the data tweak 317 to produce a keystream 376 and then a cryptographic operation (e.g., a logic function 374 such as an exclusive-or (XOR), or other more complex operations) can be performed on the unencrypted data 322 and the keystream 376 in order to generate encrypted data 324. It should be noted that the generation of the keystream 376 may commence while the physical address 314 is being obtained from the encoded pointer 310. Thus, the parallel operations may increase the efficiency of encrypting the unencrypted data. It should be noted that the encrypted data may be stored to cache (e.g., 170) before or, in some instances instead of, being stored to memory 320.

Figure 3B:
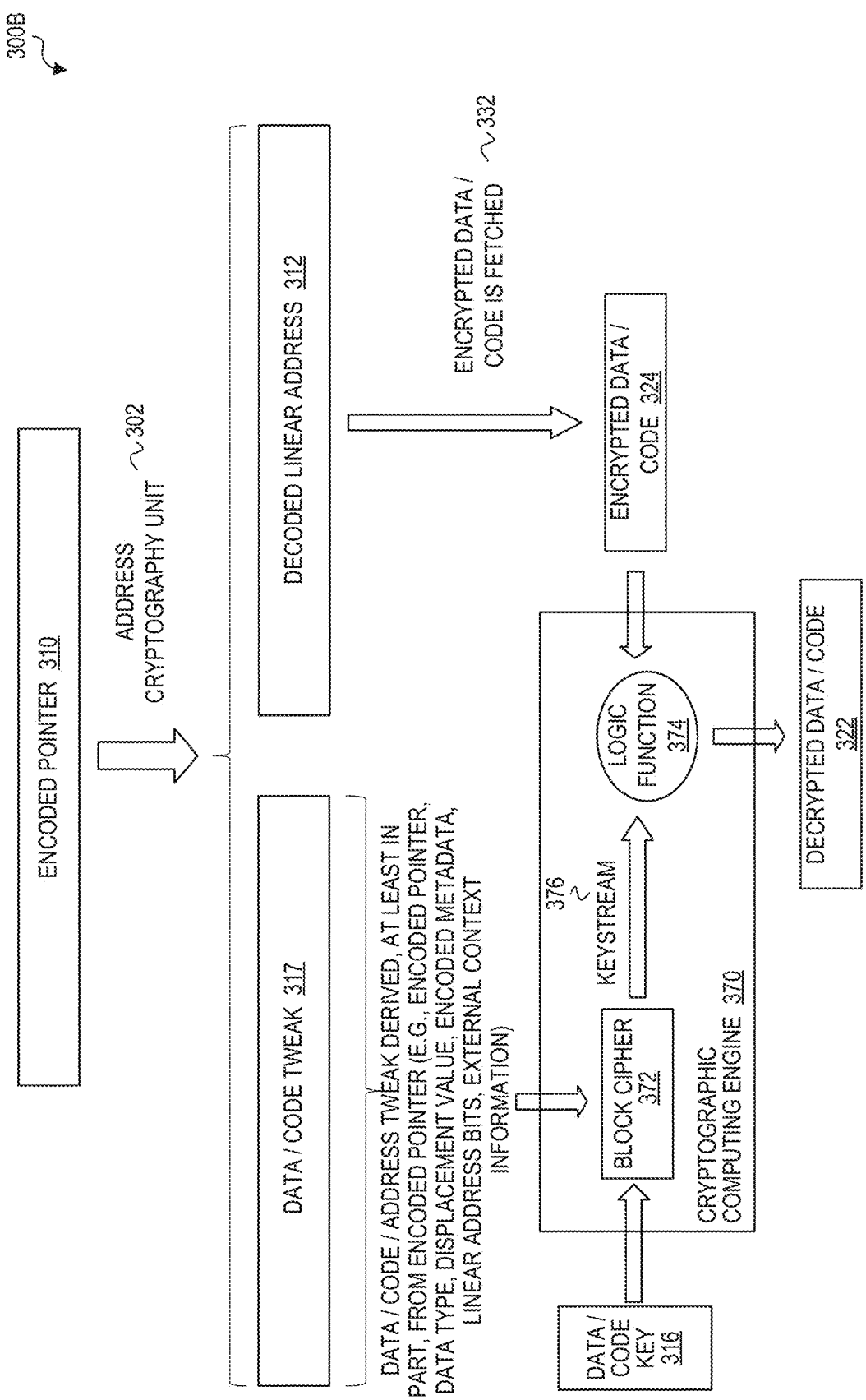
FIG. 3B is flow diagram illustrating a process of decrypting data bound to a generalized encoded pointer according to at least one embodiment of the present disclosure.

FIG. 3B is a simplified flow diagram illustrating a general process 300B of cryptographic computing based on embodiments of encoded pointer 310. Process 300B illustrates obtaining (e.g., reading, loading, fetching, popping) data stored in a memory region at a memory address that is referenced by encoded pointer 310, where encryption and decryption of the data is bound to the contents of the pointer according to at least one embodiment. At least some portions of process 300B may be executed by hardware, firmware, and/or software of the computing device 100.

Generally, process 300B illustrates a cryptographic computing flow in which the encoded pointer 310 is used to obtain a memory address for a memory region of memory 320 where encrypted data is stored and, once the encrypted data is fetched from the memory region, to decrypt the encrypted data based, at least in part, on a tweak derived from the encoded pointer 310. First, address cryptography unit 302 decodes the encoded pointer 310 to obtain the decoded linear address 312, which is used to fetch the encrypted data 324 from memory, as indicated at 332. Data tweak 317 is derived, at least in part, from the encoded pointer 310. In this process 300B for loading/reading data from memory, the data tweak 317 is derived in the same manner as in the converse process 300A for storing/writing data to memory.

Once the tweak 317 has been derived from encoded pointer 310, the cryptographic computing engine 370 can compute decrypted (or unencrypted) data 322 by decrypting encrypted data 324 based on the data key 316 and the data tweak 317. As previously described, in this example, the cryptographic computing engine 370 includes an encryption algorithm such as a keystream generator embodied as AES-CTR mode block cipher 372, at a particular size granularity (any suitable size). In this embodiment, the data tweak 317 may be used as an initialization vector (IV) and a plaintext offset of the encoded pointer 310 may be used as the counter value (CTR). The keystream generator can encrypt the data tweak 317 to produce keystream 376 and then a cryptographic operation (e.g., the logic function 374 such as an exclusive-or (XOR), or other more complex operations) can be performed on the encrypted data 324 and the keystream 376 in order to generate decrypted (or unencrypted) data 322. It should be noted that the generation of the keystream may commence while the encrypted data is being fetched at 332. Thus, the parallel operations may increase the efficiency of decrypting the encrypted data.

Pointer encoding for cryptographic computing has typically been applied to heap, where the whole memory is encrypted and decrypted with the same encryption key (or data key). Pointer encodings for heap memory, however, do not adequately support memory accesses in stack. Whereas pointer encodings for heap do not precisely encode boundary information of a particular memory target, stack can include sensitive data for which precise boundary encoding is needed. For example, one representative 64-bit heap pointer for a particular memory location can involve taking a plaintext input pointer and encoding a power value that determines how many bits of a linear address, which is encoded in the pointer, can be adjustable (e.g., mutable) as an offset of the linear address. Some other bits of the linear address may be fixed and another portion of the linear address may be encrypted. Other metadata (e.g., version number) may also be included in the pointer. For example, a power field in the pointer having a value of 3 could cause the pointer to have $2^3$ or 8 adjustable (mutable) bits as an offset of the linear address. The power encoding, however, does not provide the precise upper and lower boundary to ascertain the exact size of a particular object in memory. Accordingly, a different type of pointer encoding is described herein to enable pointer based cryptographic encoding to be used for stack.

Stack is defined by certain properties that distinguish it from heap. For instance, stack can be allocated when a thread is created, while heap is typically allocated at application startup. The size of stack varies but is much smaller than heap and is maintained by a program. For example, some default stack sizes are 8 Megabytes (e.g., Linux operating system) and some default stack sizes are 1 Megabyte (e.g., Microsoft® Windows). Stack can store various types of data and some examples include local variable data, return addresses for active function calls, and parameters that are used for passing information between functions and/or the between a function and the main program.

Vulnerabilities or weaknesses in operating systems, memory, and/or computer architecture are often targeted with exploits know as stack buffer overflows (or overruns) and stack smashing. Stack buffer overflows (or overruns) occur when a program writes to a memory address on the program's call stack outside the intended data structure, which can occur in response to programming error or malware. Such bugs usually result in corrupted data and can cause a program to crash. When a program runs with special privileges or accepts data from an untrusted source (e.g., another function), then a stack buffer overflow bug can become a potential security vulnerability. For example, if a running program calls a function, the program notifies the CPU of which function to run, a return address for the program may be loaded in stack by the CPU. The second function may be given the return address to use once it finishes executing and issues a return instruction to return to the program. If the first function is malicious, it could load untrusted executable code to stack and this code could be injected into the running program and compromise security of data and code associated with the program. Accordingly, securing data stored in stack can be highly desirable to avoid malware and other inadvertent or unintentional programming errors that can arise.

Fine-grained stack pointer encoding can solve these issues using new encoding techniques for stack pointers. Because stack has different properties than the heap (e.g., limited in size), the offset bits are limited because it requires fewer bits to represent the entire stack memory for a program. Accordingly, additional bits can be used in the pointer to create a strong encoding for the pointer. One or more embodiments described herein offer precise bounds control of an object stored in stack. Since the stack size is more limited, some of the upper address bits are fixed and do not change for different stack addresses. Therefore, a smaller number of bits can be used to represent an offset (e.g., 23 bits) and the upper address bits can be stored in memory or a register. In addition, some of the upper address bits that are fixed, along with precise size information of the memory allocation referenced by the pointer, can be encrypted using a tweak and an address key (also referred to herein as a "pointer key"). The tweak can include the variable base address (which can be fixed offset bits in the pointer) for a stack frame. The address key input for the encryption algorithm can be a dedicated address key generated for the particular running program (i.e., process) associated with the stack.

Figure 4:
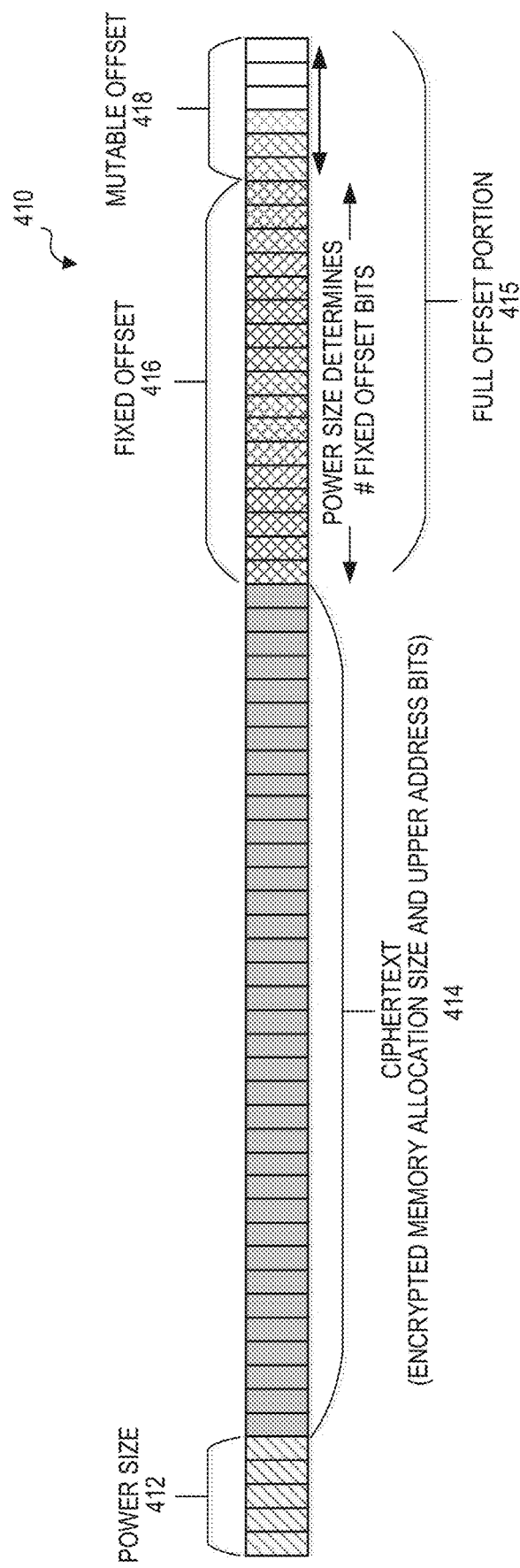
FIG. 4 is a diagram of an example pointer according to at least one embodiment of the present disclosure.

FIG. 4 is a diagram of an example pointer 410 for an object stored in stack according to at least one embodiment of the present disclosure. Stack objects are typically local variables that are used for a short amount of time during the execution of a program. Examples of data stored in stack can include, but are not necessarily limited to, local variable data, return addresses, and parameters for a function. Memory can be allocated for stack for a program when a program is initialized to run. A stack pointer can be generated and points to the top of the stack. Upper address bits in the stack pointer do not change during the program runtime, but the lower address bits (e.g., offset bits) can be changed depending on which stack frame is active. A new frame in the stack can be allocated for each function or subroutine that needs to use stack for its operations. A stack frame can store its own function or subroutine state information, local variables, return address information for its caller. In one example, the linear address for a particular stack frame, which may be encoded in a stack frame pointer) can include upper address bits that do not change during the program runtime, and lower address bits that point to the top of the stack frame, for example.

FIG. 4 shows a cryptographically encoded 64-bit pointer (address) for an object stored in a stack frame in its base format, using exponent (power) metadata. In the example shown, the encoded pointer includes a power size (exponent) metadata portion 412 (e.g., 5 bits in the example shown) indicating a size of an offset portion 418 (e.g., 6 bits in the example shown) of the pointer 410 (e.g., a number of low order address bits that comprise the offset portion 418 of the pointer 410, these bits may be manipulated freely by software for pointer arithmetic). In some embodiments, the power size metadata portion 412 may indicate a number of the offset bits based on a power of 2.

As shown in FIG. 4 the power size metadata portion 412 may indicate the number of bits that compose the immutable (or fixed) offset portion 416 and the mutable (or adjustable) offset portion 418. For stack, the total number of bits in full offset portion 415, which includes fixed offset 416 and mutable offset 418, may be a fixed number depending on the particular implementation and architecture. In one example, the offset portion includes 23 bits. The fixed offset 416 does not change for a function or program to which the stack frame belongs, while the mutable offset 418 may change depending on which object the linear address references.

In the encoded pointer 410, the total number of bits that make up fixed offset portion 416 and the mutable offset portion 418 may be constant, with the sizes of the respective portions being dictated by the power size metadata portion 412. For example, if the power metadata value is 0, there are no mutable offset bits. In this case, all 23 bits compose the fixed offset 416. As a further example, if the power metadata value is 1, then there is one bit of mutable offset portion 418, if the power metadata value is 2, then there are 2 bits of mutable offset portion 418, and so on, up to the total number of offset bits 415 (e.g., 23 bits) of mutable offset resulting in no fixed offset bits. The mutable offset 418 may be manipulated by software, e.g. for pointer arithmetic or other operations. An address in which all of the mutable offset bits are zero is the starting address for the power-of-two-aligned slot specified by the pointer. Other addresses with some non-zero mutable offset bits are addresses within the slot.

The ciphertext portion 414 (e.g., 32 bits in the example shown) of the pointer 410 may be encrypted with a small tweakable block cipher (e.g., a SIMON, SPECK, or tweakable K-cipher at a 32-bit block size, or other variable bit size tweakable block cipher). In one or more embodiments, the fixed offset portion 416 can be used as a tweak to generate ciphertext portion 414 from at least a portion of the upper address bits (e.g., 9 bits in the upper bits of the linear address, where this portion of the upper address bits is also called 'first upper address bits' herein) and a memory allocation size (e.g., 23 bits) for the object referenced by pointer 410. Ciphertext portion 414 can be adjacent to and include more significant bits relative to the fixed offset portion 416.

Some address bits compose the fixed offset portion 416 (e.g., 17 bits in the example shown) and may be used as part of the tweak for a tweakable block cipher used to encrypt the ciphertext portion 414. While these bits are also a plaintext (non-encrypted) portion of the address, they cannot be modified by software (e.g. pointer arithmetic) like the bits of mutable offset 418 without causing the ciphertext portion 414 to decrypt incorrectly. The base pointer format shown in FIG. 4 allows for cryptographically precisely defining the bounds of objects and their location in stack. In some cases, the exponent/power size metadata portion 412 could be provided as a separate parameter in addition to the pointer; however, in some cases (e.g., as shown) the bits of the power size metadata portion 412 may be integrated with the pointer 410 to provide legacy compatibility in certain cases.

It should also be noted that in an alternative implementations, the power size metadata portion 412 may indicate the number of bits that compose the fixed offset 416, and thus dictate the number of bits remaining to make up the mutable offset 418. For example, if the power metadata value is 0, there are no fixed offset bits (e.g., 416) and all 23 offset bits may be manipulated by software. As a further example, if the power metadata value is 1, then there is one bit of fixed offset, if the power metadata value is 2, then there are 2 bits of fixed offset, up to the maximum number of offset bits (e.g., 23 bits), resulting in no mutable offset (e.g., 418), and thus, no bits that can be manipulated by software.

Also, although pointer 410 is illustrated and described based on using 32 bits for the ciphertext portion 414, the pointer format is not intended to be so limited. The address slice to be encrypted may be selected based on readily available 32-bit block encryption ciphers. However, an encryption cipher using any other block size (e.g., 27, 16, variable, etc.), may be used instead. If the number of ciphertext bits is adjusted (upward or downward), the remaining address bits to be encoded (e.g., fixed and mutable offset portions) may be adjusted accordingly.

In one or more embodiments, power size metadata portion 412 of pointer 410 may accommodate special values to indicate how the pointer 410 is to be handled by software using the pointer. In one embodiment, special values may be defined to indicate that the pointer is to be treated as a conventional or legacy pointer (e.g., not as a cryptographically encoded pointer). For example, reserved values 11111 and 00000 may indicate the pointer is a conventional or legacy pointer (as these are the legacy non-canonical encodings for the upper linear address bits between user and supervisor space). Any other values can indicate that the pointer is encoded as a cryptographically encoded pointer. Thus, both types of pointers (e.g., conventional and cryptographically encoded) can potentially be used in the same address space. In other embodiments, one or more of the most significant bits in a cryptographically encoded pointer may be reserved to indicate the whether the pointer is a legacy pointer or a cryptographically encoded pointer. For example, the two most significant bits may be encoded as reserved bits. When the reserved bits have the same value, this indicates that the pointer is a legacy pointer. In yet another embodiment, the two most significant bits may be encoded as a tag/version number (e.g., random or deterministically different value).

When a processor is running in a cryptographic mode and accessing memory using an encoded pointer (address) (e.g., a pointer formatted in the same or similar manner to pointer 410 of FIG. 4) to get the actual linear/virtual address memory location, the processor takes the encoded address format and decrypts the ciphertext portion (e.g., 414 of FIG. 4) using the variable number of fixed offset bits (e.g., 416 in FIG. 4) determined by the power size/exponent metadata bits (e.g., 412 of FIG. 4) and a secret key. In some instances, the power size/exponent metadata 412 and/or other metadata or context information may be included as part of the tweak for decrypting the ciphertext portion 414 (also referred to herein as "address tweak"). If the address decrypts incorrectly, the processor may cause a general protection fault (#GP) or page fault due to the attempted memory access with corrupted linear/virtual address.

As used herein, "context information" is intended to include any metadata or other information related to a memory allocation, its associated memory address, its associated pointer, the software for which the memory was allocated, and/or the contents of the allocated memory. For example, context information may include, but is not limited to, one or more of a size indicating the number of bits that compose fixed and mutable offset portions of a pointer, a tag containing randomized bits associated with the memory address, permission information indicating access permissions for the data stored in the allocated memory, a version number of a pointer that may be used for reassigning/revoking pointers that were previously assigned to a program, a type or class of the data stored in the allocated memory, a privilege level indicating a user or supervisor mode of the software for which the memory was allocated, and a crypto (cryptographic) context identifier including a randomized or deterministically unique value for a memory address. One or more pointer encoding embodiments may use any single item of context information as part of a tweak (address tweak or data tweak), or may use any suitable combination of context information items.

Context information may be stored in any type of storage, which may be based on particular needs and implementations. For example, one or more items of context information may be embedded in a standard-sized (e.g., 64-bit) pointer, such as pointer 310. In this scenario, the context information may be stored in the upper most bits in place of, or in addition to, the power size metadata. Other example types of storage for context information include, but are not necessarily limited to embedding the context information in a pointer that has been enlarged to fit more or bigger tweaks (e.g., a 128-bit pointer, a 265-bit pointer, etc.), embedding the context information within another operand that is provided to the pointer encryption instructions and to the data access instructions, and/or storing the context information in a control register. A control register may be automatically selected by an instruction to be used as a crypto input (e.g., if there is just one register storing that type of tweak). Otherwise, a control register may be selected using some other instruction operand such as a field in the pointer itself or in a context operand supplied with data access instructions (e.g., special load and store instructions) configured for the particular operand encoding embodiment. For example, an index field of an access instruction could be used to select a register containing a key or tweak for the data (or code). Generally, for tweaks that are only updated when switching contexts, the item(s) used for the tweak may be especially suited for storage in a register. Other tweaks that are more closely associated with a particular pointer may be more suitable for being embedded in the pointer or passed in an instruction operand. As previously noted, however, any item of context information may be embedded or stored in any type of storage.

Figure 5:
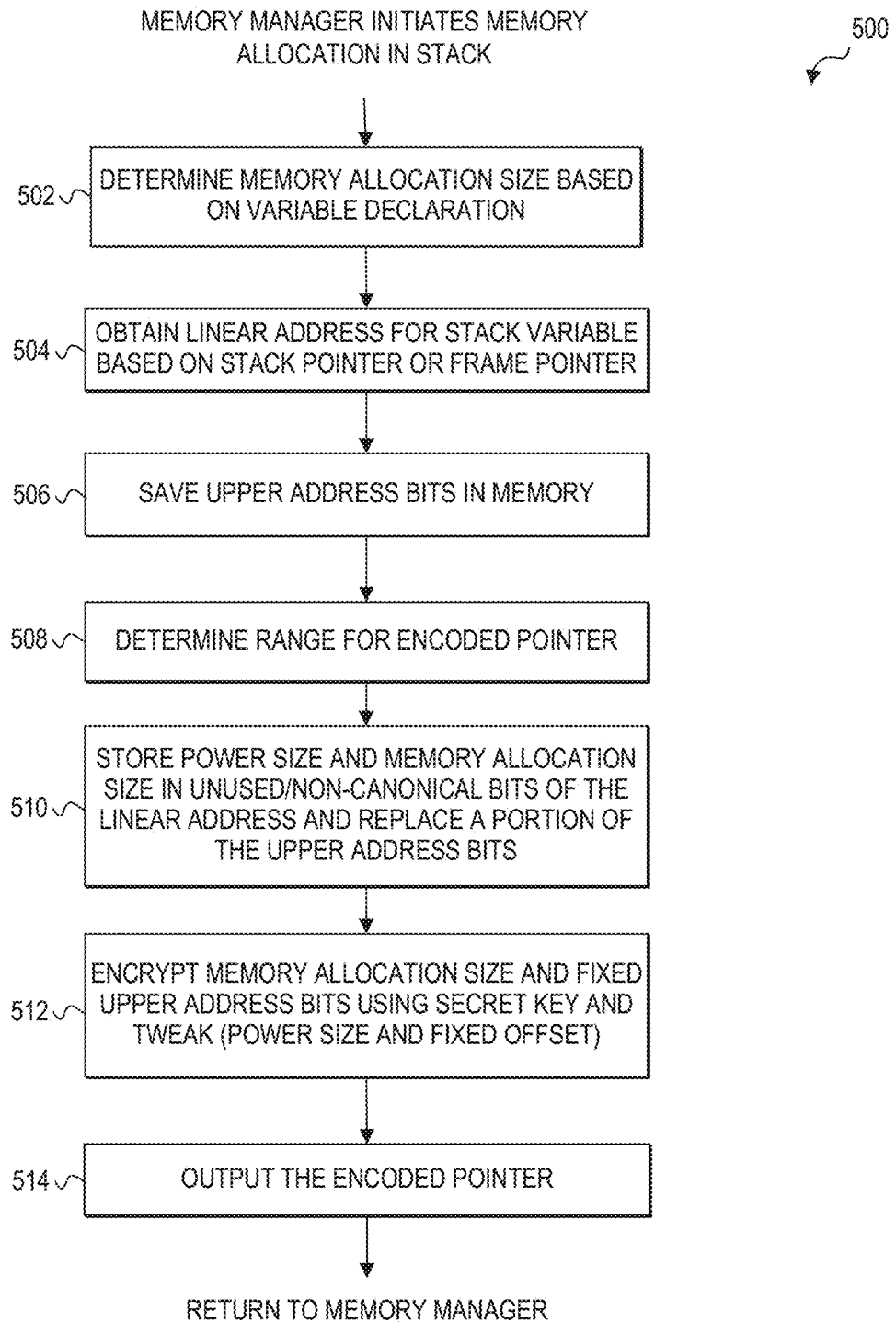
FIG. 5 is a simplified flow diagram of at least one embodiment of a process for providing security for a pointer according to an embodiment.

Referring now to FIG. 5, FIG. 5 is a flow diagram 500 illustrating example operations for securing a pointer (e.g., linear address to an object in stack) is shown. An object can be any data that can be stored in memory and manipulated by a program. Examples of objects include, but are not necessarily limited to, data structures, data composites, data elements (e.g., may be within a data structure or data composite), which include any type of primitives or non-primitives. Portions of the process 500 may be executed by hardware, firmware, and/or software of the computing device 100 (e.g., by the processor 102 executing the address encoding/encrypting logic 152, address cryptography unit 104, 302).

The process may begin in response to an implicit memory allocation in a program for an object to be stored in stack memory. Examples of an implicit memory allocations include, but are not necessarily limited to, memory allocations for local variables, return addresses to a calling program or function, parameters passed to functions or programs. In one example, a program may declare a local variable, and the memory can be automatically allocated on stack for the variable without an explicit request in the program code.

At 502, the size of memory allocation is determined and can be based on the particular variable for which memory is requested. If other metadata is needed to encode the pointer, that metadata may also be obtained. At 504, a linear address to a variable base address in stack where an object is to be stored is obtained. The linear address can be obtained based upon the current stack pointer or frame pointer. The linear address can reference a location in stack, within the current (or active) stack frame.

At 506, the upper address bits of the linear address can be saved in memory. For example, the upper address bits may include all of the address bits that are more significant than the fixed offset. The upper address bits can be saved in registers or can potentially be encrypted and saved in lower level memory.

At 508, range metadata to define the number fixed and mutable offset bits is determined. In some embodiments, the range metadata includes a power or "exponent" to determine the 2's power of the memory range size (effectively determining the number of fixed and mutable offset bits). In some cases, an "adjustment" is used to force values to the end of the 2's power range. In other embodiments, the adjustment may be used to force the buffer to the beginning of the 2's power range when buffer "underflow" needs to be addressed (as opposed to buffer "overflow"). Using the exponent metadata, any 2's power memory range can be defined (e.g., 2, 5, 8, 16 . . . 2^64).

At 510, the power metadata and the memory allocation size can be stored in the non-canonical bits of the linear address and may replace a portion of the upper address bits. For example, a predetermined number of upper address bits (e.g., 9 bits) may be used to generate the ciphertext portion 414 of an encoded pointer. Accordingly, the power metadata and memory allocation size can be stored in bits that are higher than these first upper address bits to be included in the encryption to generate the ciphertext. Although not shown in FIG. 4, some additional reserved bits (e.g., 2-4 bits) may be used for other purposes as previously described herein (e.g., legacy encoding, tag metadata, version metadata).

At 512, the upper address bits in the pointer along with the memory allocation size metadata may be encrypted using a secret address key and an address tweak. An address key may be a key that is defined for a particular running program (or process) to be used for pointer address encryption and decryption. The key may be created in any suitable manner as described herein.

As used herein, a "tweak" may refer to, among other things, a second input to a block cipher, in addition to the usual plaintext or ciphertext input and the key (e.g., the secret key 116(1)-116(N)). In at least some embodiments, a tweak may compose all or part of an initialization vector (IV) for a block cipher. Encrypting the memory allocation size metadata along with a portion of the upper address bits of the linear address enables the computing device 100 to detect when the pointer has been illegally changed, because the encryption algorithm will cause the illegally-changed bits to produce a random sequence of bits that are non-deterministic to an adversary, which likely results in a fault when the illegally-changed pointer is used.

In at least one embodiment, the portion of the pointer to be encrypted (e.g., the memory allocation size and some portion of upper address bits) is encrypted using a cipher mode encryption algorithm, such as a tweakable block cipher, using the fixed offset (e.g., 416) and the power metadata (e.g., 412) as a tweak. The fixed offset may be padded with zeros to provide a complete initialization vector input for the block cipher Some examples of tweakable block ciphers include: K-cipher, XOR-encrypt-XOR (XEX), Liskov, Rivest, and Wagner (LRW), and XEX-based tweaked-codebook mode with ciphertext stealing (XTS). Other bit diffusion methods in which any single bit change in the cipher text results in changes across the entire decrypted plaintext can be used. If desired, alternative embodiments can trade off security for performance by using non-cryptographic methods that still achieve reasonable bit diffusion analogous to a block cipher.

In some embodiments, the cipher has sufficient bit diffusion so that any bit change made to the encrypted address bits will equally affect (cascade through) all bit positions when decrypted. This provides the basis for a corrupted address given any change or bounds violation. Using this method, if the adversary attempts to tamper with the metadata (e.g., the exponent or adjustment values, or the encrypted most significant bits) the resulting decoded address will be corrupted. In the 64-bit address space, address corruption will result in a fault with high probability, thus allowing the address corruption (and pointer access or bounds violation) to be caught by the privileged system component 142 (e.g., an operating system/executive/VMM/ alternative mode/debug trace/management processor/subsystem, etc.).

At 514, once the appropriate metadata and the portion of upper address bits have been encrypted in the pointer, the resulting cryptographically encoded pointer can be returned to the memory manager to be for accessing the object used in the program. The output may be an encoded pointer that may be the same or similar to encoded pointer 410, for example.

Figure 6:
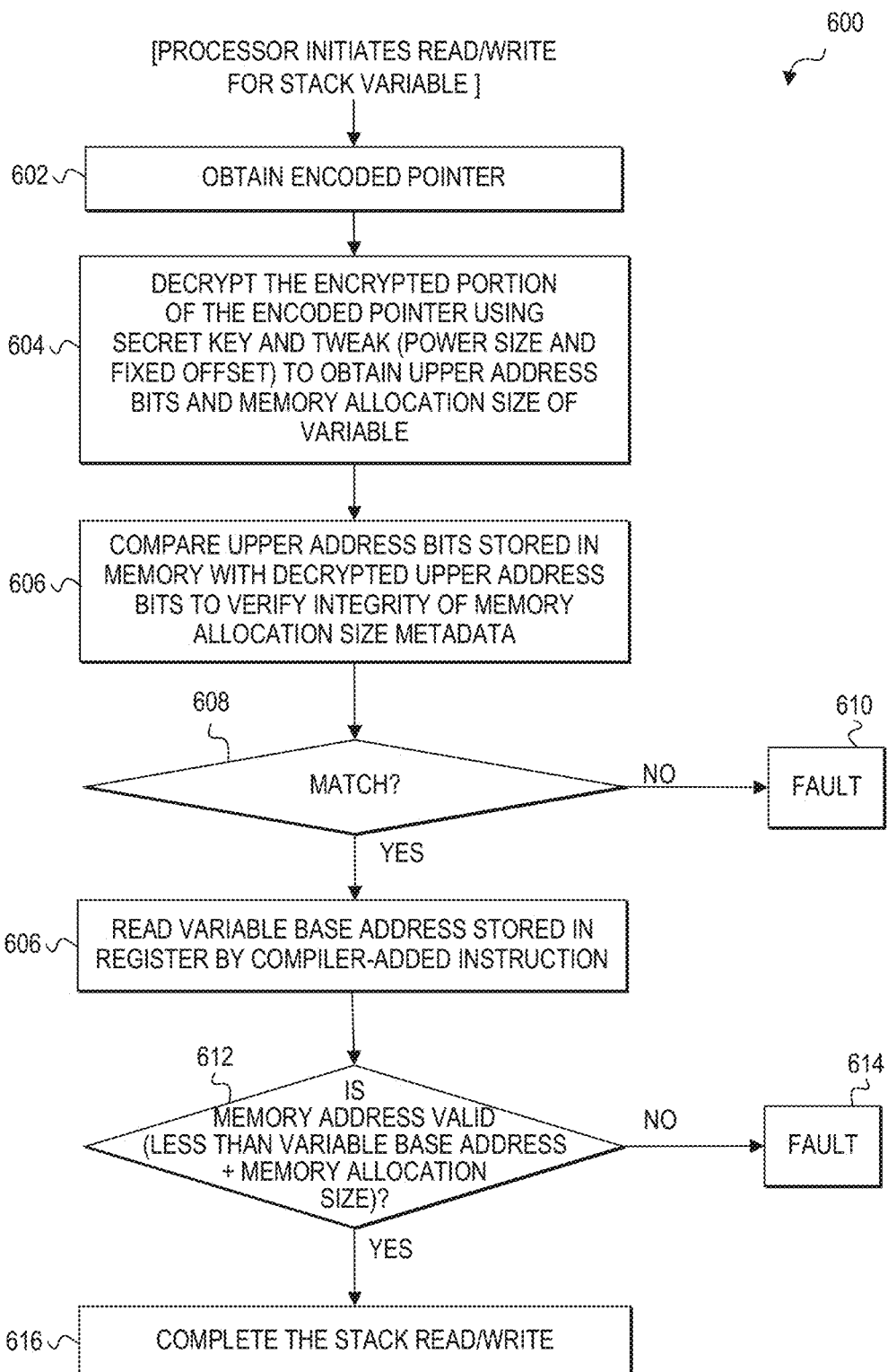
FIG. 6 is a simplified flow diagram of at least one embodiment of a process for verifying a previously encoded pointer according to an embodiment.

Referring now to FIG. 6, an example process 600 for decoding an encoded pointer is shown. Portions of the process 600 may be executed by hardware, firmware, and/or software of the computing device 100 (e.g., by the processor 102 executing read or write (e.g., PUSH/STORE or POP/LOAD) instructions of a program and/or the address decoding/decrypting logic 154, address cryptography unit 104, 302). Process 600 may begin in response to an implicit memory access request in a program for an object to be stored into stack memory (e.g., pushed) or read from stack memory (e.g., popped). Examples of a memory access request include, but are not necessarily limited to PUSH and POP instructions in program code.

At 602, the encoded pointer (e.g., the encoded address 206, which may be obtained from a register 110) to a memory location associated with the memory access request is obtained. At 604, the encrypted portion of the encoded pointer is decrypted using the same secret address key and address tweak as used to perform the encryption at 512 of FIG. 5. The decryption generates data that includes the memory allocation size for the variable referenced by the pointer, and a portion of the upper address bits of the linear address encoded in the pointer.

At 606, the decrypted portion of upper address bits are compared to the corresponding portion of upper address bits that were stored in memory when the pointer was encoded, for example at 506 of FIG. 5. If the decrypted portion of upper address bits match the stored portion of upper address bits, this serves as a verification that the memory allocation size metadata has not been corrupted. At 608, a determination can be made as to whether the comparison indicated a match. If the decrypted portion of upper address bits and the stored portion of upper address bits do not match, then at 610, a fault can be raised.

If it is determined that the decrypted portion of upper address bits and the stored portion of upper address bits match at 608, then at 612, a determination can be made as to whether the memory address (i.e., linear address decoded at 604) is within the bounds allocated for the variable. For example, a check can be performed to determine whether the linear address is less than the variable base address plus the memory allocation size. This is because the variable owns the data (e.g., data element, data structure, etc.) residing from the variable base address to the variable base address plus the memory allocation size of the variable (e.g., <base address, base address+size>). In one example where the variables are not aligned, the variable base address of the memory allocation may be stored in a register as a result of a compiler-added instruction. In this example, a compiler may be modified to emit code to load the variable base address before the variable is used. Thus, when an instruction attempts to access the variable, the cryptographically encoded pointer can be decrypted and decoded to obtain the linear address and the memory allocation size. If the variables are aligned, however, the variable base address does not need to be passed to the processor during pointer decoding.

A verification that the linear address is valid can be performed at 612 before the memory access request is performed. If it is determined that the memory address is not valid (e.g., if the linear address is not less than the variable base address+memory allocation size), than at 614, a fault can be raised. Otherwise, at 616, when both the integrity check and the check on the bounds of the memory allocation succeed, the read or write (e.g., pop/load or push/store) request can be completed.

Figure 7:
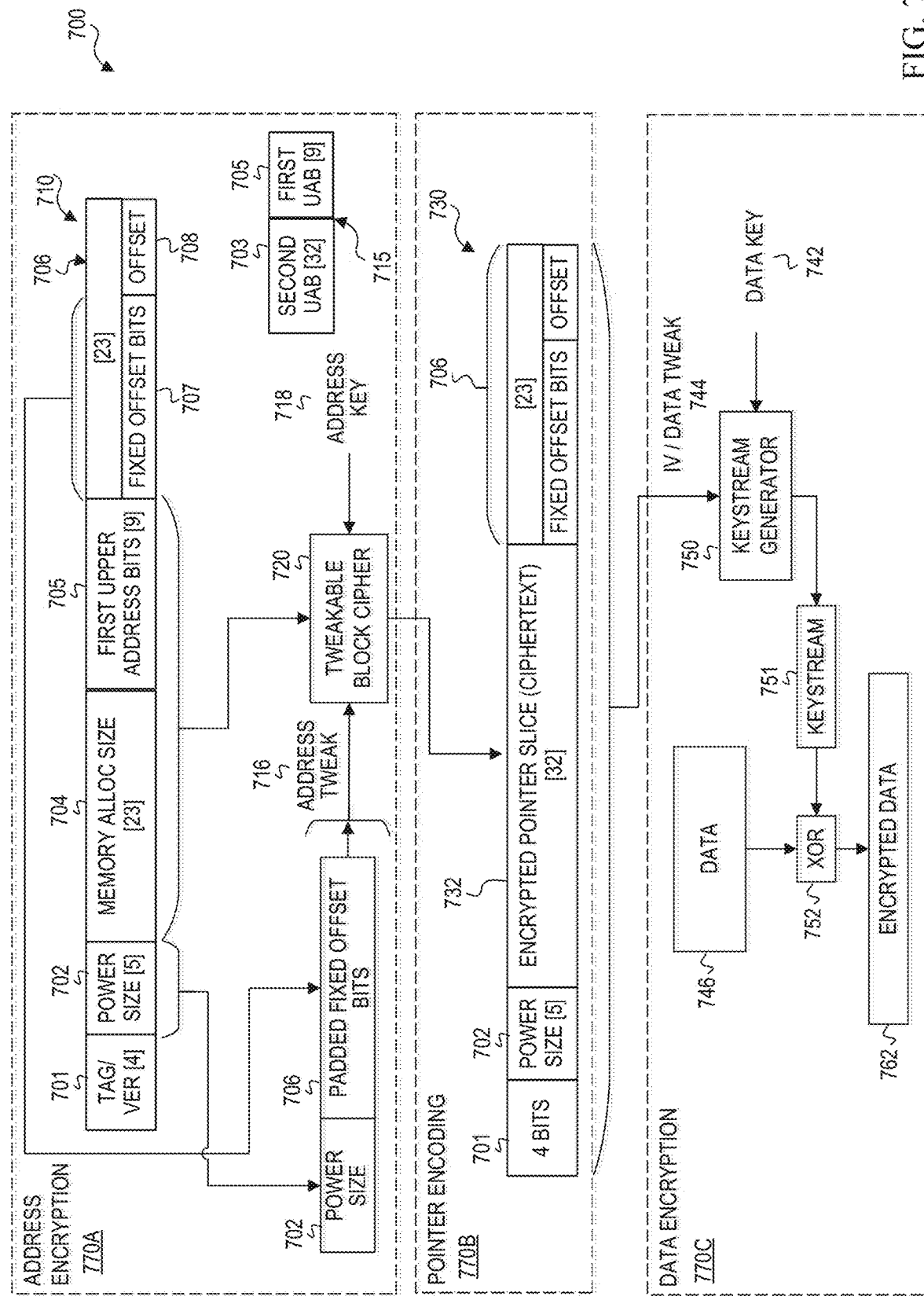
FIG. 7 is flow diagram illustrating an example process of binding one embodiment of a cryptographically encoded pointer to the encryption of a variable referenced by that pointer according to at least one embodiment

FIG. 7 is a more detailed flow diagram illustrating an example process 700 of generating a cryptographically encoded pointer 730 (also referred to herein as "encoded pointer") from an unencoded pointer 710 containing at least a portion of a memory address (or linear address) and other metadata, and binding the cryptographically encoded pointer 730 to encryption of data referenced by the pointer. Encryption of the data is bound to the contents of the pointer according to at least one embodiment. At least some portions of process 700 may be executed by hardware, firmware, and/or software of the computing device 100. In the example shown, pointer 710 is embodied as a 64-bit encoded linear address (before any cryptographic functions are performed) including a 4-bit tag/version portion 701, a 5-bit power size metadata 702, a 23-bit memory allocation size 704, a 9-bit first upper address bits 705, and a plaintext portion 706 of the memory address. Plaintext portion 706 can include a variable-bit fixed offset portion 707, and a variable-bit mutable offset portion 708. In some embodiments, the memory allocation size 704 may be made smaller than the combination of the fixed offset bits 707 and the offset bits 708 to fit a lower limit field within the pointer. The lower limit may be added to the starting address of the power-of-two-aligned slot specified by the pointer to compute the variable base address. Both the memory allocation size 704 and the lower limit may be multiplied by some power of two determined by the power size such that the maximum size and limit can be specified for large allocations.

When an encoded pointer 730 is cryptographically encoded for the first time, an instruction to encrypt and encode the pointer 730 (e.g., EncryptPtr instruction) may be used. The instruction can be configured to accept the base address of the memory allocation and the exact size of the memory allocation (e.g., memory allocation size 704) as operands. The power size 702 may be derived from these operands.

In this embodiment, the encoded pointer may not have enough room to carry all of the memory address bits. Therefore, upper address bits 715 (which do not change for the stack memory) of the memory address may be stored in a register or other memory to be combined with fixed offset bits 707 and offset 708 when encoded pointer 730 is decoded to form a linear address that can be used for memory accesses. Upper address bits 715 include first upper address bits 705 and second upper address bits 703. The first upper address bits 705 are also stored in unencoded pointer 710 and are encrypted to form part of the encrypted pointer slice 732 of encoded pointer 730. The first upper address bits 705 that are encrypted as part of encrypted pointer slice 732 may be used as an integrity check during memory access operations to verify the integrity of the encrypted pointer slice 732 by comparing the decrypted first upper address bits from the with the corresponding first upper address bits 705 stored in memory. By verifying the integrity of encrypted pointer slice 732, the integrity of memory allocation size 704 can also be verified.

Generally, pointer 710 can be used to generate a cryptographically encoded pointer having a similar configuration to other cryptographically encoded pointers described herein (e.g., 410). However, pointer 710 includes a tag/version portion 701, which may be a random or deterministically different value. In other embodiments, the four upper bits may be reserved bits that allow cryptographically encoded pointers to be used concurrently with legacy pointers. For example, the most significant bit can be used to indicate whether the address is located within the supervisor address space (e.g., "1") or within the user mode address space (e.g., "0"). The next most significant bit can be set to the opposite value of the supervisor bit to indicate that the pointer is cryptographically encoded or can be set to the same value of the supervisor bit to indicate that the pointer is not cryptographically encoded. In other embodiments, the legacy encoding may be achieved without dedicated reserved bits. Instead, legacy encoding can be achieved by encoding particular values in the power size metadata portion 702 (e.g., all 1s, all 0s). If the pointer 710 includes the tag/version portion 701, then these bits may also be encoded with the particular values (e.g., all 1s, all 0s) to allow legacy and conventional encoding to be used concurrently. In yet other embodiments, legacy encoding may be eliminated entirely if, for example, the concepts are not implemented to be compatible with legacy programs.

It should be noted that the power size metadata portion 702 may not be encrypted as it is used to determine the number of bits in the mutable and fixed plaintext portions of the pointer and, therefore, the number of bits used in the address tweak (e.g., fixed offset portion 706). The tag/version portion 701, however, is not used to determine the size of the address tweak. Therefore, the tag/version portion 701 may alternatively be included as part of the encrypted portion of the address (i.e., ciphertext 732) as long as the tag/version portion 701 is not used in the address tweak. In this alternative embodiment, the block cipher would have a correspondingly larger block size to fit the tag/version portion, or the address bits included in the ciphertext would be reduced and a corresponding number of address bits would be included in the plaintext portion (i.e., 706 and 708). Additionally, it should be noted that, although the process 700 is illustrated with the encoding shown in pointer 710, which includes a tag/version (or reserved bits) portion 701, process 700 could be performed with other pointer encodings having a power size metadata portion such as pointer 710, which does not include a tag/version (or reserved bits) portion, or which includes different metadata. In this scenario, the tag/version (or reserved bits) portion may simply be eliminated from the address tweak.

The operations of process 700 are identified in three phases: address encryption 770A (Phase I), pointer encoding 770B (Phase II), and data encryption 770C (Phase III). In Phase I, a portion of the unencoded pointer 710 (also referred to herein as "pointer slice") may be encrypted. In this example, the memory allocation size 704 and the first upper address bits 705 embedded in the unencoded pointer 710 are encrypted by a cryptographic algorithm such as a tweakable block cipher 720 using an address key 718 and an address tweak 716. The address tweak 716 can comprise multiple address encryption factors. In one example, a first address encryption factor could include the power size metadata portion 702, and a second address encryption factor could include fixed offset portion 706 which may be padded with zeros. It should be apparent that other context information could also be used in one or more embodiments as additional address encryption factors and may be added as part of address tweak 716 or as a separate input for the cryptographic algorithm.

In some embodiments, the address tweak 716 can also include bits of tag/version portion 701. The power size metadata portion 702 is used to determine the number of bits in fixed offset portion 706 and the number bits in mutable offset portion 708, which equals the number of bits for zeroes padding in the address tweak 716. In at least some embodiments, an additional one or more items of variable length metadata may also be used as part of address tweak 716 for the tweakable block cipher 720. For example, the variable length metadata may include other context information or metadata (e.g., permissions, privilege level, type, location, ownership, etc.) as previously described herein. In yet further embodiments, a crypto context identifier register may be used as part of address tweak 716. The crypto context identifier register may contain a unique value (e.g., randomly or deterministically generated) associated with a particular functional group (e.g., processes, subset of processes, virtual machines (VM), subset of VMs, etc.). The block cipher 720 may be any suitable decryption algorithm (e.g., tweakable version of a 32 bit block size cipher such as SIMON, SPECK, K-cipher, or other variable block size cipher, or for larger addresses, PRINCE, XTS-AES block cipher, LRW, AES-CTR mode, etc. may be used) as noted herein.

When a ciphertext portion (encrypted pointer slice) 732 has been generated by encrypting selected portions of the unencoded pointer 710 (e.g., memory allocation size 704 and the first upper address bits 705), then an encoded linear address (or encoded pointer) 730 can be formed in Phase II at 770B. In at least one embodiment, the uppermost bits (e.g., tag/version portion 701 and power size portion 702) can be set to the same bit value (e.g., 0 or 1). In addition, the bits of the fixed offset portion 706 and mutable offset portion 708 make up the lower bits of the encoded pointer 730. Generally, the cryptographically encoded pointer 730 has a similar configuration to other cryptographically encoded pointers described herein (e.g., 310). However, as previously described, encoded pointer 730 optionally includes a tag/version portion 701, which may be a random or deterministically different value.

In at least one embodiment, the cryptographically encoded pointer 730 can be used as a data tweak for data 746 to be encrypted and stored on stack. Data 746 could include any type of data such as data elements, data structures, data composites, objects, arrays, linked lists, integers, shorts, longs, floating point values, and any other value that can be stored and manipulated by program code.

The data 746 to be pushed to stack is encrypted by a cryptographic algorithm such as keystream generator 750. In at least one embodiment, keystream generator 750 can be implemented as an AES-CTR mode block cipher, at a particular size granularity (any suitable size). In one example, inputs to the keystream generator 950 can include a data key and a data tweak. The data tweak 916 can comprise multiple data encryption factors.

In one example, a data encryption factor could include at least a portion (and possibly all) of the encoded pointer 730, which references the data 746 to be encrypted. In this embodiment, the contents of the cryptographically encoded pointer are used as the initialization vector (IV) or data tweak 744, with the mutable offset (e.g., 708) being used as the counter value (CTR). Keystream generator 750 encrypts data tweak 744 based on a data key 742 to generate a keystream 751. Data encryption may be indirectly bound to the values of the modified mutable offset bits, since those bits may be incorporated in the tweak used to generate an encrypted pointer slice (ciphertext) 732.

If the data to be encrypted crosses one or more block-aligned boundaries, the keystream generator 750 may be re-invoked for the subsequent blocks with the data tweak 744 being increased by an amount equal to the block size each time that it is re-invoked. A suffix of the generated keystream 751 may be unneeded and thus discarded. A logic function 752 (e.g., an XOR operation or other suitable operations or combinations thereof) may then be performed on keystream 751 and an input data block (or cache line) 746 selected from the data in a processor register. The granularity of the input data block 746 matches the keystream 751 output from of the keystream generator 750, and the logic function 752 produces an encrypted output data block 762.

The encrypted data 762 can be written (e.g., stored, pushed, copied, moved, transferred, etc.) to memory based on the linear address encoded in the cryptographically encoded pointer 730. Thus, while the cryptographically encoded pointer is being generated, the decoded linear address may be stored in a register, for example, until the write operation is completed. The stored, encrypted data 762 can subsequently be retrieved from memory by decoding the cryptographically encoded pointer 730 to obtain the decoded linear address, and then using the decoded linear address to load/pop/read the encrypted data 762. The encrypted data 762 can then be decrypted using the same data key 742 and data tweak 744 that was used during encryption.

When a read operation is performed, the same operations shown in FIG. 7 can be performed on an encoded pointer (instead of unencoded pointer 710) and encrypted data (instead of unencrypted data 746) to achieve an opposite result. The encrypted pointer slice 732 can be can be decrypted by tweakable block cipher 720 using address key 718 and a tweak that includes fixed offset bits 707 and power size 702 both from the encoded pointer 730. The resulting decrypted first upper address bits can be combined with second upper address bits 703 stored in memory, the fixed offset bits 707, and the offset 708 to form a decoded linear address. The decoded linear address can be used to fetch encrypted data referenced by the linear address. The encrypted data can be read from cache/memory and the same operations can be performed. The encoded pointer 730 (or a portion thereof) can be used as a tweak input into keystream generator 750, along with data key 742. Keystream generator 750 can produce a keystream output 751, and the encrypted data from a processor register may be XORed with (or other appropriate logic functions performed) the keystream output 751 for the encoded pointer 730 and the resulting decrypted data loaded into a register.

Figure 8:
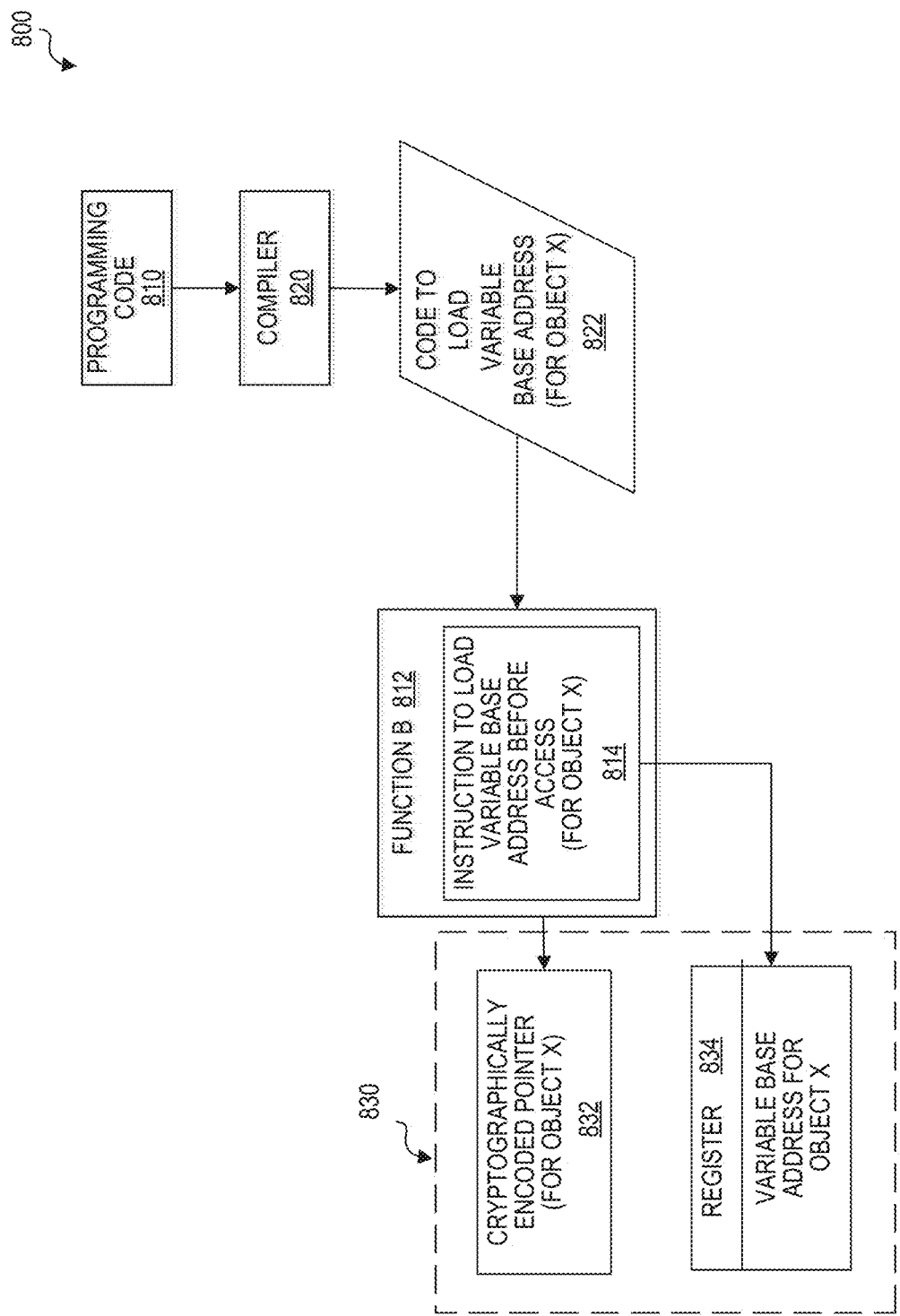
FIG. 8 is a simplified block diagram illustrating a compiler embedding information into compiled code according to at least one embodiment.

FIG. 8 is a simplified block diagram that illustrates a compiler flow 800 for embedding an instruction into compiled code according to at least one embodiment. As shown in flow 800, in one or more embodiments, a compiler 820 can be enhanced to pass a variable base address that is stored in stack. In compiler flow 800, software programming code 810 may be provided to compiler 820. The programming language to produce the programming code may any suitable programming language based on particular needs and implementations, including for example, C++, Rust, Swift, etc. Compiler 820 knows a priori the variable base addresses that are allocated in the programming code 810 and its associated functions, such as function B code 812. Compiler 820 can determine where variable data, such as object X, is accessed in the programming code 810 or its functions and can emit code 822 to load the variable base address of the object X before object X is accessed by another instruction in the code.

An example is illustrated for Function B code 812 and operations that may be performed at 830 when the compiled code is executed. For example, if Function code B 812 declares object X as an integer and subsequent code that uses object X in an arithmetic operation, the compiler 820 may emit a load instruction (e.g., 822) into the compiled code 812, just prior to the arithmetic instruction, to load the variable base address of object X into a register. When Function B code 812 is executed, an instruction that declares a variable (e.g., for object X) causes the creation of a cryptographically encoded pointer 832 that can be used to access object X at the variable base address. Subsequently, just prior to another instruction that uses object X, a load instruction that was added by compiler 820 may load the variable base address of object X into a register 834. The subsequent instruction that accesses object X can use the variable base address stored in register 834 to perform a check on the bounds for object X to ensure that the linear address encoded in the cryptographically encoded pointer is valid (e.g., 512).

In other embodiments, the code emitted by compiler 820 may include store instruction to store the variable base address to memory, rather than a register, or to other memory in the memory hierarchy.

One or more embodiments of pointer encodings disclosed herein can provide fine-grained protection in both stack and heap memory allocations. For example, data structures containing multiple data elements can be allocated in heap and/or stack. Arrays, linked lists, and composite structures containing subfields, are a few nonlimiting examples of data structures that can contain many data elements for which individual memory access may be desirable. Within a given data structure, multiple types of data may be defined. For example, individual data elements within a character array, may include an integer, followed by a character, followed by floating point number, and so on. In some scenarios, it may be desirable to access and protect individual data elements that are primitive data types such as characters, integers, short, long, float, double, etc. Current cryptographic pointer encoding can bind a pointer to the data structures using various pointer encodings, at least some of which are described herein, and more broadly described with reference to FIGS. 3A-3B. However, fine-grained access to, and protection of, the individual data elements using cryptographically encoded pointers to those individual data elements may be desired in some scenarios and implementations.

One or more embodiments using data type based encoding can enable fine-grained access and protection using cryptographically encoded pointers to variables within a data structure in either stack or heap allocated memory. The data access instructions that are used to access data can be leveraged to determine how the pointer to the data and/or the data itself gets encrypted and decrypted. This can be achieved when different data types are implicit in the instructions that access the data. For example, some instructions for primitive data types have variances for different data types, and those variances can be used to infer the data type of a data element being accessed or stored. For example, a move instruction (e.g., MOV) and arithmetic instructions (e.g., ADD, SUB, etc.) of Intel® x86 64 and IA-32 Architectures implicitly indicate a data type. In particular, the op code of an ADD instruction can be different depending on the type of data (e.g., short, int, and long) that is being accessed, where the types of data are differentiated by size. The default size specified by the opcode may also be modified by an operand size prefix in the instruction encoding. Other architectures may also specify implicit data sizes with instruction encodings. A 2-byte short variable may be added using an addw (add word) instruction, while an integer variable may be added using an addw (add word) instruction, and a long variable may be added using an addl (add long) instruction. Accordingly, when an object is accessed in a way that requires it to be moved out of or into memory, the particular instruction being used to perform the operation can be identified and based on the op code of that particular instruction, a data type of the data element being accessed can be inferred. The inferred data type can then be used for decrypting/encrypting the pointer and/or for decrypting/encrypting the accessed data. Various different instruction set architectures (ISAs) use different op codes depending on the data type of the data being accessed, any of which can be leveraged to implement data type based encoding as disclosed herein.

In another embodiment, prefixes can be added to some instructions and the prefixes can contain more precise data type information than what can be derived from an instruction itself. In addition, a prefix may also be used in some scenarios to override pointer encryption/decryption and/or data encryption/decryption. Thus, the source from which information is derived to perform pointer encryption and decryption and/or to perform data encryption and decryption can be expanded by one or more embodiments disclosed herein beyond a key and information derived from an encoded pointer to the data. One or more embodiments add a new source for tweaks to pointer encryption and decryption and/or to data encryption and decryption, where the source includes information derived from an instruction that is actually accessing the data.

It should be noted that data type based pointer encoding can also enable secure access and protection to any objects residing in heap or stack memory. As previously noted, as used herein, the term 'objects' is intended to include, but is not necessarily limited to, data structures (e.g., arrays, records, maps, unions, linked lists, etc.), data composites, data elements (which can include primitives or data structures or composites, etc.), data elements within a data structure or composite, primitives (e.g., Boolean, characters, floating point numbers, fixed-point numbers, integers, pointers, handles, enumerated types, etc.).

Figure 9A:
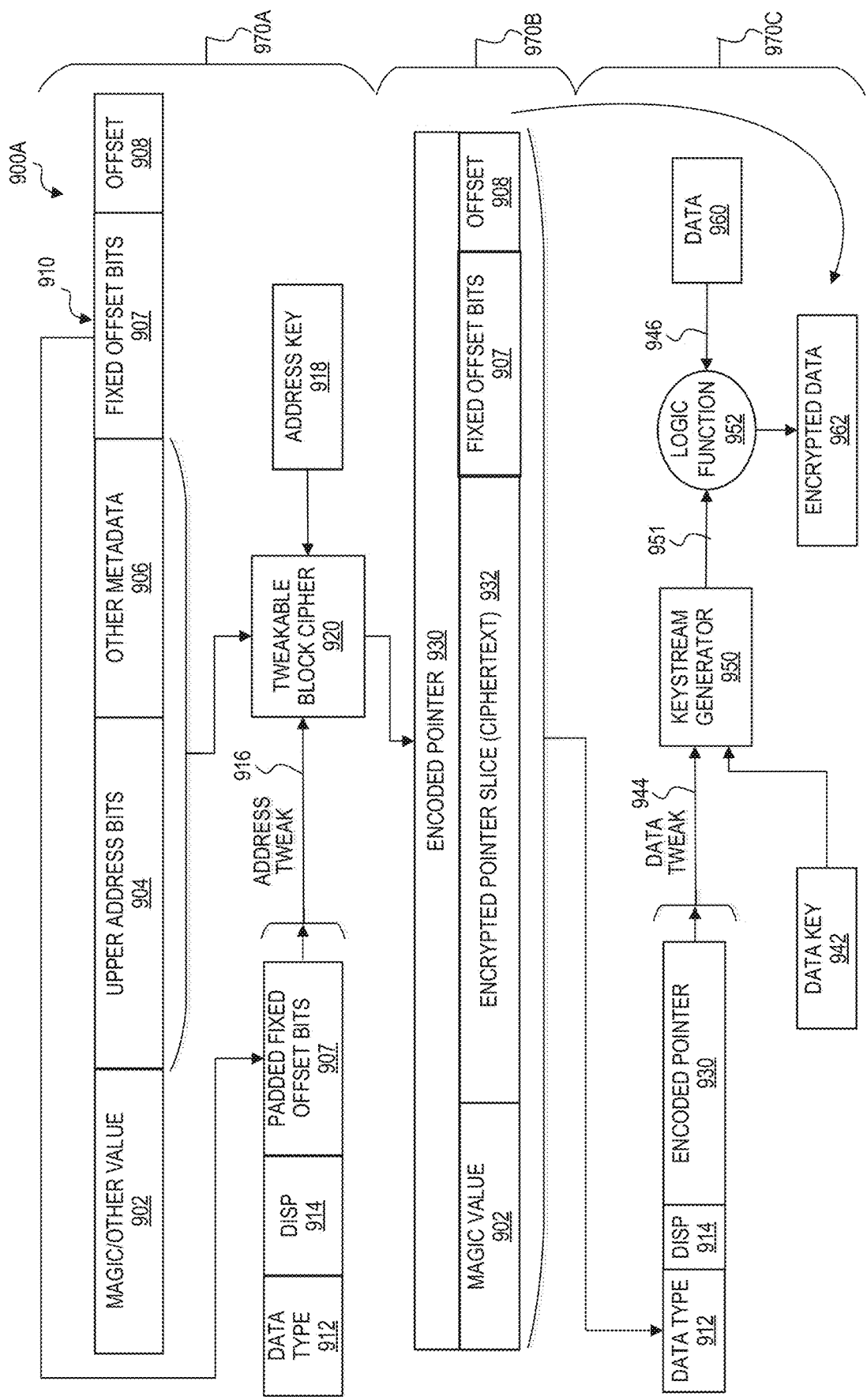
FIG. 9A is flow diagram illustrating an example process of binding a cryptographically encoded pointer to the encryption of the data referenced by that pointer according to at least one embodiment.

FIG. 9A is a more detailed flow diagram illustrating an example process 900A of generating a cryptographically encoded pointer 930 (also referred to herein as "encoded pointer") from an unencoded pointer 910 containing at least a portion of a memory address (i.e., a linear address) and other metadata, and binding the contents of the cryptographically encoded pointer 930 to encryption of data referenced by the pointer. Embodiments of encoded pointer 930 can be used to reference data stored in any available memory including both heap and stack. At least some portions of process 900A may be executed by hardware, firmware, and/or software of the computing device 100 (e.g., by the processor 102 executing the address encoding/encrypting logic 152, encryption store logic 156, address cryptography unit 104, 302, cryptographic computing engine 108). In the example shown, pointer 910 is embodied as a 64-bit encoded linear address including a magic/othervalue 902, upper address bits 904, other metadata 906, fixed offset bits 907, and a mutable offset p908.

Generally, power metadata (e.g., 702) or other size metadata (e.g., 704) may not be used in some embodiments when data type is bound to the encoded pointer. Binding data type of an object being referenced to an encoded pointer that references that object can enable detection of both malicious attempts to access data with the incorrect instruction and inadvertent programming errors when the wrong instruction is used for the wrong variable. Removing the power (or other size) metadata from the encoded pointer frees some bits in which other types of metadata can be encoded. For example, other metadata 906 may be added to the unencoded pointer 910. One example of other metadata is permissions, which can be useful for data pointers (when the encoded pointer references data) to indicate the permissions attributed to the executing code for performing certain accesses to the referenced data (e.g., read vs. write accesses). Although permissions metadata may offer some useful benefits particularly with code pointers, it is not the only option for encoding additional metadata and it should be apparent that any other type of constant metadata (e.g., a unique identifier) may be encoded.

In some embodiments, even when data type is cryptographically bound to an encoded pointer, it may still be beneficial to still include size metadata (e.g., power size metadata or memory allocation size) in the encoded pointer as will be further discussed below. In particular size associated with a data structure that contains multiple variables of different types may be advantageously included in the encoded pointer and bound to the pointer encryption and decryption and/or the data encryption and decryption.

Memory address bits are also encoded in the pointer. In this example, upper address bits 904, fixed offset bits 907, and a mutable offset 908 may be included. The upper address bits 904 and fixed offset bits 907 are separated by other metadata 906 in this example. It should be apparent that other arrangements and configurations are possible. For example, placement of the upper address bits 904 and other metadata 906 may be switched. Additional upper address bits may be stored in a register or other memory. Magic/other value 902 can also be provided to distinguish between different encoding types (e.g., stack pointer encoding, heap pointer encoding, legacy pointer, etc.), in at least some embodiments. In other encodings, the magic/other value 902 can hold different metadata or information. One example is a tag/version number.

The operations of process 900A are identified in three phases: address encryption (Phase I 970A), pointer encoding (Phase II 970B), and data encryption (Phase III 970C). In Phase I, a portion of the unencoded pointer 910 (also referred to herein as "pointer slice") may be encrypted. The portions of the unencoded pointer 910 to be encrypted can include any suitable combination of constant bits (i.e., ones that are not changed as the encoded pointer is used), including at least some of the memory address bits. In this example, the pointer slice to be encrypted includes the upper address bits 904 and other metadata 906 (e.g., permissions, unique identifier, size of data structure, or other context information). This pointer slice may be encrypted by a cryptographic algorithm such as a tweakable block cipher 920 using an address key 918 and an address tweak 916. The address tweak 916 can comprise multiple address encryption factors.

In one example, a first address encryption factor could be a numeric identifier for a data type 912, which is the data type associated with data stored at the memory address to be encoded in the encoded pointer 930. This may be used to prevent different data elements of different types from being accessed by an incorrectly typed instruction (e.g., a short instruction attempting to access an integer, a character instruction attempting to access a floating point number, etc.). For example, the memory address (or linear address) formed from upper address bits 904, fixed offset bits 907, and offset 908 correspond to a particular memory location and the data stored at that memory location is defined as a particular data type. When encoded pointer 930 is encoded for the first time, the data type 912 may be passed to the processor via an EncryptPtr instruction to indicate the data type for data referenced by that pointer. Subsequently, as the encoded pointer is decrypted and re-encrypted during data accesses, the data type 912 may be derived from the data access instruction that is using the encoded pointer 930 to access data at that memory location. In some instances, the data type can be inferred from an op code of the data access instruction. In other instances, the data type may be provided in a prefix to the instruction.

A possible second address encryption factor could include a displacement value 914. Displacement can come from the way memory addresses are constructed in certain architectures (e.g., Intel® X86 architecture). Memory addresses may be composed of a scale index base (SIB) form of operands. A register serves as the base, and another register serves as an index. The registers can be combined in a single memory address that can be used for accessing data structures such as arrays, where you have a base register that points to the beginning of the array and the index register that specifies the index within the array. That can be scaled by a factor (e.g., 1, 2, 4, 8, etc.) depending on the size of the array element. For a data structure that has multiple fields, a displacement may represent the offset of a particular field within the structure. Some memory operands may use an implicit value for one or more of those memory operand components, e.g. a displacement of 0 or an index of 0. To compute the final memory address that gets accessed, the displacement can be added to the initial base register and the scaled index if the structure is in an array. Thus, the displacement value is another attribute of the instruction encoding, as it gets encoded as a value into the instruction code stream (rather than being in a register or memory). The displacement value can be useful for encoding because it can prevent instructions that intend to access a second field within a structure from being misused to access a third field within the structure.

A third address encryption factor could be the fixed offset bits 907, which may be padded with zeroes. It should be apparent that other context information could also be used in one or more embodiments as additional address encryption factors and may be added as part of address tweak 916 or as a separate input for the cryptographic algorithm.

The encryption of the pointer slice (e.g., 904 and 906) can be achieved by a cryptographic algorithm (e.g., tweakable block cipher) with inputs that include address key 918 and address tweak 916. In one embodiment, the cryptographic algorithm may include a block cipher 920 that implements any suitable encryption algorithm (e.g., tweakable version of a 32 bit block size cipher such as SIMON, SPECK, K-cipher, or other variable block size cipher, or for larger addresses, PRINCE, XTS-AES block cipher, LRW, AES-CTR mode, etc. may be used).

When a ciphertext portion (encrypted pointer slice) 932 has been generated by encrypting selected portions of the unencoded pointer 910 (e.g., upper address bits 904, other metadata 906), then an encoded linear address (or encoded pointer) 930 can be formed in Phase II 970B. In at least one embodiment, the uppermost bits (e.g., magic/other value 902) can be set to the same bit value (e.g., 0 or 1). In addition, the bits of the fixed offset 907 and mutable offset 908 make up the lower bits of the encoded pointer 930.

In at least one embodiment, the cryptographically encoded pointer 930 can be used as a data tweak for data 960 to be encrypted and stored in heap or stack memory. Data 960 could include any type of data such as data elements, data structures, data composites, objects, arrays, linked lists, integers, shorts, longs, floating point values, and any other value that can be stored and manipulated by program code.

The data 960 to be stored is encrypted by a cryptographic algorithm such as a keystream generator 950. In at least one embodiment, keystream generator 950 can be implemented as an AES-CTR mode block cipher, at a particular size granularity (any suitable size). In one example, inputs to the keystream generator 950 can include a data key and a data tweak. The data tweak 916 can comprise multiple data encryption factors.

In one example, a first data encryption factor could include a data type (e.g., data type 912) and a second data encryption factor could include a displacement value (e.g., 914), both of which were previously described herein with reference to address encryption factors for address tweak 916. In addition, for data encryption (and decryption) a third data encryption factor could include at least a portion (and possibly all) of the encoded pointer 930, which references the data 960 to be encrypted. These data encryption factors (e.g., 912, 914, and 930) may be combined (e.g., concatenated) into a data tweak 944 as a single tweak input for the keystream generator 950 (e.g., tweakable block cipher). In other implementations, the data encryption factors may be provided as two or more tweak inputs into the keystream generator.

In one embodiment, the contents of the cryptographically encoded pointer 930 and the additional data encryption factors (e.g., 912, 914) are used as part of the initialization vector (IV) or data tweak 944 for keystream generator 950, with the mutable offset 908 being used as the counter value (CTR) for the block cipher. Keystream generator 950 encrypts data tweak 944 based on a data key 942 to generate a keystream 951. The value of data tweak 944 may be adjusted to be congruent to 0 (modulo the block size of the keystream generator 950) prior to being used as an input to the keystream generator. The value of the data tweak 944 may have some suitable number of least significant bits set to 0 to satisfy this requirement and a prefix of the keystream 951 may be discarded to account for that adjustment. The number of bytes of the keystream 951 to discard may be computed by subtracting the adjusted value of the data tweak 944 from the unadjusted value of the data tweak 944. This adjustment may modify the values of fixed offset bits 907 in pointers to objects smaller than the block size. However, the data encryption may be indirectly bound to the values of the modified fixed offset bits, since those bits may be incorporated in the address tweak used to generate ciphertext 932.

If the data to be encrypted crosses one or more block-aligned boundaries, the keystream generator 950 may be re-invoked for the subsequent blocks with the data tweak 944 being increased by an amount equal to the block size each time that it is re-invoked. A suffix of the generated keystream 951 may be unneeded and thus discarded. A logic function 952 (e.g., an XOR operation or other suitable operations or combinations thereof) may then be performed on keystream 951 and an input data block (or cache line) 946 selected from the data in a processor register. The granularity of the input data block 946 matches the keystream 951 output from of the keystream generator 950, and the logic function 952 produces an encrypted output data block 962.

The encrypted data 962 can be written (e.g., stored, pushed, copied, moved, transferred, etc.) to memory based on the linear address encoded in the cryptographically encoded pointer 930. Thus, while the cryptographically encoded pointer is being generated, the decoded linear address may be stored in a register, for example, until the write operation is completed.

It should be noted that, in some implementations, data type 912 and displacement value 914 may be used as both address encryption factors for the address tweak 916 and as data encryption factors for the data tweak 944. In other implementations, data type 912 and displacement value 914 may be used in either address tweak 916 or data tweak 944. In yet further implementations, either data type 912 or displacement value 914 is used in the address tweak 916 and/or the data tweak 944. Generally, any combination of this additional information from the data access instruction encoding can be used as a second source of input to bind encryption of one or both of encoded pointer 930 and the encrypted data 962 it references.

Figure 9B:
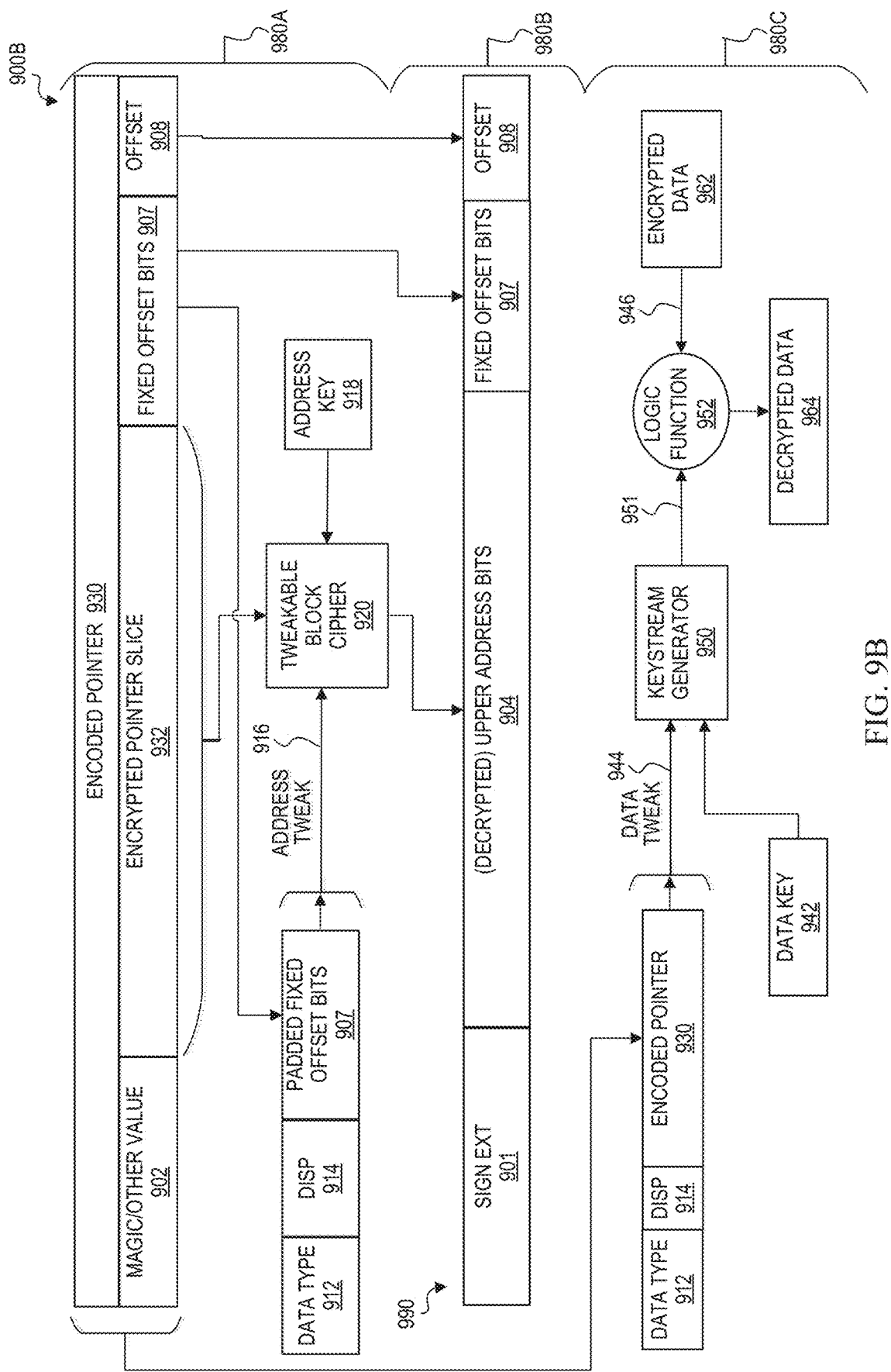
FIG. 9B is flow diagram illustrating an example decryption process for encrypted data that is referenced by a cryptographically encoded pointer according to at least one embodiment.

FIG. 9B is another detailed flow diagram illustrating an example process 900B of obtaining the data referenced by cryptographically encoded pointer 930, where encryption of the pointer and the data was described with reference to FIG. 9A. The data is bound to the contents of the encoded pointer 930 and to some additional information from a data access instruction according to at least one embodiment. At least some portions of process 900B may be executed by hardware, firmware, and/or software of the computing device 100 (e.g., by the processor 102 executing the address decoding/decrypting logic 154, decryption store logic 158, address cryptography unit 104, 302, cryptographic computing engine 108).

The operations of process 900B are identified in three phases: address decryption (Phase I 980A), address formation (Phase II 980B), and data decryption (Phase III 980C). In Phase I 980A, the linear address embedded in pointer 930 is decrypted. Specifically, the encrypted pointer slice 932 of encoded pointer 930 is decrypted using a cryptographic algorithm, such as a tweakable block cipher 920, using the same address key 918 and address tweak 916 that were used to encrypt the unencrypted pointer slice (e.g., 904 and 906) in address encryption 970A of FIG. 9A.

When the encrypted pointer slice of encoded pointer 930 has been decrypted by keystream generator 950, the output includes the upper address bits 904 and the other metadata 906. The decrypted upper address bits 904 may be used to form a decoded linear address 990 in Phase II 980B. In at least one embodiment, the uppermost bits (e.g., sign extension 901) of decoded linear address 990 can be set to the same bit value (e.g., 0 or 1). In addition, the fixed offset bits 907 and the mutable offset 908 can make up the lower bits of the decoded linear address 990.

In some embodiments, the processor may check whether the decrypted pointer slice (e.g., with upper address bits 904 and other metadata 906) has an expected value as an indication of whether the decrypted upper address bits 904 were decrypted incorrectly. For example, in some paging modes, some number of upper address bits are required to all have the same value (i.e. all 0's or all 1's). If the corresponding bits in the decrypted pointer slice have differing values, then that indicates that decrypted upper address bits 904 were decrypted incorrectly. Some embodiments may generate a fault in that case. Some other embodiments may rely on existing canonicality checks to generate a fault in that case when the decoded linear address 990 is used. Even if the upper bits do all have the same value, that may not conclusively indicate that decrypted upper address bits (e.g., upper address bits 904) was decrypted correctly. Some embodiments may perform the aforementioned checks for expected bit values for both the minimum and maximum addresses to be accessed in the current operation so that a fault will likely be generated if any portion of the access is out-of-bounds. Other embodiments may only require that a particular portion of the access, e.g. the first byte, be within the bounds of the pointer, and thus only perform the aforementioned checks for expected bit values on the pointer for that portion of the access. Other embodiments may check both the minimum and maximum addresses for write operations but only check a single pointer value for reads, relying on data cryptography to likely prevent partially out-of-bounds reads from returning correct plaintext.

The decoded linear address 990 is used to find the memory location of the encrypted data to be decrypted in Phase III 980C. The encrypted data can be decrypted by the same cryptographic algorithm (e.g., keystream generator 950) that was used to encrypt it. In addition, the same data key 942 and same data tweak 944 may be used as inputs to the keystream generator 950 to perform the decryption. In particular, in at least one embodiment, two sources provide inputs to be included as tweaks for the data decryption. One source includes the encoded pointer that references the data to be decrypted. The other source includes the data access instruction encoding stream, which can indicate various information about the data access. Such information can include, but is not limited to, the data type of the data being accessed (read from memory or written to memory) and a displacement value in the particular instruction.

As previously described, keystream generator 950 can be implemented as an AES-CTR mode block cipher, at a particular size granularity (any suitable size). In this embodiment, the at least a portion of the contents of the cryptographically encoded pointer 930 are used as the initialization vector (IV) or data tweak 944, with the mutable offset (e.g., 908) being used as the counter value (CTR). Generation of keystream 951 may commence without waiting for encrypted pointer slice 932 to be decrypted.

Keystream generator 950 decrypts data tweak 944 based on a data key 942 to generate a keystream 951. In at least some scenarios, the value of data tweak 944 may be adjusted to be congruent to 0 (modulo the block size of the keystream generator 950) prior to being used as an input to the keystream generator, as previously described herein. This adjustment may modify the values of fixed offset bits 907 in pointers to objects smaller than the block size. However, the data decryption may be indirectly bound to the values of the modified fixed offset bits 907, since those bits may be incorporated in the address tweak used to generate an encrypted pointer slice (ciphertext) 932.

If the memory to be decrypted crosses one or more block-aligned boundaries, the keystream generator 950 may be re-invoked for the subsequent blocks with the data tweak 944 being increased by an amount equal to the block size each time that it is re-invoked. A suffix of the generated keystream 951 may be unneeded and thus discarded. The logic function 952 (e.g., an XOR operation or other suitable operations or combinations thereof) is then performed on keystream 951 and decrypted input data block (or cache line) 960 selected from the memory location referenced by the decoded linear address 990. The granularity of the encrypted input data block 960 matches the keystream 951 output from of the keystream generator 950, and the logic function 952 produces a decrypted output data block 964.

Regarding data accesses, when a variable of a particular data type is accessed, it will be decrypted with the data type information. For example, for a variable having a character data type is decrypted using the character data type. If a first variable having first data type overruns into the memory allocation of a second variable having a second (different) data type, then the second variable cannot be accessed because the decryption would be performed on the contents where the second variable is supposed to be stored using the second data type, but the contents include data having the first data type. Thus, buffer overruns can be prevented.

This is especially useful within data structures. For example, a cryptographically encoded pointer that is generated to a single heap allocation may be free to roam anywhere within that allocation. However, this can potentially result in intra-object overflows where multiple sub-parts, multiple fields within that structure. In an example scenario, if one of the sub-parts is a vulnerable string variable that has an overflow that overwrites some adjacent variable data. Using data type based pointer encoding with data encryption bound to the cryptographically encoded pointer can mitigate these potential issues. Accordingly, a hierarchical protection is provided, where the bounds from the pointer provided for the outer allocation, and then bindings for specific variable types with data type based encoding.

In a further embodiment, hierarchical typing could be implemented. In this embodiment, typing for an outer data structure (e.g., a heap allocation, a data composite in stack) could be contained in the pointers to those data structures. Data typing information could also be enforced for the specific fields within the overall data structure.

In yet further embodiments, information relating to size can still be encoded in a pointer to a data structure. For example, the size of the entire structure in stack may be included in an encoded pointer while data type is still inferred from the op codes that are accessing the internal fields (e.g., infer that the first data element in data structure is an integer, infer that the second data element in the same data structure is a character, etc.). The encoded pointer may contain some subset of the information needed to decrypt the data being accessed (e.g., size of data structure). Consider an example scenario. A pointer to a data structure having one 64-bit floating point number and one 64-bit integer may be encoded with size metadata indicating 128 bits for the data structure. An instruction accesses the integer data element as an integer, and thus an integer opcode is used. The encoded pointer can be decrypted using both the size information encoded in the encoded pointer and the data type inferred from the data access instruction for the data structure. The linear base address can be formed from the decrypted pointer bits and possibly other information, and this can be used to access the data.

Integrity checks can also be implemented for data structures (or particular data elements) in one or more embodiments. Thus, integrity checks can also be used to perform access control for data cryptographically in addition to the data not being decrypted properly if the data was not accessed with the correct tweak (e.g., data type). When an integrity value in memory, which was previously computed for a data element, does not match a new integrity value that is computed based on the instruction that is accessing the data value, this can be used for security attack mitigation as well debugging. For example, if a programmer thought it was an integer when it was actually a floating point number and the integrity check fails, it can be ascertained during debugging that the data element was accessed as a data type (e.g., as an integer or character for example). Thus, programmers can benefit from such integrity checks when data type based encoding is used.

Figure 10:
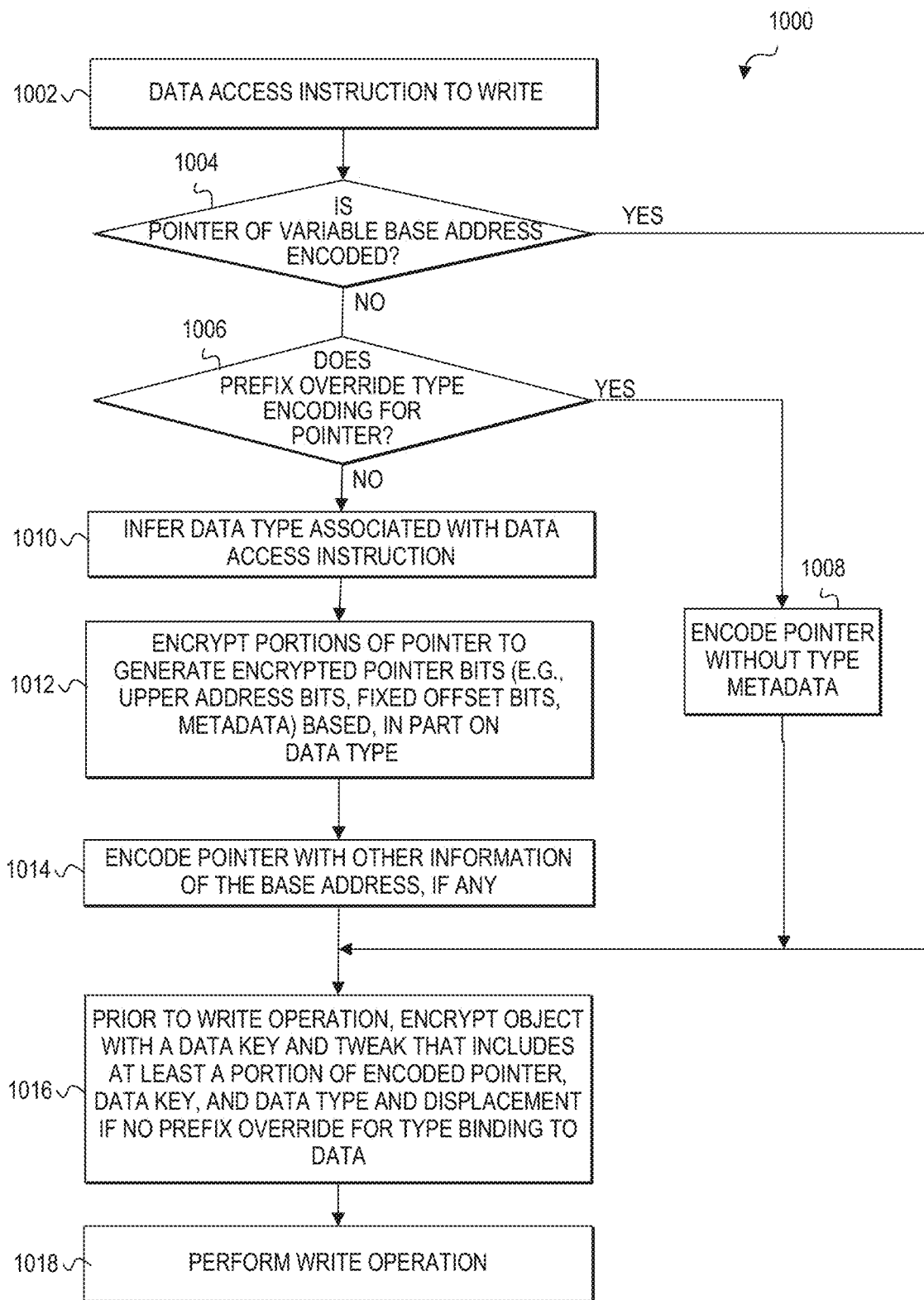
FIG. 10 is a flow diagram of an example process related to a write operation according to an embodiment.
Figure 11:
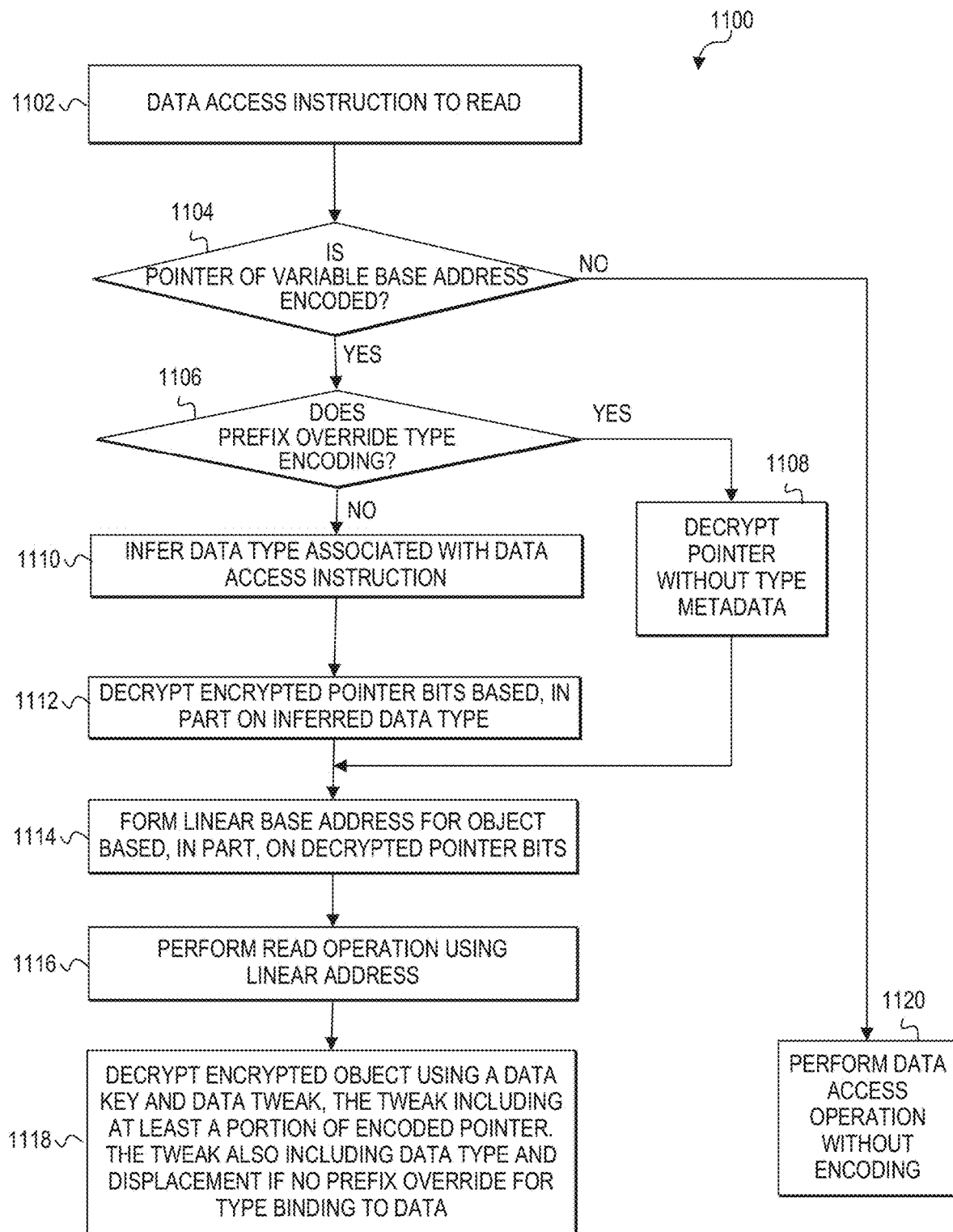
FIG. 11 is a flow diagram of an example process related to a read operation according to an embodiment.

Turning to FIGS. 10 and 11, flow diagrams 1000 and 1100 illustrate example processes associated with data access instructions in a program. Flow diagram 1000 of FIG. 10 illustrates a process related to data accesses involving writing (e.g., storing, pushing, saving, etc.) data to memory. The process can include one or more operations that may be executed by hardware, firmware, and/or software of the computing device 100 (e.g., by the processor 102 executing the address encoding/encrypting logic 152, encryption store logic 156, address cryptography unit 104, 302, cryptographic computing engine 108). For ease of description, FIGS. 10 and 11 are shown and described with reference to obtaining (e.g., by inference or by prefix) data type and displacement value to be used as a tweak (or part of a tweak) for pointer encryption and decryption and for the data encryption and decryption. However, it should be apparent that the general concepts of FIGS. 10 and 11 are applicable to other data encryption factors that may be inferable, derivable, or otherwise obtainable from data access instructions, to be used as a tweak for the pointer encryption and decryption and/or for the data encryption and decryption.

At 1002, a data access instruction to write an object to memory is executed in a program. Generally, if a data access instruction includes a memory operand, then it is accessing data in memory data type information may be inferable from the instruction. A data access request to write an object to memory can include any instruction that stores, pushes, writes, moves, transfers, copies, or otherwise causes data to be saved in the memory (e.g., 120) of the computing device (e.g., 102).

At 1004, a determination is made as to whether the pointer of the variable base address for the data access is encoded (i.e., cryptographically encoded where at least a portion of the memory address is encrypted). The variable base address may be, for example, the base (or beginning) address of a character array, address of the first byte in case of multi-byte data types such as short, int., etc.

If the pointer is not encoded, then at 1006, the instruction can be checked for a prefix. A prefix added to the data access instruction may contain more precise data type information or other information that indicates a particular way of handling the pointer-based encryption and decryption. For example, in some scenarios, data type based encoding may not be a desired way of encoding a particular object. In such cases, the prefix may be used to override type based encoding and in these cases, type based encoding is not used. That is, data type is not used in the address tweak of the pointer encryption and/or is not used in the data tweak of the data encryption. In cases of a prefix, the compiler may generate executable code so that data type based encoding is skipped. Multiple prefixes may be defined to separately select between one or more of type based encoding and displacement based encoding and their combination.

If the prefix indicates that the data type based encoding should not be overridden (e.g., that it should be used in the pointer encoding), or if the instruction does not have a prefix, then at 1010, the instruction can be checked and a data type associated with the object to be written can be inferred from the op code of the instruction. The op code can indicate the data type, for example, based on the particular size of the object the op code is used to access, and it can be inferred that the object referenced by the pointer in the instruction has that data type. In other scenarios, the data type can be obtained from the prefix if the instruction has a prefix and if the prefix contains this information.

At 1012, a slice of bits in the pointer can be encrypted to generate encrypted pointer slice 932. In one example, the slice of bits can include upper address bits 904, and other metadata 906. If data type is being used in the encryption, then power metadata may be eliminated from the pointer (e.g., as shown in FIGS. 4 and 7) leaving room for other metadata that may be desirable such as, for example, permissions metadata. Permissions metadata could indicate the permissions associated with the encoded pointer (e.g., what data it can access, what it is allowed to do with data it accesses, etc.). In at least some implementations, this other metadata such as permissions could be included in the slice of pointer bits that is encrypted. The encryption of the pointer bits can be achieved by a cryptographic algorithm (e.g., tweakable block cipher) having inputs including an address key and an address tweak. In at least one embodiment, the address tweak can include the data type that can be supplied by the compiler. The address tweak may also include the fixed offset portion of the linear address. When the encoded pointer is decoded and decrypted during memory accesses, the data type can be inferred from the instruction that uses the encoded pointer.

At 1014, the pointer can be encoded with any additional information that may be desirable that is not part of the encrypted pointer bits. At 1016, the object can be encrypted before the write operation is performed. The encryption of the object can be achieved by a cryptographic algorithm (e.g., tweakable block cipher) having inputs including a data key and a data tweak. In at least one embodiment, the data tweak can include the inferred data type, a displacement value, and pointer binding bits of the encoded pointer. In at least some embodiments, the entire encoded pointer may be used as part of the data tweak. If prefixes are used, then if the prefix indicates that use of data type based encoding is to be overridden in the data encryption, then the data tweak may not include the data type and the displacement value.

With reference again to 1004, if the pointer of the variable base address is already encoded as determined at 1004, then the object can be encrypted at 1016, as previously described, using the already-encoded pointer. With reference again to 1004, if the pointer is not already encoded as determined at 1004, but the prefix is determined to override the use of data type based encoding for the pointer at 1106, then at 1008, the pointer may be encoded without using data type as part of the address tweak to encrypt the slice of bits in the pointer (e.g., upper address bits 904, other metadata 906). Once the pointer is encoded without using the data type, then the object can be encrypted at 1016, as previously described.

At 1018, a write operation can be performed to write the encrypted data generated at 1016, to the memory address (e.g., linear address) referenced by the encoded pointer.

FIG. 11 illustrates a process related to data accesses involving reading (e.g., loading, popping, fetching, moving, etc.) data from memory to registers. The process can include one or more operations that may be executed by hardware, firmware, and/or software of the computing device 100 (e.g., by the processor 102 executing the address decoding/decrypting logic 154, decryption store logic 158, address cryptography unit 104, 302, cryptographic computing engine 108).

At 1102, a data access instruction to read an object from memory is executed in a program. Generally, if a data access instruction to read data includes a memory operand, then it is accessing data in memory data type information may be inferable from the instruction. A data access request to read an object to memory can include any instruction that loads, reads, pops, moves transfers, copies or otherwise causes data that is in memory (e.g., 120) or cache if it is encrypted in cache (e.g., 170) to be saved in the processor (e.g., in registers 110 or other processor memory) of the computing device (e.g., 102).

At 1104, a determination is made as to whether the pointer of the variable base address for the data access is encoded (i.e., cryptographically encoded where at least a portion of the memory address is encrypted). The variable base address may be, for example, the base (or beginning) address of a character array, address of the first byte in case of multi-byte data types such as short, int., etc. If the pointer is not encoded, the read operation may be performed at 1120.

If the pointer is encoded, however, at 1106 the instruction can be checked for a prefix. A prefix added to the data access instruction may contain more precise data type information or other information that indicates a particular way of handling the pointer-based encryption and decryption. For example, in some scenarios, data type based encoding may not be a desired way of encoding a particular object. In such cases, the prefix may be used to override type based encoding and in these cases, type based encoding is not used. That is, data type is not used in the address tweak of the pointer encryption and/or is not used in the data tweak of the data encryption. Multiple prefixes may be defined to separately select between one or more of type based encoding and displacement based encoding and their combination.

If the prefix indicates that the data type based encoding should not be overridden (e.g., that it should be used in the pointer encoding), or if the instruction does not have a prefix, then at 1110, the instruction can be checked and a data type associated with the object to be read can be inferred from the op code of the instruction. The op code can indicate the data type, for example, based on the particular size of the object the op code is used to access, and it can be inferred that the object referenced by the pointer in the instruction has that data type. In other scenarios, the data type can be obtained from the prefix if the instruction has a prefix and if the prefix contains this information.

In order to execute the data access instruction to read the object, the encoded pointer is decoded to obtain the linear address, which can be used (e.g., translated to physical address) to read the data from memory. To decode the encoded pointer, at 1112, a slice of bits in the pointer can be decrypted to generate the unencrypted slice of pointer bits. In one example, the unencrypted slice of pointer bits can include upper address bits 904 and other metadata 906 and can be encrypted to generate the encrypted pointer slice 932. The decryption of the pointer bits can be achieved by a cryptographic algorithm (e.g., tweakable block cipher) having inputs including an address key and an address tweak. In at least one embodiment, the address tweak can include the inferred data type. The address tweak may also include the fixed offset portion of the linear address.

At 1114, the linear base address for the object can be formed by using the decrypted upper address bits and the fixed offset bits. If additional address bits (e.g., most significant address bits) are stored in a register, for example, they may also be added to the decrypted upper address bits and the fixed offset bits. In addition, the mutable offset bits can be added to derive the address of the particular object being fetched, which may be within a larger data structure, for example.

At 1116, a read operation can be performed to read the encrypted data (object) from memory at the memory address (e.g., linear address) referenced by the encoded pointer. At 1118, the object can be decrypted. The decryption of the object can be achieved by a cryptographic algorithm (e.g., tweakable block cipher) having inputs including a data key and a data tweak. In at least one embodiment, the data tweak can include the inferred data type, a displacement value, and pointer binding bits of the encoded pointer. In at least some embodiments, the entire encoded pointer may be used as part of the data tweak. If prefixes are used, then if the prefix indicates that use of data type based encoding is to be overridden in the data decryption, then the data tweak may not include the data type and the displacement value.

With reference again to 1108, if the pointer is not already encoded as determined at 1106, but the prefix is determined to override the use of data type based encoding for the pointer at 1106, then at 1108, the pointer may be decoded without using data type as part of the address tweak to decrypt the slice of encrypted bits in the pointer (e.g., upper address bits 904, other metadata 906). Accordingly, at 1108, the encrypted pointer bits can be decrypted without using type metadata. Then at 1114, the linear base address can be formed, and the flow can continue to perform the read operation at 1116 to read the data from memory, and then decrypt the data at 1118, as previously described.

For instructions in an instruction set architectures, which are not currently configured to differentiate between data types (e.g., based on the op code), extensions may be implemented extend the capability of inferring data type from those instruction op codes. For example, highly optimized code may use Single Instruction/Multiple Data (SIMD) instructions for memory read and write operations that do not have implicit data type information. In particular, data type information may not be inferable from SSE instructions and AVX instructions in Intel® 64 and IA-32 Architectures. In particular examples, the following SSE instructions do not have implicit data type information:

Data transfer instructions: MOVA*S—movaps, movhsp, etc.

Packed arithmetic instructions: ADDPSS, SUBPS, etc.

Logical, compare, conversion instructions

In one or more embodiments of data type based pointer encoding, extensions can be created for the above instructions (and others) to enable inferences of the data type of a data element being accessed using the extension. Compilers can be allowed to emit data type dependent instructions, which optimization can be implemented in micro-code. Particular extension examples that could be added to the instruction set architecture include, but are not necessarily limited to:

MOVAPS xmm1, xmm2/m123—for moving integers;
MOVAPSB xmm, xmm2/m123—for moving bytes; and
MOVAPSW xmm, xmm2/m128—for moving words Enabling data type inferences can be implemented in various ways. In some scenarios, extensions (e.g., new instruction) may be created as described above. In other scenarios, a prefix may be defined for the existing instructions. In yet other embodiments, the existing instructions could be modified to use an immediate operand (e.g., a number) that gets encoded directly into the instruction itself. A prefix or something else added to instruction could be configured so that the behavior of the instruction does not change, but the data encryption and decryption could be changed based on the data type indicated in the addition to the instruction. For example, the compiler could add a number (e.g., prefix or operand) that represents to the compiler that a character is being moved by a 64-bit instruction, for example. Accordingly, the addition could instantiate the cryptographic operations to encrypt or decrypt the data element based on its data type. For example, if a prefix value is used, then the prefix value and the cryptographically encoded pointer to the data element are both used (e.g. as separate tweaks or as a combined tweak) to determine how the data is getting encrypted and decrypted on the particular instruction op code.

Other extensions may be implemented for memory (mem*) and string (str*) operations performed in a library function. Some string (e.g., rep stosb) instructions may be used for faster copying. For example, STOSB, STOSW, STOSD may be used for 8-bits (byte), 16-bits (word), and 32-bits (double word), respectively. Thus, extensions may be implemented to enable the optimized fast string copy for 64-bits (quad word) and different instructions for other data types such as floating, double, etc. data types.

Typically, memory moves, such as a memory block copy (e.g., movq instruction) are type independent. Some functions are also type-independent including, for example, memset, memmove, etc. However, if string operations are used, the data type still needs to be differentiated when there are any changes to the data. Accordingly, the CPU pipeline can be enhanced to implement type-independent operations. For example, memset can be used to zero out memory. A marker can be added in a pointer, and memory content can be reset to a universal constant. This type binding is a selective override. Without the indicator, the processor may type to bind the cryptography to the types as previously described herein. With the marker, however, it tells the processor not to decrypt/encrypt based on data type as it will result in correctness errors.

FIGS. 12-16 below provide some example computing devices, computing environments, hardware, software or flows that may be used in the context of embodiments as described herein.

Figure 12:
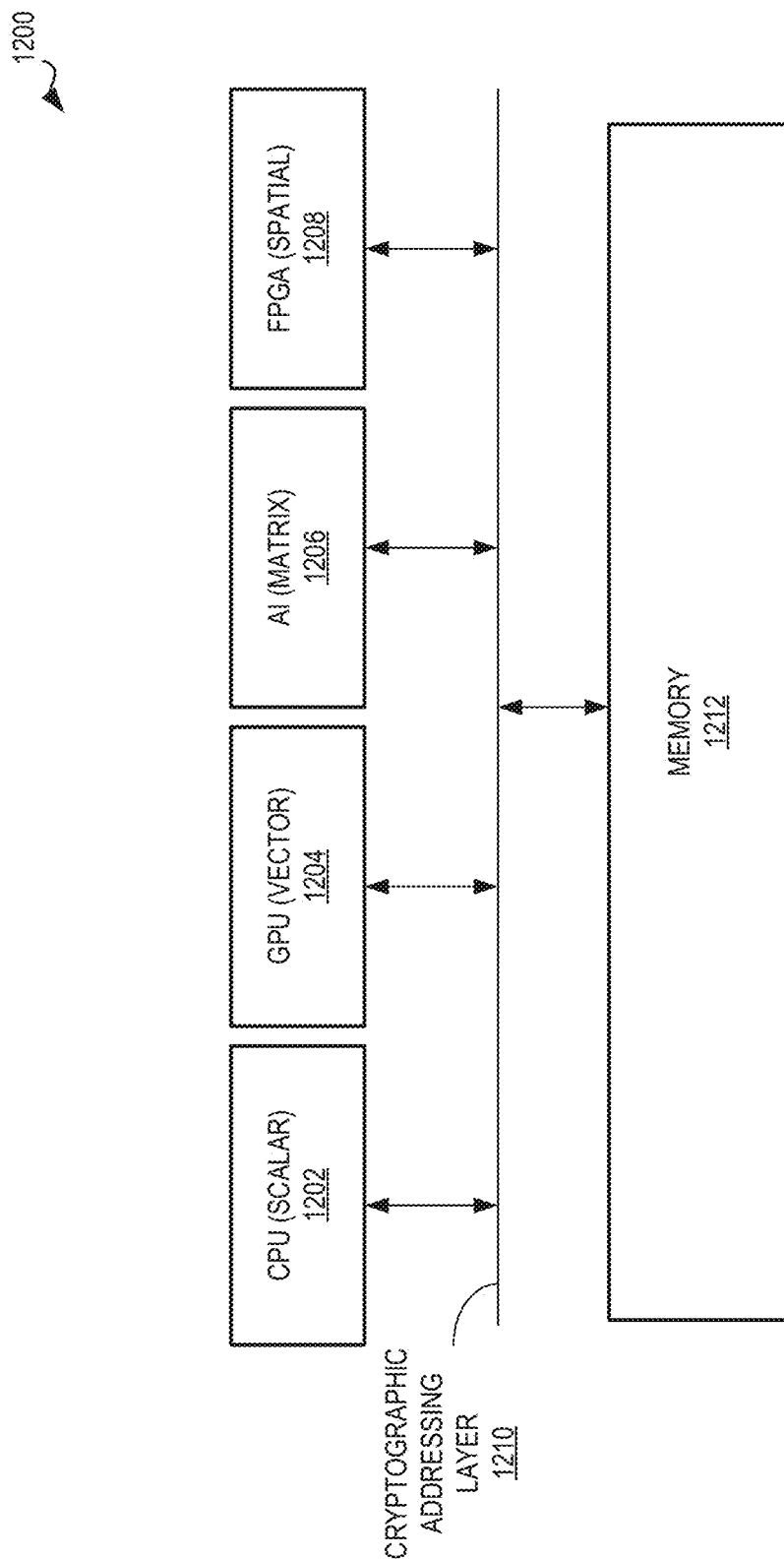
FIG. 12 is a block diagram illustrating an example cryptographic computing environment according to at least one embodiment.

FIG. 12 is a block diagram illustrating an example cryptographic computing environment 1200 according to at least one embodiment. In the example shown, a cryptographic addressing layer 1210 extends across the example compute vectors central processing unit (CPU) 1202, graphical processing unit (GPU) 1204, artificial intelligence (AI) 1206, and field programmable gate array (FPGA) 1208. For example, the CPU 1202 and GPU 1204 may share the same virtual address translation for data stored in memory 1212, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 1212 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 13:
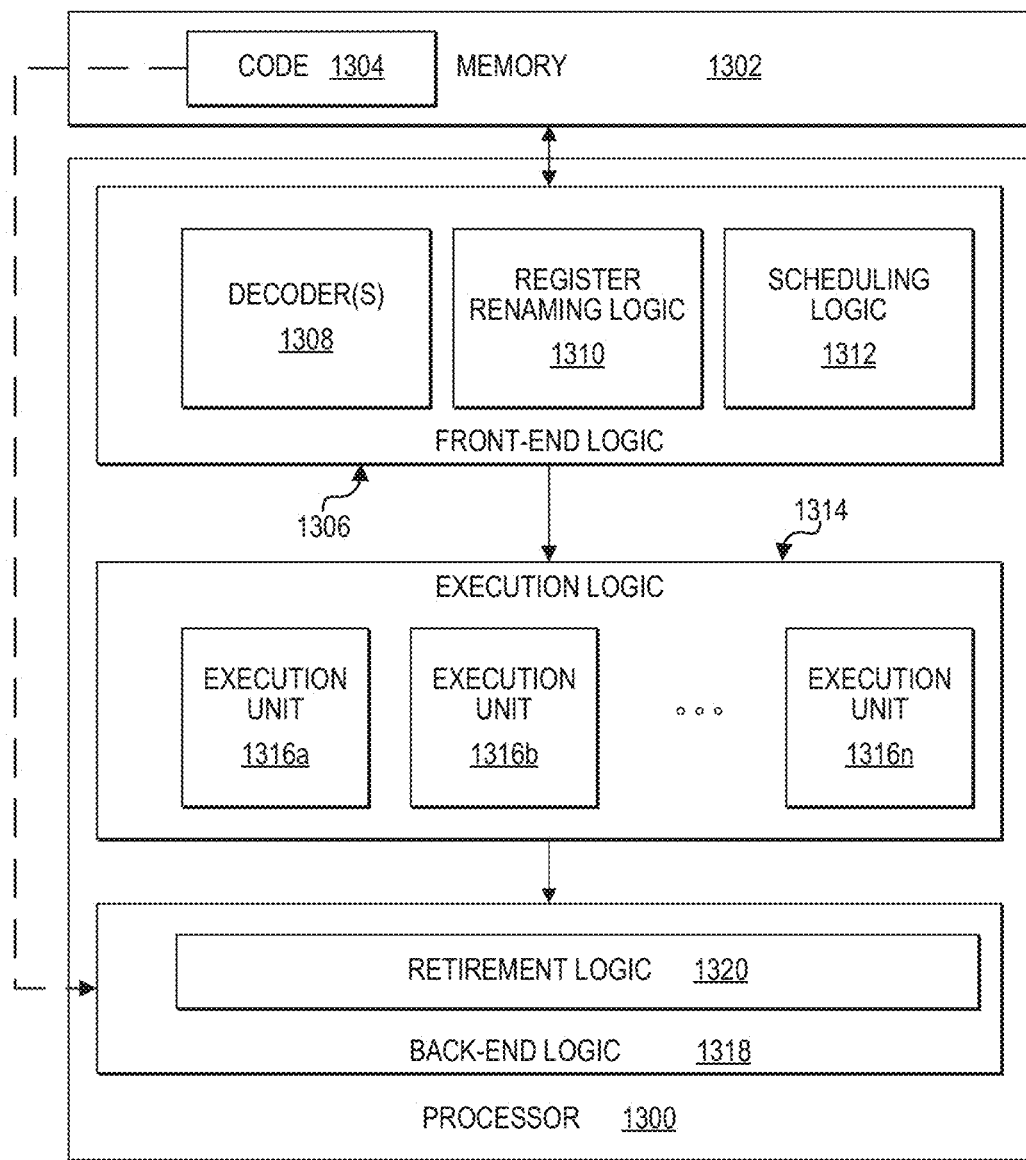
FIG. 13 is a block diagram illustrating an example processor according to at least one embodiment.
Figure 14:
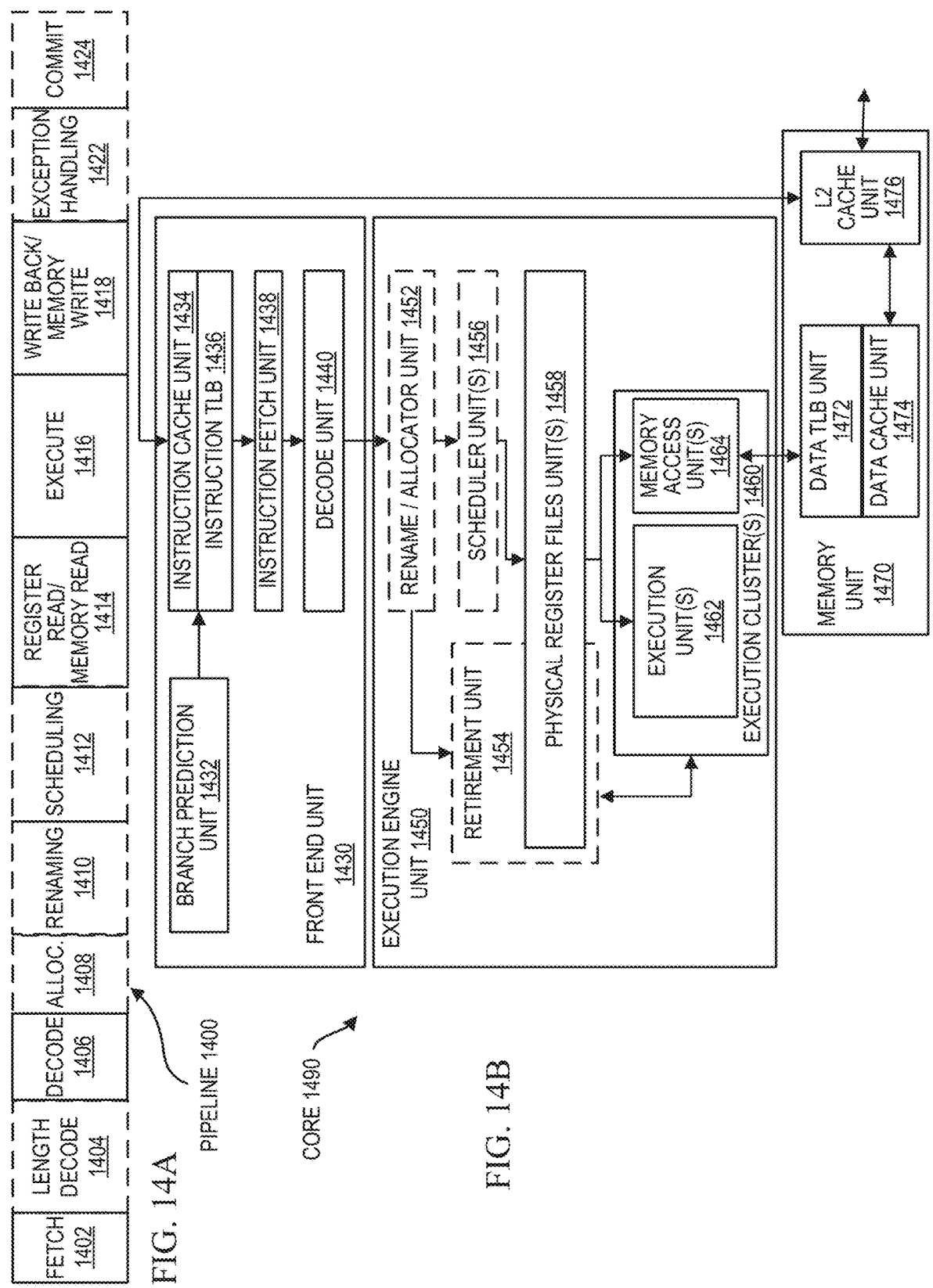
FIG. 14A is a block diagram illustrating both an exemplary in-order pipeline and an exemplary register renaming, out-of-order issue/execution pipeline in accordance with certain embodiments.
FIG. 14B is a block diagram illustrating both an exemplary embodiment of an in-order architecture core and an exemplary register renaming, out-of-order issue/execution architecture core to be included in a processor in accordance with certain embodiments.

FIGS. 13-14 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 13-15.

FIG. 13 is an example illustration of a processor according to an embodiment. Processor 1300 is an example of a type of hardware device that can be used in connection with the implementations shown and described herein (e.g., processor 102). Processor 1300 may be any type of processor, such as a microprocessor, an embedded processor, a digital signal processor (DSP), a network processor, a multi-core processor, a single core processor, or other device to execute code. Although only one processor 1300 is illustrated in FIG. 13, a processing element may alternatively include more than one of processor 1300 illustrated in FIG. 13. Processor 1300 may be a single-threaded core or, for at least one embodiment, the processor 1300 may be multi-threaded in that it may include more than one hardware thread context (or "logical processor") per core.

FIG. 13 also illustrates a memory 1302 coupled to processor 1300 in accordance with an embodiment. Memory 1302 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1300 can execute any type of instructions associated with algorithms, processes, or operations detailed herein. Generally, processor 1300 can transform an element or an article (e.g., data) from one state or thing to another state or thing.

Code 1304, which may be one or more instructions to be executed by processor 1300, may be stored in memory 1302, or may be stored in software, hardware, firmware, or any suitable combination thereof, or in any other internal or external component, device, element, or object where appropriate and based on particular needs. In one example, processor 1300 can follow a program sequence of instructions indicated by code 1304. Each instruction enters a front-end logic 1306 and is processed by one or more decoders 1308. The decoder may generate, as its output, a micro operation such as a fixed width micro operation in a predefined format, or may generate other instructions, microinstructions, or control signals that reflect the original code instruction. Front-end logic 1306 also includes register renaming logic 1310 and scheduling logic 1312, which generally allocate resources and queue the operation corresponding to the instruction for execution.

Processor 1300 can also include execution logic 1314 having a set of execution units 1316a, 1316b, 1316n, etc. Some embodiments may include a number of execution units dedicated to specific functions or sets of functions. Other embodiments may include only one execution unit or one execution unit that can perform a particular function. Execution logic 1314 performs the operations specified by code instructions.

After completion of execution of the operations specified by the code instructions, back-end logic 1318 can retire the instructions of code 1304. In one embodiment, processor 1300 allows out of order execution but requires in order retirement of instructions. Retirement logic 1320 may take a variety of known forms (e.g., re-order buffers or the like). In this manner, processor 1300 is transformed during execution of code 1304, at least in terms of the output generated by the decoder, hardware registers and tables utilized by register renaming logic 1310, and any registers (not shown) modified by execution logic 1314.

Although not shown in FIG. 13, a processing element may include other elements on a chip with processor 1300. For example, a processing element may include memory control logic along with processor 1300. The processing element may include I/O control logic and/or may include I/O control logic integrated with memory control logic. The processing element may also include one or more caches. In some embodiments, non-volatile memory (such as flash memory or fuses) may also be included on the chip with processor 1300.

FIG. 14A is a block diagram illustrating both an exemplary in-order pipeline and an exemplary register renaming, out-of-order issue/execution pipeline according to one or more embodiments of this disclosure. FIG. 14B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 14A-14B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. Processor core 1490 and memory unit 1470 are examples of the types of hardware that can be used in connection with the implementations shown and described herein (e.g., processor 102, memory 120). The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like. In addition, processor core 1490 and its components represent example architecture that could be used to implement logical processors and their respective components.

The front end unit 1430 includes a branch prediction unit 1432 coupled to an instruction cache unit 1434, which is coupled to an instruction translation lookaside buffer (TLB) unit 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers (GPRs). In at least some embodiments described herein, register units 1458 are examples of the types of hardware that can be used in connection with the implementations shown and described herein (e.g., registers 110). The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 1462 may also include an address generation unit to calculate addresses used by the core to access main memory (e.g., memory unit 1470) and a page miss handler (PMH).

The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory. In addition, a page miss handler may also be included in core 1490 to look up an address mapping in a page table if no match is found in the data TLB unit 1472.

By way of example, the exemplary register renaming, out-of-order issue/execution core architecture may implement the pipeline 1400 as follows: 1) the instruction fetch unit 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the scheduling stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 15:
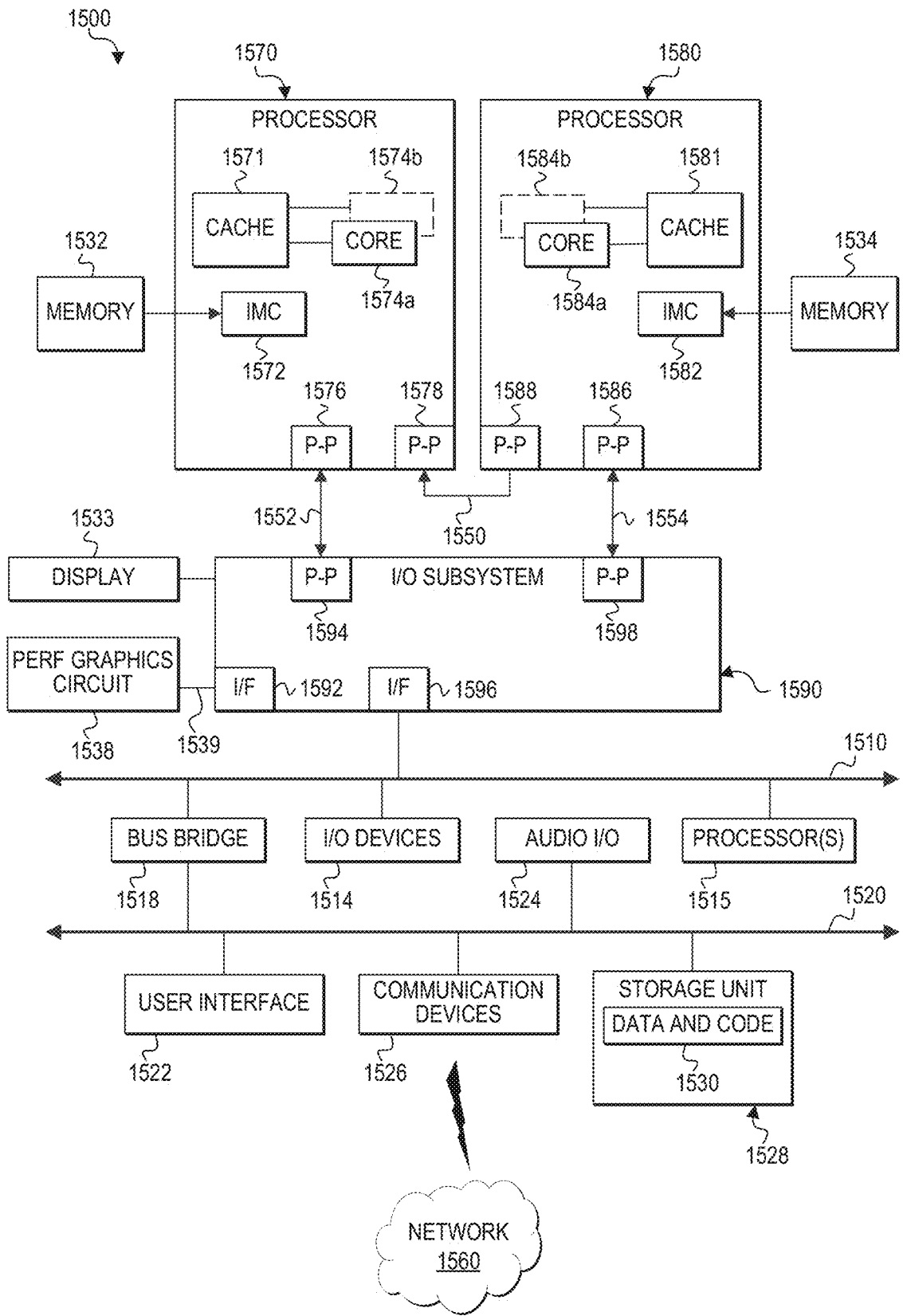
FIG. 15 is a block diagram of an example computer architecture according to at least one embodiment.

FIG. 15 illustrates a computing system 1500 that is arranged in a point-to-point (PtP) configuration according to an embodiment. In particular, FIG. 15 shows a system where processors, memory, and input/output devices are interconnected by a number of point-to-point interfaces. Generally, one or more of the computing systems or computing devices described herein may be configured in the same or similar manner as computing system 1500.

Processors 1570 and 1580 may be implemented as single core processors 1574*a* and 1584*a* or multi-core processors 1574*a*-1574*b* and 1584*a*-1584*b*. Processors 1570 and 1580 may each include a cache 1571 and 1581 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1500. Moreover, processors 1570 and 1580 are examples of the types of hardware that can be used in connection with the implementations shown and described herein (e.g., processor 102).

Processors 1570 and 1580 may also each include integrated memory controller logic (IMC) 1572 and 1582 to communicate with memory elements 1532 and 1534, which may be portions of main memory locally attached to the respective processors. In alternative embodiments, memory controller logic 1572 and 1582 may be discrete logic separate from processors 1570 and 1580. Memory elements 1532 and/or 1534 may store various data to be used by processors 1570 and 1580 in achieving operations and functionality outlined herein.

Processors 1570 and 1580 may be any type of processor, such as those discussed in connection with other figures. Processors 1570 and 1580 may exchange data via a point-to-point (PtP) interface 1550 using point-to-point interface circuits 1578 and 1588, respectively. Processors 1570 and 1580 may each exchange data with an input/output (I/O) subsystem 1590 via individual point-to-point interfaces 1552 and 1554 using point-to-point interface circuits 1576, 1586, 1594, and 1598. I/O subsystem 1590 may also exchange data with a high-performance graphics circuit 1538 via a high-performance graphics interface 1539, using an interface circuit 1592, which could be a PtP interface circuit. In one embodiment, the high-performance graphics circuit 1538 is a special-purpose processor, such as, for example, a high-throughput MIC processor, a network or communication processor, compression engine, graphics processor, GPGPU, embedded processor, or the like. I/O subsystem 1590 may also communicate with a display 1533 for displaying data that is viewable by a human user. In alternative embodiments, any or all of the PtP links illustrated in FIG. 15 could be implemented as a multi-drop bus rather than a PtP link.

I/O subsystem 1590 may be in communication with a bus 1510 via an interface circuit 1596. Bus 1510 may have one or more devices that communicate over it, such as a bus bridge 1518, I/O devices 1514, and one or more other processors 1515. Via a bus 1520, bus bridge 1518 may be in communication with other devices such as a user interface 1522 (such as a keyboard, mouse, touchscreen, or other input devices), communication devices 1526 (such as modems, network interface devices, or other types of communication devices that may communicate through a computer network 1560), audio I/O devices 1524, and/or a storage unit 1528. Storage unit 1528 may store data and code 1530, which may be executed by processors 1570 and/or 1580. In alternative embodiments, any portions of the bus architectures could be implemented with one or more PtP links.

Program code, such as code 1530, may be applied to input instructions to perform the functions described herein and generate output information. The output information may be applied to one or more output devices, in known fashion. For purposes of this application, a processing system may be part of computing system 1500 and includes any system that has a processor, such as, for example; a digital signal processor (DSP), a microcontroller, an application specific integrated circuit (ASIC), or a microprocessor.

The program code (e.g., 1530) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
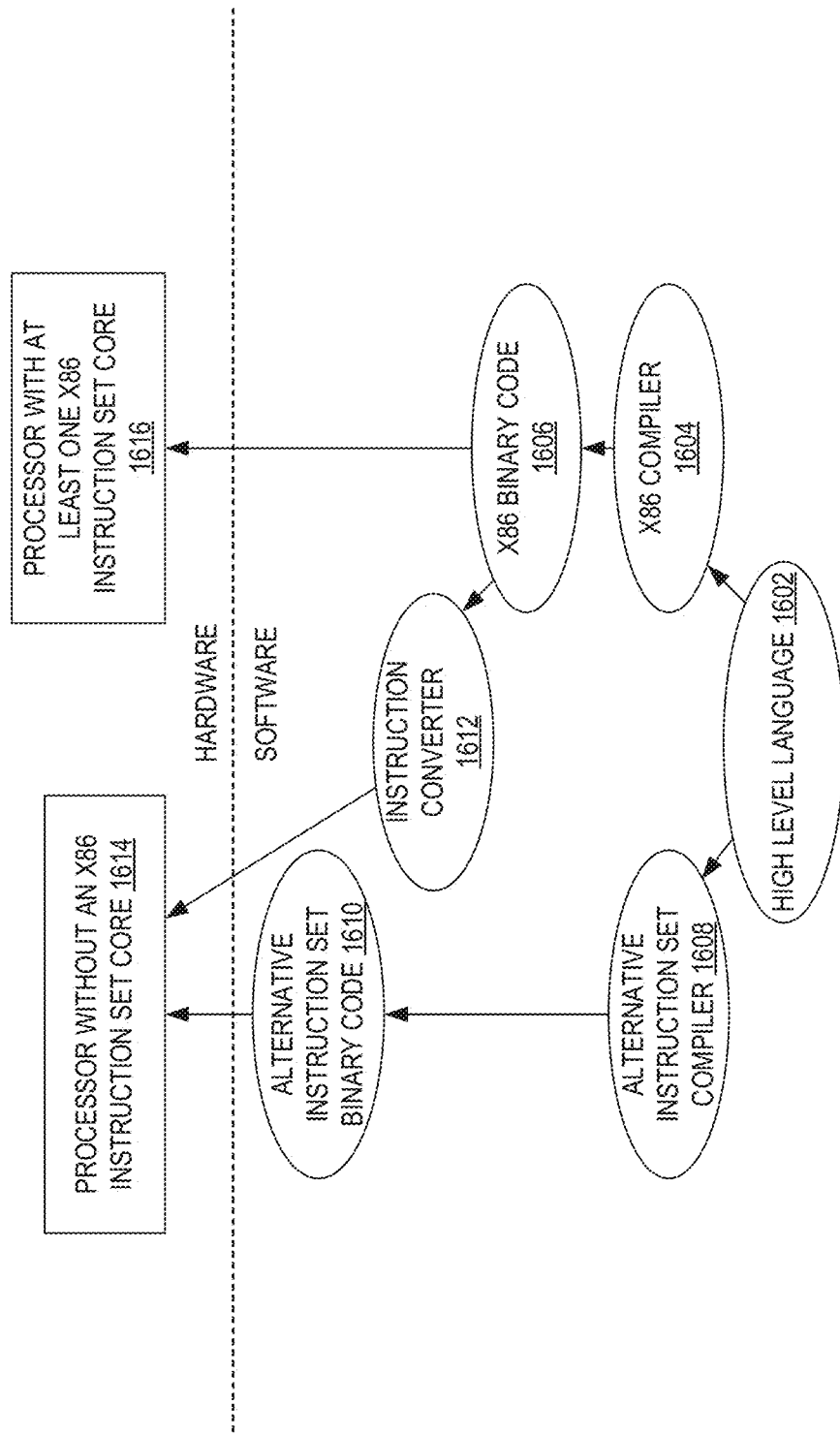
FIG. 16 is a block diagram contrasting the use of a software instruction converter to convert binary instructions in a source instruction set to binary instructions in a target instruction set according to embodiments of the present disclosure.

FIG. 16 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

One or more aspects of at least one embodiment may be implemented by representative instructions stored on a machine readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine readable media containing instructions or containing design data, such as Hardware Description Language (HDL), which defines structures, circuits, apparatuses, processors and/or system features described herein. Such embodiments may also be referred to as program products.

The computing system depicted in FIG. 15 is a schematic illustration of an embodiment of a computing system that may be utilized to implement various embodiments discussed herein. It will be appreciated that various components of the system depicted in FIG. 15 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

OTHER NOTES AND EXAMPLES

Example AA1 provides a processor comprising: a register to store an encoded pointer to a variable in stack memory, the encoded pointer including: an encrypted portion; and a fixed plaintext portion of a memory address corresponding to the variable; circuitry to: in response to a memory access request associated with variable, decrypt the encrypted portion of the encoded pointer to obtain first upper address bits of the memory address and a memory allocation size for a variable; decode the encoded pointer to obtain the memory address; verify the memory address is valid based, at least in part on the memory allocation size; and in response to determining that the memory address is valid, allow the memory access request.

Example AA2 comprises the subject matter of Example AA1, and the circuitry is further to: receive a memory allocation request for the variable; determine the memory allocation size for the stack memory; obtain the memory address for the variable based, at least in part, on a stack pointer; store the first upper address bits of the memory address in a memory location; and encrypt the memory allocation size and the first upper address bits of the memory address based on an address key and an address tweak.

Example AA3 comprises the subject matter of any one of Examples AA1-AA2, and the circuitry is further to the circuitry is further to store second upper address bits with the first upper address bits in a memory location, wherein the first upper address bits and the second upper address bits are fixed for the stack memory.

Example AA4 comprises the subject matter of Example AA3, and to verify the memory address is valid is to include determining that the first upper address bits obtained from decrypting the encrypted portion of the encoded pointer match first upper address bits stored in the memory location.

Example AA5 comprises the subject matter of Example AA4, and the encoded pointer includes power metadata that indicates in a power of two, a first number of bits in the encoded pointer that represents a fixed offset and a second number of bits in the encoded pointer that represents a mutable offset.

Example AA6 comprises the subject matter of any one of Examples AA1-AA5, and the circuitry is further to decrypt the encrypted portion of the encoded pointer with a block cipher using an address key and an address tweak as inputs.

Example AA7 comprises the subject matter of Example AA6, and the encoded pointer includes power metadata that indicates in a power of two, a first number of bits in the encoded pointer that represents a fixed offset and a second number of bits in the encoded pointer that represents a mutable offset.

Example AA8 comprises the subject matter of Example AA7, and the address tweak includes the fixed offset and the power metadata.

Example AA9 comprises the subject matter of any one of Examples AA1-AA8, and the memory address is to be decoded from the encoded pointer based, in part, on the fixed plaintext portion and the first upper address bits.

Example AA10 comprises the subject matter of Example AA9, and the circuitry is further to load the first data stored in the variable of the stack memory based on the memory address decoded from the encoded pointer; and decrypt the first data based on a first data key and a data tweak derived, at least in part, from the encoded pointer.

Example AA11 comprises the subject matter of Example AA9, and the circuitry is further to encrypt first data based on a first data key and a data tweak derived, at least in part, from the encoded pointer; and use the memory address decoded from the encoded pointer to store the encrypted first data in the variable corresponding to the memory address.

Example AM1 provides method comprising: storing, in a register, an encoded pointer to a variable in stack memory, wherein the encoded pointer includes an encrypted portion and a fixed plaintext portion of a memory address corresponding to the variable; in response to a memory access request associated with the variable, decrypting the encrypted portion of the encoded pointer to obtain first upper address bits of the memory address and a memory allocation size for a variable; decoding the encoded pointer to obtain the memory address; verifying the memory address is valid based, at least in part on the memory allocation size; and allowing the memory access request based on verifying that the memory address is valid.

Example AM2 comprises the subject matter of Example AM1, and the method further includes receiving a memory allocation request for the variable; determining the memory allocation size for the stack memory; obtaining the memory address for the variable based, at least in part, on a stack pointer; storing the first upper address bits of the memory address in a memory location; and encrypting the memory allocation size and the first upper address bits of the memory address based on an address key and an address tweak.

Example AM3 comprises the subject matter of any one of Examples AM1-AM2, and the method further includes storing second upper address bits with the first upper address bits in a memory location, wherein the first upper address bits and the second upper address bits are fixed for the stack memory.

Example AM4 comprises the subject matter of Example AM3, and the verifying the memory address is valid includes determining that the first upper address bits obtained from decrypting the encrypted portion of the encoded pointer match first upper address bits stored in the memory location.

Example AM5 comprises the subject matter of Example AM4, and the verifying the memory address is valid further includes determining whether the memory address is less than a sum of the memory allocation size and a variable base address of the variable.

Example AM6 comprises the subject matter of any one of Examples AM1-AM5, and decrypting the encrypted portion of the encoded pointer with a block cipher using an address key and an address tweak as inputs.

Example AM7 comprises the subject matter of Example AM6, and the encoded pointer includes power metadata that indicates in a power of two, a first number of bits in the encoded pointer that represents a fixed offset and a second number of bits in the encoded pointer that represents a mutable offset.

Example AM8 comprises the subject matter of Example AM7, and the address tweak includes the fixed offset and the power metadata.

Example AM9 comprises the subject matter of any one of Examples AM1-AM8, and the memory address is decoded from the encoded pointer based, in part, on the fixed plaintext portion and the first upper address bits.

Example AM10 comprises the subject matter of Example AM9, and the method further includes loading first data stored in the variable of the stack memory based on the memory address decoded from the encoded pointer; and decrypting the first data based on a first data key and a data tweak derived, at least in part, from the encoded pointer.

Example AM11 comprises the subject matter of Example AM9, and the method further includes encrypting first data based on a first data key and a data tweak derived, at least in part, from the encoded pointer; and using the memory address decoded from the encoded pointer to store the encrypted first data in the variable corresponding to the memory address.

Example BA1 provides a processor comprising: a register to store an encoded pointer to a memory location in memory, and the encoded pointer is to include an encrypted portion; circuitry to: determine a first data encryption factor based on a first data access instruction; decode the encoded pointer to obtain a memory address of the memory location; use the memory address to access an encrypted first data element; and decrypt the encrypted first data element using a cryptographic algorithm with first inputs to generate a decrypted first data element, the first inputs including the first data encryption factor based on the first data access instruction and a second data encryption factor from the encoded pointer.

Example BA2 comprises the subject matter of Example BA1, and the encoded pointer further includes first metadata.

Example BA3 comprises the subject matter of Example BA2, and the first metadata includes permissions.

Example BA4 comprises the subject matter of Example BA2, and the first metadata is a memory allocation size of a data structure.

Example BA5 comprises the subject matter of Example BA4, and the memory address corresponds to a base address of the data structure.

Example BA6 comprises the subject matter of any one of Examples BA4-BA5, and the first data encryption factor includes a first data type of the encrypted first data element inferred from the first data access instruction, and the data structure contains the encrypted first data element having the first data type and an encrypted second data element having a second data type.

Example BA7 comprises the subject matter of any one of Examples BA2-BA6, and the first metadata is a memory allocation size of the encrypted first data element, and the memory address corresponds to a first byte of the encrypted first data element.

Example BA8 comprises the subject matter of any one of Examples BA1-BA7, and the circuitry is further in response to a second data access instruction, decode a second encoded pointer to obtain a second memory address of a second memory location; use the second memory address to access an encrypted second data element; and determine a third data encryption factor based on the second data access instruction; and decrypt the encrypted second data element using the cryptographic algorithm with second inputs, the second inputs including the third data encryption factor based on the second data access instruction and a fourth data encryption factor from the second encoded pointer.

Example BA9 comprises the subject matter of any one of Examples BA1-BA8, and the first data encryption factor and the second data encryption factor are included in a data tweak as one of the first inputs for the cryptographic algorithm to decrypt the encrypted first data element.

Example BA10 comprises the subject matter of any one of Examples BA1-BA9, and the first data encryption factor includes a first data type derived from the first data access instruction.

Example BA11 comprises the subject matter of Example BA10, and to derive the first data type from the first data access instruction is to infer the first data type based on an op code of the first data access instruction.

Example BA12 comprises the subject matter of Example BA10, and the first data encryption factor for the cryptographic algorithm to decrypt the encrypted first data element further includes a displacement value derived from the first data access instruction.

Example BA13 comprises the subject matter of any one of Examples BA1-BA12, and the circuitry is further to determine that the first data access instruction includes a prefix; and determine the first data encryption factor based on information included in the prefix.

Example BA14 comprises the subject matter of any one of Examples BA1-BA13, and the memory location is in heap memory or stack memory.

Example BA15 comprises the subject matter of any one of Examples BA1-BA14, and to decode the encoded pointer is to include decrypting the encrypted portion of the encoded pointer using a second cryptographic algorithm with third inputs, the third inputs including the first data encryption factor associated with the first data access instruction.

Example BA16 comprises the subject matter of any one of Examples BA1-BA15, and the circuitry is further to in response to determining that the decrypted first data element is not a valid result of the cryptographic algorithm, block the first data access instruction.

Example BA17 comprises the subject matter of any one of Examples BA1-BA16, and the first data access instruction is associated with a read operation for the first encrypted data element.

Example BM1 provides method comprising: storing, in a register, an encoded pointer to a memory location in memory, and the encoded pointer is to include an encrypted portion; determining a first data encryption factor based on a first data access instruction; decoding the encoded pointer to obtain a memory address of the memory location; using the memory address to access an encrypted first data element; and decrypting the encrypted first data element using a cryptographic algorithm with first inputs to generate a decrypted first data element, the first inputs including the first data encryption factor based on the first data access instruction and a second data encryption factor from the encoded pointer.

Example BM2 comprises the subject matter of Example BM1, and the encoded pointer further includes first metadata.

Example BM3 comprises the subject matter of Example BM2, and the first metadata is permissions.

Example BM4 comprises the subject matter of Example BM2, and the first metadata is a memory allocation size of a data structure.

Example BM5 comprises the subject matter of Example BM4, and the memory address corresponds to a base address of the data structure.

Example BM6 comprises the subject matter of any one of Examples BM4-BM5, and the first data encryption factor includes a first data type of the encrypted first data element inferred from the first data access instruction, and the data structure contains the encrypted first data element having the first data type and an encrypted second data element having a second data type.

Example BM7 comprises the subject of any one of Examples BM2-BM6, and the first metadata is a memory allocation size of the encrypted first data element, and the memory address corresponds to a first byte of the encrypted first data element.

Example BM8 comprises the subject matter of any one of Examples BM1-BM7, and the method further includes in response to a second data access instruction, decoding a second encoded pointer to obtain a second memory address of a second memory location; using the second memory address to access an encrypted second data element; and determining a third data encryption factor based on the second data access instruction; and decrypting the encrypted second data element using the cryptographic algorithm with second inputs, the second inputs including the third data encryption factor based on the second data access instruction and a fourth data encryption factor from the second encoded pointer.

Example BM9 comprises the subject matter of any one of Examples BM1-BM8, and the first data encryption factor and the second data encryption factor are included in a data tweak as one of the first inputs for the cryptographic algorithm to decrypt the encrypted first data element.

Example BM10 comprises the subject matter of any one of Examples BM1-BM9, and the first data encryption factor includes a first data type derived from the first data access instruction.

Example BM11 comprises the subject matter of Example BM10, and to derive the first data type from the first data access instruction is to infer the first data type based on an op code of the first data access instruction.

Example BM12 comprises the subject matter of Example BM10, and the first data encryption factor for the cryptographic algorithm to decrypt the encrypted first data element further includes a displacement value derived from the first data access instruction.

Example BM13 comprises the subject matter of any one of Examples BM1-BM12, and the method further includes determining that the first data access instruction includes a prefix; and determining the first data encryption factor based on information included in the prefix.

Example BM14 comprises the subject matter of any one of Examples BM1-BM13, and the memory location is in heap memory or stack memory.

Example BM15 comprises the subject matter of any one of Examples BM1-BM14, and the decoding the encoded pointer includes: decrypting the encrypted portion of the encoded pointer using a second cryptographic algorithm with third inputs, the third inputs including the first data encryption factor associated with the first data access instruction.

Example BM16 comprises the subject matter of any one of Examples BM1-BM15, and the method further includes in response to determining that the decrypted first data element is not a valid result of the cryptographic algorithm, block the first data access instruction.

Example BM17 comprises the subject matter of any one of Examples BM1-BM16, and the first data access instruction is associated with a read operation for the first encrypted data element.

Example BA1 provides a processor comprising: a register to store an encoded pointer to a memory location in memory, and the encoded pointer is to include an encrypted portion; circuitry to: determine a first data encryption factor based on a first data access instruction; decode the encoded pointer to obtain a memory address of the memory location; use the memory address to access an encrypted first data element; and decrypt the encrypted first data element using a cryptographic algorithm with first inputs to generate a decrypted first data element, the first inputs including the first data encryption factor based on the first data access instruction and a second data encryption factor from the encoded pointer.

Example BA2 comprises the subject matter of Example BA1, and the encoded pointer further includes first metadata.

Example BA3 comprises the subject matter of Example BA2, and the first metadata includes permissions.

Example BA4 comprises the subject matter of Example BA2, and the first metadata is a memory allocation size of a data structure.

Example BA5 comprises the subject matter of Example BA4, and the memory address corresponds to a base address of the data structure.

Example BA6 comprises the subject matter of any one of Examples BA4-BA5, and the first data encryption factor includes a first data type of the encrypted first data element inferred from the first data access instruction, and the data structure contains the encrypted first data element having the first data type and an encrypted second data element having a second data type.

Example BA7 comprises the subject matter of any one of Examples BA2-BA6, and the first metadata is a memory allocation size of the encrypted first data element, and the memory address corresponds to a first byte of the encrypted first data element.

Example BA8 comprises the subject matter of any one of Examples BA1-BA7, and the circuitry is further in response to a second data access instruction, decode a second encoded pointer to obtain a second memory address of a second memory location; use the second memory address to access an encrypted second data element; and determine a third data encryption factor based on the second data access instruction; and decrypt the encrypted second data element using the cryptographic algorithm with second inputs, the second inputs including the third data encryption factor based on the second data access instruction and a fourth data encryption factor from the second encoded pointer.

Example BA9 comprises the subject matter of any one of Examples BA1-BA8, and the first data encryption factor and the second data encryption factor are included in a data tweak as one of the first inputs for the cryptographic algorithm to decrypt the encrypted first data element.

Example BA10 comprises the subject matter of any one of Examples BA1-BA9, and the first data encryption factor includes a first data type derived from the first data access instruction.

Example BA11 comprises the subject matter of Example BA10, and to derive the first data type from the first data access instruction is to infer the first data type based on an op code of the first data access instruction.

Example BA12 comprises the subject matter of Example BA10, and the first data encryption factor for the cryptographic algorithm to decrypt the encrypted first data element further includes a displacement value derived from the first data access instruction.

Example BA13 comprises the subject matter of any one of Examples BA1-BA12, and the circuitry is further to determine that the first data access instruction includes a prefix; and determine the first data encryption factor based on information included in the prefix.

Example BA14 comprises the subject matter of any one of Examples BA1-BA13, and the memory location is in heap memory or stack memory.

Example BA15 comprises the subject matter of any one of Examples BA1-BA14, and to decode the encoded pointer is to include decrypting the encrypted portion of the encoded pointer using a second cryptographic algorithm with third inputs, the third inputs including the first data encryption factor associated with the first data access instruction.

Example BA16 comprises the subject matter of any one of Examples BA1-BA15, and the circuitry is further to in response to determining that the decrypted first data element is not a valid result of the cryptographic algorithm, block the first data access instruction.

Example BA17 comprises the subject matter of any one of Examples BA1-BA16, and the first data access instruction is associated with a read operation for the first encrypted data element.

Example BM1 provides method comprising: storing, in a register, an encoded pointer to a memory location in memory, and the encoded pointer is to include an encrypted portion; determining a first data encryption factor based on a first data access instruction; decoding the encoded pointer to obtain a memory address of the memory location; using the memory address to access an encrypted first data element; and decrypting the encrypted first data element using a cryptographic algorithm with first inputs to generate a decrypted first data element, the first inputs including the first data encryption factor based on the first data access instruction and a second data encryption factor from the encoded pointer.

Example BM2 comprises the subject matter of Example BM1, and the encoded pointer further includes first metadata.

Example BM3 comprises the subject matter of Example BM2, and the first metadata is permissions.

Example BM4 comprises the subject matter of Example BM2, and the first metadata is a memory allocation size of a data structure.

Example BM5 comprises the subject matter of Example BM4, and the memory address corresponds to a base address of the data structure.

Example BM6 comprises the subject matter of any one of Examples BM4-BM5, and the first data encryption factor includes a first data type of the encrypted first data element inferred from the first data access instruction, and the data structure contains the encrypted first data element having the first data type and an encrypted second data element having a second data type.

Example BM7 comprises the subject of any one of Examples BM2-BM6, and the first metadata is a memory allocation size of the encrypted first data element, and the memory address corresponds to a first byte of the encrypted first data element.

Example BM8 comprises the subject matter of any one of Examples BM1-BM7, and the method further includes in response to a second data access instruction, decoding a second encoded pointer to obtain a second memory address of a second memory location; using the second memory address to access an encrypted second data element; and determining a third data encryption factor based on the second data access instruction; and decrypting the encrypted second data element using the cryptographic algorithm with second inputs, the second inputs including the third data encryption factor based on the second data access instruction and a fourth data encryption factor from the second encoded pointer.

Example BM9 comprises the subject matter of any one of Examples BM1-BM8, and the first data encryption factor and the second data encryption factor are included in a data tweak as one of the first inputs for the cryptographic algorithm to decrypt the encrypted first data element.

Example BM10 comprises the subject matter of any one of Examples BM1-BM9, and the first data encryption factor includes a first data type derived from the first data access instruction.

Example BM11 comprises the subject matter of Example BM10, and to derive the first data type from the first data access instruction is to infer the first data type based on an op code of the first data access instruction.

Example BM12 comprises the subject matter of Example BM10, and the first data encryption factor for the cryptographic algorithm to decrypt the encrypted first data element further includes a displacement value derived from the first data access instruction.

Example BM13 comprises the subject matter of any one of Examples BM1-BM12, and the method further includes determining that the first data access instruction includes a prefix; and determining the first data encryption factor based on information included in the prefix.

Example BM14 comprises the subject matter of any one of Examples BM1-BM13, and the memory location is in heap memory or stack memory.

Example BM15 comprises the subject matter of any one of Examples BM1-BM14, and the decoding the encoded pointer includes: decrypting the encrypted portion of the encoded pointer using a second cryptographic algorithm with third inputs, the third inputs including the first data encryption factor associated with the first data access instruction.

Example BM16 comprises the subject matter of any one of Examples BM1-BM15, and the method further includes in response to determining that the decrypted first data element is not a valid result of the cryptographic algorithm, block the first data access instruction.

Example BM17 comprises the subject matter of any one of Examples BM1-BM16, and the first data access instruction is associated with a read operation for the first encrypted data element.

Example G1 includes an apparatus comprising means to perform one or more elements of a method of any one of Examples BM1-BM17.

Example G2 includes the subject matter of G1, and the means for performing the method comprises at least one processor and at least one memory element.

Example G3 includes the subject matter of any one of Examples G1-G2, and the apparatus is one of a computing system, a system-on-a-chip, or a multi-chip package device, or a die.

Example G3 includes one or more non-transitory computer-readable media comprising instructions to cause an electronic device, upon execution of the instructions by one or more processors of the electronic device, to perform one or more elements of a method of any one of Examples BM1-BM17.

Example G1 includes an apparatus comprising means to perform one or more elements of a method of any one of Examples AM1-AM11 or BM1-BM17.

Example G2 includes the subject matter of G1, and the means for performing the method comprises at least one processor and at least one memory element.

Example G3 includes the subject matter of any one of Examples G1-G2, and the apparatus is one of a computing system, a system-on-a-chip, or a multi-chip package device, or a die.

Example G3 includes one or more non-transitory computer-readable media comprising instructions to cause an electronic device, upon execution of the instructions by one or more processors of the electronic device, to perform one or more elements of a method of any one of Examples AM1-AM11 or BM1-BM17.

What is claimed is:

1. A method, comprising:
   storing, in a register, an encoded pointer to a variable in stack memory, wherein the encoded pointer includes an encrypted portion and a fixed plaintext portion of a memory address corresponding to the variable;
   in response to a memory access request associated with the variable, decrypting the encrypted portion of the encoded pointer to obtain first upper address bits of the memory address and a memory allocation size for the variable;
   decoding the encoded pointer to obtain the memory address;
   verifying the memory address is valid based, at least in part on the memory allocation size; and
   allowing the memory access request based on verifying that the memory address is valid.

2. The method of claim 1, further comprising:
   receiving a memory allocation request for the variable;
   determining the memory allocation size for the stack memory;
   obtaining the memory address for the variable based, at least in part, on a stack pointer;
   storing the first upper address bits of the memory address in a memory location; and
   encrypting the memory allocation size and the first upper address bits of the memory address based on an address key and an address tweak.

3. The method of claim 1, further comprising:
   storing second upper address bits with the first upper address bits in a memory location, wherein the first upper address bits and the second upper address bits are fixed for the stack memory.

4. The method of claim 3, wherein the verifying the memory address is valid includes:
   determining that the first upper address bits obtained from decrypting the encrypted portion of the encoded pointer match the stored first upper address bits in the memory location.

5. The method of claim 4, wherein the verifying the memory address is valid further includes:
   determining whether the memory address is less than a sum of the memory allocation size and a variable base address of the variable.

6. The method of claim 1, further comprising:
   decrypting the encrypted portion of the encoded pointer with a block cipher using an address key and an address tweak as inputs.

7. The method of claim 6, wherein the encoded pointer includes power metadata that indicates in a power of two, a first number of bits in the encoded pointer that represents a fixed offset and a second number of bits in the encoded pointer that represents a mutable offset.

8. The method of claim 7, wherein the address tweak includes the fixed offset and the power metadata.

9. A processor, comprising:
   a register to store an encoded pointer to a variable in stack memory, the encoded pointer including:
     an encrypted portion; and
     a fixed plaintext portion of a memory address corresponding to the variable; and
   circuitry to:
     in response to a memory access request associated with the variable, decrypt the encrypted portion of the encoded pointer to obtain first upper address bits of the memory address and a memory allocation size for the variable;
     decode the encoded pointer to obtain the memory address;
     verify the memory address is valid based, at least in part on the memory allocation size; and
     in response to determining that the memory address is valid, allow the memory access request.

10. The processor of claim 9, wherein the circuitry is further to:
    receive a memory allocation request for the variable;
    determine the memory allocation size for the stack memory;
    obtain the memory address for the variable based, at least in part, on a stack pointer;
    store the first upper address bits of the memory address in a memory location; and
    encrypt the memory allocation size and the first upper address bits of the memory address based on an address key and an address tweak.

11. The processor of claim 9, wherein the circuitry is further to store second upper address bits with the first upper address bits in a memory location, wherein the first upper address bits and the second upper address bits are fixed for the stack memory.

12. The processor of claim 11, wherein to verify the memory address is valid is to include determining that the first upper address bits obtained from decrypting the encrypted portion of the encoded pointer match the stored first upper address bits in the memory location.

13. The processor of claim 12, wherein to verify the memory address is valid is to include determining that the memory address is less than a sum of the memory allocation size and a variable base address of the variable.

14. The processor of claim 9, the circuitry further to:
    decrypt the encrypted portion of the encoded pointer with a block cipher using an address key and an address tweak as inputs.

15. The processor of claim 14, wherein the encoded pointer includes power metadata that indicates in a power of two, a first number of bits in the encoded pointer that represents a fixed offset and a second number of bits in the encoded pointer that represents a mutable offset.

16. The processor of claim 15, wherein the address tweak includes the fixed offset and the power metadata.

17. The processor of claim 9, wherein the memory address is to be decoded from the encoded pointer based, in part, on the fixed plaintext portion and the first upper address bits.

18. The processor of claim 17, wherein the circuitry is further to:
- load first data stored in the variable of the stack memory based on the memory address decoded from the encoded pointer; and
- decrypt the first data based on a first data key and a data tweak derived, at least in part, from the encoded pointer.

19. The processor of claim 17, wherein the circuitry is further to:
- encrypt first data based on a first data key and a data tweak derived, at least in part, from the encoded pointer; and
- use the memory address decoded from the encoded pointer to store the encrypted first data in the variable corresponding to the memory address.

20. One or more non-transitory computer-readable media with instructions stored thereon, wherein, when executed by a processor, the instructions are to perform operations comprising:
- storing, in a register, an encoded pointer to a variable in stack memory, wherein the encoded pointer includes an encrypted portion and a fixed plaintext portion of a memory address corresponding to the variable;
- in response to a memory access request associated with the variable, decrypting the encrypted portion of the encoded pointer to obtain first upper address bits of the memory address and a memory allocation size for the variable;
- decoding the encoded pointer to obtain the memory address;
- verifying the memory address is valid based, at least in part on the memory allocation size; and
- allowing the memory access request based on verifying that the memory address is valid.

21. The one or more non-transitory computer-readable media of claim 20, wherein when executed by the processor, the instructions are to perform further operations comprising:
- decrypting the encrypted portion of the encoded pointer with a block cipher using an address key and an address tweak as inputs.

22. The one or more non-transitory computer-readable media of claim 21 wherein the address tweak includes a fixed offset and power metadata, and wherein the encoded pointer includes the power metadata that indicates in a power of two, a first number of bits in the encoded pointer that represents a fixed offset and a second number of bits in the encoded pointer that represents a mutable offset.

23. The one or more non-transitory computer-readable media of claim 20, wherein the memory address is decoded from the encoded pointer based, in part, on the fixed plaintext portion and the first upper address bits.

24. The one or more non-transitory computer-readable media of claim 23, wherein when executed by the processor, the instructions are to perform further operations comprising:
- loading first data stored in the variable of the stack memory based on the memory address decoded from the encoded pointer; and
- decrypting the first data based on a first data key and a data tweak derived, at least in part, from the encoded pointer.

25. The one or more non-transitory computer-readable media of claim 23, wherein when executed by the processor, the instructions are to perform further operations comprising:
- encrypting first data based on a first data key and a data tweak derived, at least in part, from the encoded pointer; and
- using the memory address decoded from the encoded pointer to store the encrypted first data in the variable corresponding to the memory address.

* * * * *